US012134480B2

(12) United States Patent
Sosnosky et al.

(10) Patent No.: US 12,134,480 B2
(45) Date of Patent: Nov. 5, 2024

(54) AIRCRAFT ENGINE NACELLE COWLING MECHANISM

(71) Applicant: MRA SYSTEMS, LLC, Baltimore, MD (US)

(72) Inventors: Daniel Sosnosky, Bowie, MD (US); Thomas Weir, Lutherville, MD (US); Robert Klingele, New Britain, PA (US)

(73) Assignee: MRA SYSTEMS, LLC, Baltimore, MD (US)

( * ) Notice: Subject to any disclaimer, the term of this patent is extended or adjusted under 35 U.S.C. 154(b) by 308 days.

(21) Appl. No.: 17/441,285

(22) PCT Filed: Nov. 24, 2020

(86) PCT No.: PCT/US2020/061935
§ 371 (c)(1),
(2) Date: Sep. 21, 2021

(87) PCT Pub. No.: WO2021/167667
PCT Pub. Date: Aug. 26, 2021

(65) Prior Publication Data
US 2022/0177148 A1    Jun. 9, 2022

Related U.S. Application Data

(60) Provisional application No. 62/940,079, filed on Nov. 25, 2019.

(51) Int. Cl.
*B64D 29/06* (2006.01)
(52) U.S. Cl.
CPC ................................. *B64D 29/06* (2013.01)
(58) Field of Classification Search
CPC ............ B64D 29/06; B64D 29/08; B64C 7/02
See application file for complete search history.

(56) References Cited

U.S. PATENT DOCUMENTS 3,156,372 A * 11/1964 Parker ...................... F02C 7/00
60/770
4,585,189 A * 4/1986 Buxton .................. B64D 29/00
49/113

(Continued)

FOREIGN PATENT DOCUMENTS

FR    3 053 026 A1    12/2017
FR    3 064 980 A1    10/2018

(Continued)

OTHER PUBLICATIONS

International Search Report and Written Opinion mailed on Sep. 10, 2021, received for PCT Application PCT/US2020/061935, Filed on Nov. 24, 2020, 8 pages.

(Continued)

*Primary Examiner* — Timothy D Collins
*Assistant Examiner* — Justin Michael Heston
(74) *Attorney, Agent, or Firm* — XSENSUS LLP

(57) ABSTRACT

An aircraft propulsion system includes an engine assembly including a fan that moves air, and a cowl that surrounds at least a portion of the engine assembly when the cowl is in a closed position. The cowl includes an outer surface arranged away from the engine assembly that provides an aerodynamic surface. The aircraft propulsion system also includes a cowl mechanism connected to the cowl and configured to guide the cowl along a movement path from the closed position to an open position. In the open position, an entirety of the cowl is arranged farther away from a horizontal plane passing through a rotating axis of the fan than in the closed position.

18 Claims, 59 Drawing Sheets

(56) References Cited

U.S. PATENT DOCUMENTS

| | | | |
|---|---|---|---|
| 4,679,750 A | | 7/1987 | Burhans |
| 5,350,136 A | * | 9/1994 | Prosser .................. B64D 29/08 244/129.4 |
| 6,220,546 B1 | | 4/2001 | Klamka et al. |
| 2013/0145770 A1 | | 6/2013 | Garric et al. |

FOREIGN PATENT DOCUMENTS

| | | |
|---|---|---|
| GB | 2 381 249 A | 4/2003 |
| WO | 2012/037988 A1 | 3/2012 |

OTHER PUBLICATIONS

Extended European Search Report issued Oct. 26, 2023 in European Patent Application No. 20920176.3, 8 pages.
Communication issued Nov. 14, 2023 in European Patent Application No. 20920176.3, 1 pages.
Chinese Office Action issued Jun. 17, 2024, in corresponding Chinese Patent Application No. 202080045183.2, with partial English-language translation, 11pp.

* cited by examiner

AIRCRAFT ENGINE NACELLE COWLING MECHANISM

CROSS-REFERENCE TO RELATED APPLICATIONS

This application is based on PCT filing PCT/US2020/061935, filed Nov. 24, 2020, which claims the benefit of U.S. Provisional Application No. 62/940,079, filed on Nov. 25, 2019, the entire contents of each are incorporated by reference herein.

FIELD OF THE INVENTION

The present disclosure relates generally to a nacelle cowling for an aircraft engine/aircraft propulsion system, and in particular, a mechanism for opening and closing a nacelle cowling.

BACKGROUND OF INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Aircraft propulsion systems include one or more engines with a rotating fan and a nacelle cowling structure surrounding at least a portion of the fan in a closed position. As shown in FIGS. 39A and 39B, a short duct, separate flow type nacelle 3900 and a long duct, mixed flow nacelle 3914 each include an inlet 3902 at a front end, fan cowls 3904 arranged aft of the inlet 3902, and a ducted cowl 3906 (including fan ducts 3908), which may include a thrust reversal mechanism such as a thrust reverser, aft of the fan cowls 3904. The nacelle structure wraps around the engine 3912 to provide external surfaces that protect engine components (e.g., engine electrical components) from the environment and reduce aerodynamic drag. The aircraft propulsion system is supported by a pylon 3910. The ducted cowl 3906 provides internal ducting to efficiently guide air to provide forward thrust during normal flight operation and in some cases may contain a reversing mechanism to guide a direction of airflow to slow the aircraft during landing and to act as a thrust reverser. Maintenance personnel require access to engine components arranged inside, or underneath, the nacelle cowling.

SUMMARY OF INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

An aircraft propulsion system may include an engine assembly including a fan that rotates to move air; a cowl that surrounds at least a portion of the engine assembly when the cowl is in a closed position, the cowl including an outer surface arranged away from the engine assembly that provides an aerodynamic surface; and a cowl mechanism connected to the cowl and configured to guide the cowl along a movement path from the closed position to an open position, wherein in the open position, an entirety of the cowl is arranged farther away from a horizontal plane passing through a rotating axis of the fan than in the closed position.

The aircraft propulsion system may further include the movement path being defined by a motion of a point on the outer surface of the cowl, the movement path including a straight line during a first portion of the movement path from the closed position to the open position, and the movement path including a curved line during a second portion of the movement path from the closed position to the open position, the second portion being further from the closed position than the first portion.

In the open position, the entirety of the cowl may be moved away from the horizontal plane by a distance equal to at least an outer radius of an engine core of the engine assembly. The cowl may include an upper cowl that surrounds an upper portion of the engine assembly, and a lower cowl that surrounds a lower portion of the engine assembly. In the closed position, the upper cowl and the lower cowl may be configured to be latched to each other by at least one latch along the horizontal plane. The cowl mechanism may further include an upper cowl mechanism attached to the upper cowl, a lower cowl mechanism attached to the lower cowl, and a mid-link connecting the upper cowl to the lower cowl. The cowl mechanism may be further configured to simultaneously move a second one of the upper cowl and the lower cowl along the movement path when a first one of the upper cowl and the lower cowl is caused to move along the movement path by an external force.

The cowl mechanism may be configured to counterbalance a weight of the upper cowl and the lower cowl so that the external force required to move the upper cowl and the lower cowl along the movement path is less than a maximum force that can be manually and safely applied by a single individual.

The cowl mechanism may guide the cowl along the movement path between the open position and the closed position so that no portion of the cowl extends beyond a clearance plane at any position along the movement path, and the clearance plane extends in a vertical direction through an intersection point that is a point on an outer surface of the cowl in the closed position that is closest to an obstruction.

The engine assembly may further include a v-groove, and the cowl may include a v-blade configured to engage with the v-groove in the closed position, and the cowl mechanism may be configured to guide the cowl along a vertical direction in the movement path from the closed position towards the open position at least until the v-blade is completely clear of the v-groove.

The open position may be a position of the cowl in which the portion of the engine assembly is made accessible for performing a maintenance function.

Making the engine assembly accessible for performing the maintenance function may include moving the cowl enough to perform at least one of the following without removing the cowl from the aircraft that includes the aircraft propulsion system: a direct visual inspection of the portion of the engine assembly, an inspection of the portion of the engine assembly using a non-flexible, straight borescope, an inspection of the portion of the engine assembly using a flexible borescope, removal of the portion of the engine assembly from the aircraft, and removal of an entirety of the engine assembly from the aircraft.

The cowl mechanism may be configured to guide the cowl along the movement path so that in the open position, the cowl is rotated by less than 45 degrees away from the closed horizontal position.

The cowl mechanism may further include at least two links that are configured to change their positions with respect to each other while the cowl is moved between the closed position and the open position, and the cowl mechanism may further include a locking device that when installed is configured to be attached to the at least two links to prevent the at least two links from changing their positions with respect to each other, and when installed, the locking device prevents the cowl from being moved away from the open position. The cowl may include a thrust reverser configured to adjustably change a movement direction of the air. The cowl mechanism may be attached to a pylon of an aircraft.

BRIEF DESCRIPTION OF THE DRAWINGS

The scope of the present disclosure is best understood from the following detailed description of exemplary embodiments when read in conjunction with the accompanying drawings, wherein.

Figure 1A:
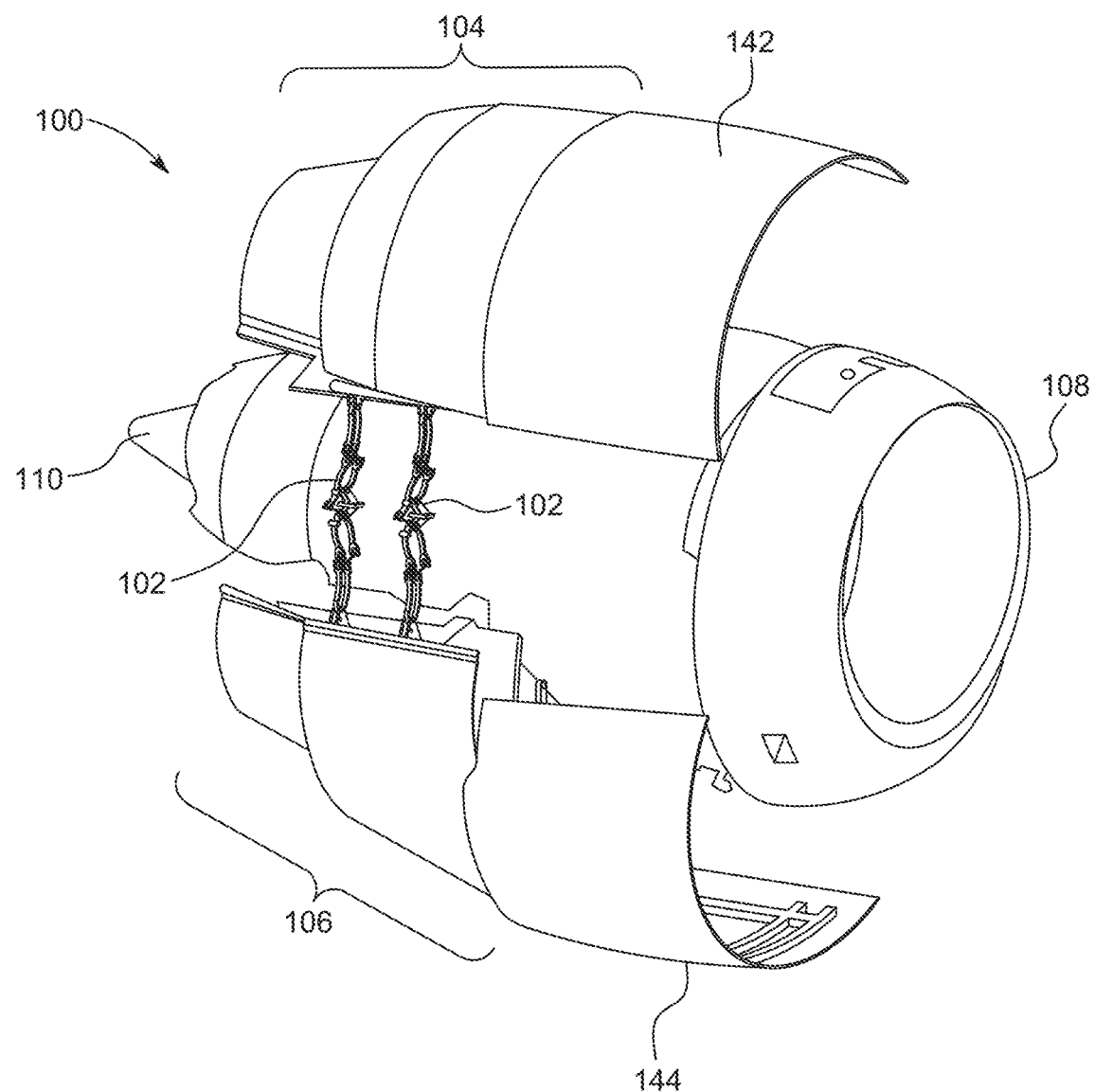
FIG. 1A is an isometric view of an aircraft propulsion system 100 according to an embodiment of the invention.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

FIGS. 1A-D show an aircraft propulsion system 100 including an engine/fan assembly 110, inlet 108, upper fan cowl 142, lower fan cowl 144, upper cowl 104, and lower cowl 106. The upper cowl 104 and lower cowl 106 are configured to be guided between open and closed positions by cowl mechanisms 102 according to an embodiment of the present invention. In the open position, the cowl mechanisms 102 further support and hold the upper cowl 104 and lower cowl 106 in place against the weight of gravity. In the present embodiment, the upper cowl 104 and the lower cowl 106 are ducted cowl structures, such as ducted cowl 3906. The upper cowl 104 and the lower cowl 106 may, in some embodiments, include thrust reverser components to redirect air flow, for example to slow the forward motion of the aircraft. In the closed position, outer surfaces of the upper cowl 104 and lower cowl 106 provide aerodynamic air flow surfaces for use during aircraft flight. When the upper cowl 104 and lower cowl 106 are in the open position using the cowl mechanisms 102, maintenance access is provided to portions of the engine/fan assembly 110, including engine components such as the engine core, air valves and ducting, pylon hydraulics, engine to pylon systems connection interface, and electrical and/or drain line connections to perform maintenance activity and/or inspection.

For example, in the open position, a maintenance activity may include removing a portion or the entirety of the engine/fan assembly 110 from the aircraft without removing the upper cowl 104 and/or the lower cowl 106 from the aircraft. Alternatively, the maintenance activity may include conducting a visual inspection of a portion of the engine/fan assembly 110 or a portion of an internal surface of the upper cowl 104 or the lower cowl 106 that faces the engine/fan assembly 110. Such a maintenance action may alternatively include performing the visual inspection with the unaided human eye, with a straight (non-flexible) borescope, with a flexible borescope, and/or with a remotely controlled camera.

Two cowl mechanisms 102 are shown included in the aircraft propulsion system 100 in this example. However, the invention also encompasses including only one or including more than two cowl mechanisms 102 in each aircraft engine assembly 100, as needed. In addition, according to the present embodiment, the upper cowl 104 and lower cowl 106, which may include thrust reverser components, are opened and closed using the cowl mechanisms 102. However, the invention also encompasses configurations in which other components, such as one or more of the fan cowl 142/144/3904, are included in the upper cowl 104 and lower cowl 106 that are opened and closed under the guidance of the cowl mechanisms 102.

Figure 1B:
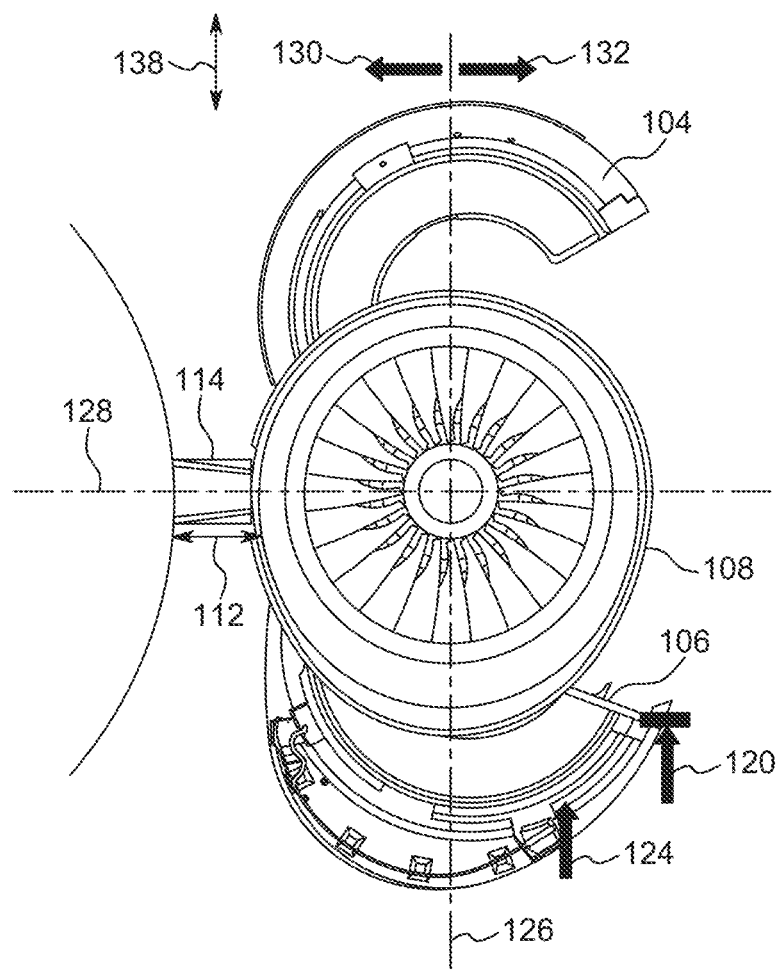
FIG. 1B is a rear-ward looking view of the aircraft propulsion system 100 in an open position according to an embodiment of the invention.
Figure 1C:
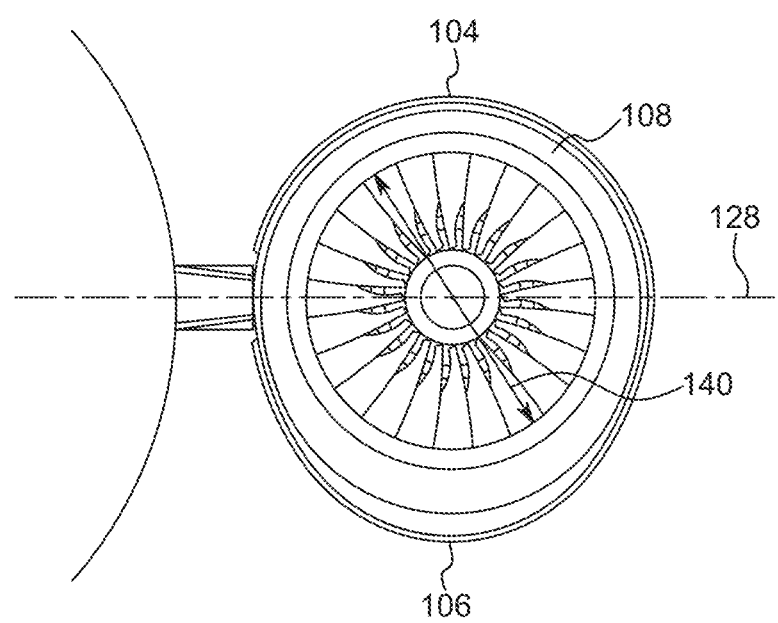
FIG. 1C is a rear-ward looking view of the aircraft propulsion system 100 in a closed position according to an embodiment of the invention.
Figure 1D:
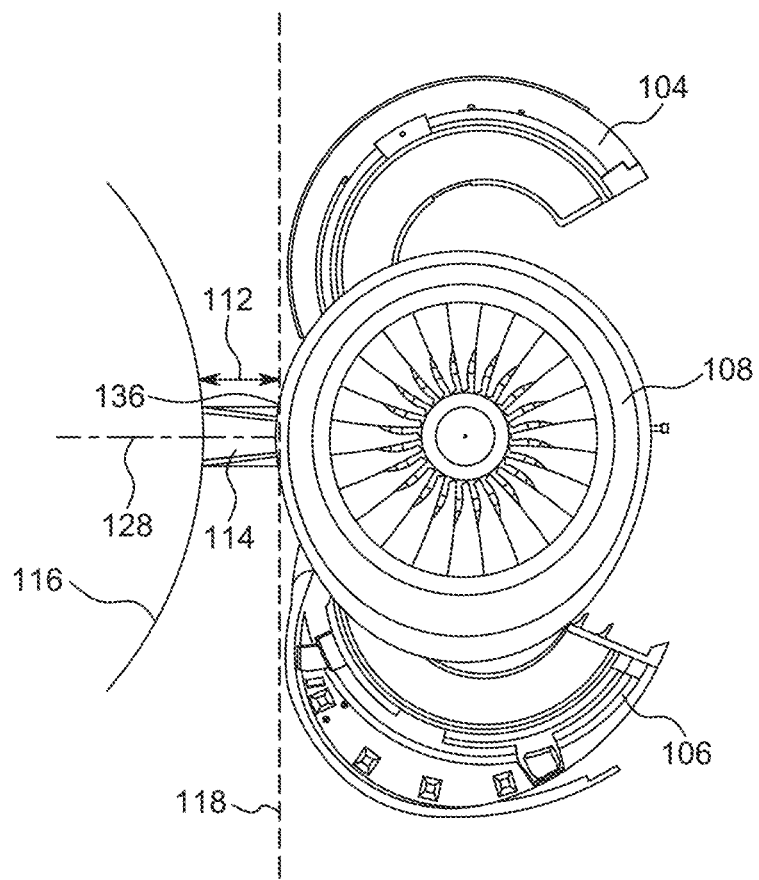
FIG. 1D is a rear-ward looking view of the aircraft propulsion system 100 in an open position according to an embodiment of the invention.

As further illustrated by FIG. 1D, in a side or fuselage mounted propulsion system 100 is mounted on a pylon 114 extending away from a fuselage 116 in a sideways direction, the cowl mechanisms 102 provide for maintenance access to the engine/fan assembly 110 without allowing the opening cowl sections to extend beyond a clearance plane 118. Clearance plane 118 represents the maximum excursion of any portion of the upper cowl 104 or lower cowl 106 in a direction towards the fuselage 116 (or other obstruction such as a strut or other engine) when the upper cowl 104 and lower cowl 106 move between the closed position (FIG. 1C) and the opened position (FIG. 1B). Clearance plane 118 is separated from the fuselage in the direction of pylon 114 by a clearance distance 112 and the clearance plane 118 extends parallel to a rotating axis of a fan in the aircraft engine assembly 100. In FIGS. 1B, 1C, and 1D, the inboard direction 130 is to the left, the outboard direction 132 is to the right, and a vertical direction 138 is up/down.

According to the displayed embodiment, the clearance plane 118 extends in a vertical (up/down) direction and includes an intersection point 136. In the displayed embodiment, the intersection point 136 is a point on an outer surface of the upper cowl 104, in the closed position, that is closest to an obstruction (e.g., the fuselage 116, an adjacent engine, or a strut 3310). The invention also encompasses an alternative embodiment in which the intersection point 136 is a point on an outer surface of an upper fan cowl 142, when the fan cowl is fully closed, that is closest to the obstruction. In a further embodiment, the intersection point 136 is a point where a nacelle outer air flow surface, across one or more of the upper cowl 104 and fan cowl 142, meets a pylon air flow surface across the pylon 114.

The cowl mechanisms 102 are configured to guide the upper cowl 104 and lower cowl 106 to move along a movement path between the closed position and the open position. A first portion of the movement path that is closer to the closed position than the open position includes guiding the upper cowl 104 and the lower cowl 106 in a vertical movement direction 138. A second portion of the movement path that is closer to the open position than the closed position includes a curved path that guides the upper cowl 104 and the lower cowl 106 farther away from the clearance plane and the potential obstruction (e.g., at least partially in the outboard direction 132 as in FIG. 1B) as they move towards the open position. When first moving out of the closed position towards the open position, the cowl mechanisms 102 guide a motion of the upper cowl 104 and lower cowl 106 to be in a straight line in the vertical movement direction. The vertical movement direction is preferably within 5 degrees of a purely vertical direction, and preferably within 1 degree of the purely vertical direction. The purely vertical direction may be defined with respect to a water line WL ground level, or with respect to a plane passing through a rotational axis of the engine/fan parallel to ground.

Alternatively, when first moving out of the closed position towards the open position, the cowl mechanisms 102 guide a motion of the upper cowl 104 and lower cowl 106 to be a curved path having a radius of curvature that is greater than a radius of curvature in the second portion of the movement path.

From the fully open position, as in FIG. 1B, the lower cowl 106 may be raised by applying upward pressure at locations along the outer surface of the lower cowl 106, for example, at lift location 120 and/or lift location 124. As the lower cowl 106 is raised, the cowl mechanisms 102 may cause the upper cowl 104 to be simultaneously lowered by a corresponding distance.

Figure 35A:
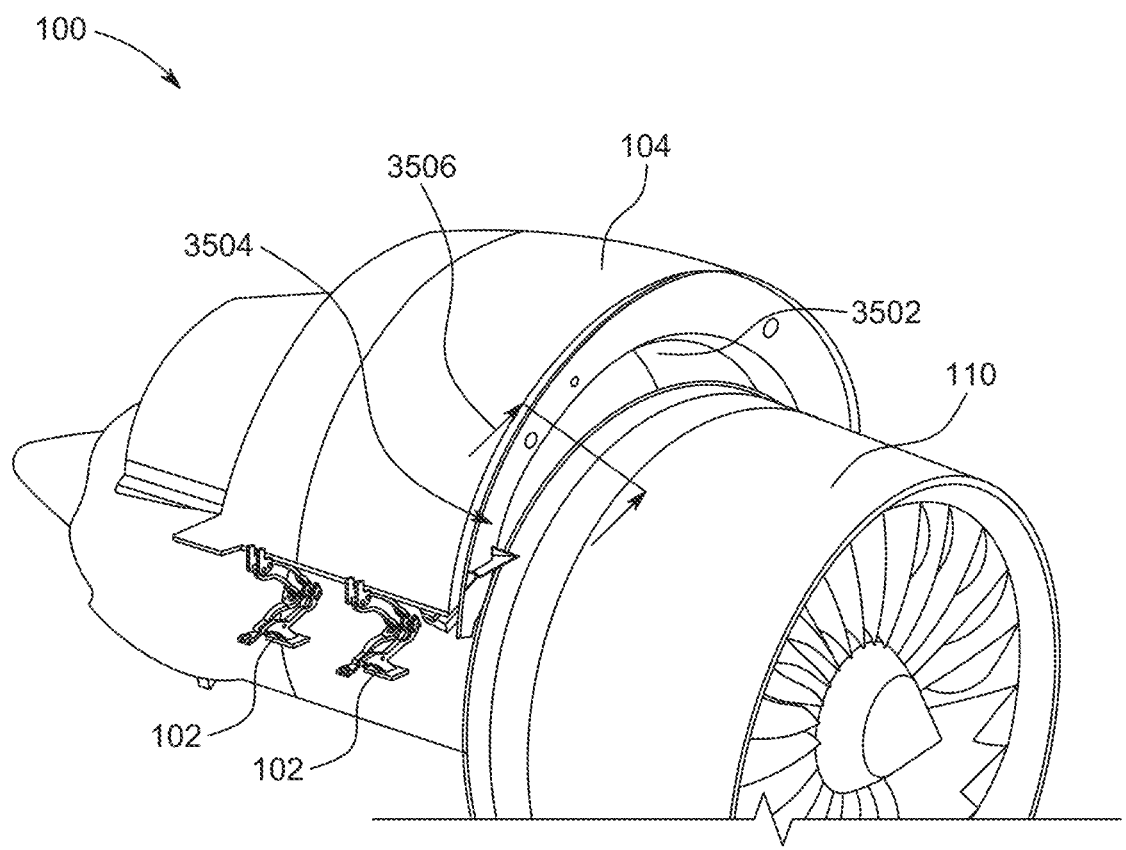
FIG. 35A is an isometric view of an aircraft engine assembly 100 according to an embodiment of the invention.
Figure 35B:
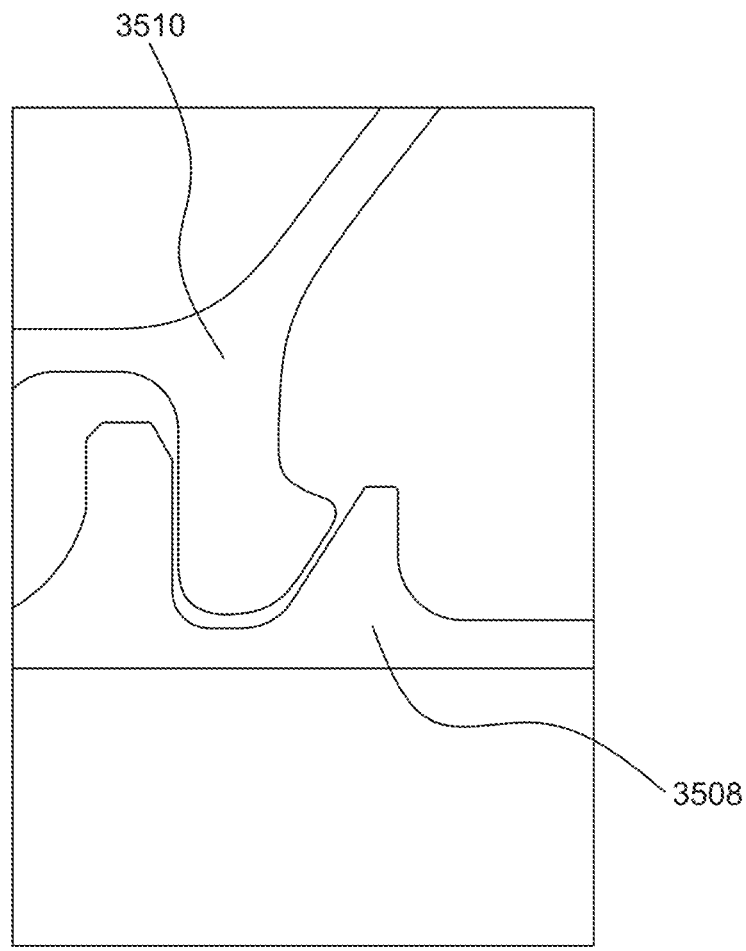
FIG. 35B is a detailed cut-away view from perspective 3506 in FIG. 35A when the upper cowl 104 is closed.

FIG. 35A shows an example of an upper cowl 104 that has a v-blade 3502 arranged along a front end of the upper cowl 104 when the upper cowl 104 is in a position between closed and open. FIG. 35B is a detailed cut-away view from perspective 3506 in FIG. 35A when the upper cowl 104 is closed. The v-blade 3502 interfaces with a v-groove 3508 on the engine, and the v-blade to v-groove engagement is maintained by latching the upper cowl 104 to the lower cowl 106. For proper v-blade to v-groove engagement, the cowl mechanisms 102 guide the upper cowl 104 and lower cowl 106 to move apart from each other in a vertical direction 138 that is perpendicular to an outboard split line 128, which is a WL plane, for example that passes through a rotational axis of the engine.

Figure 38:
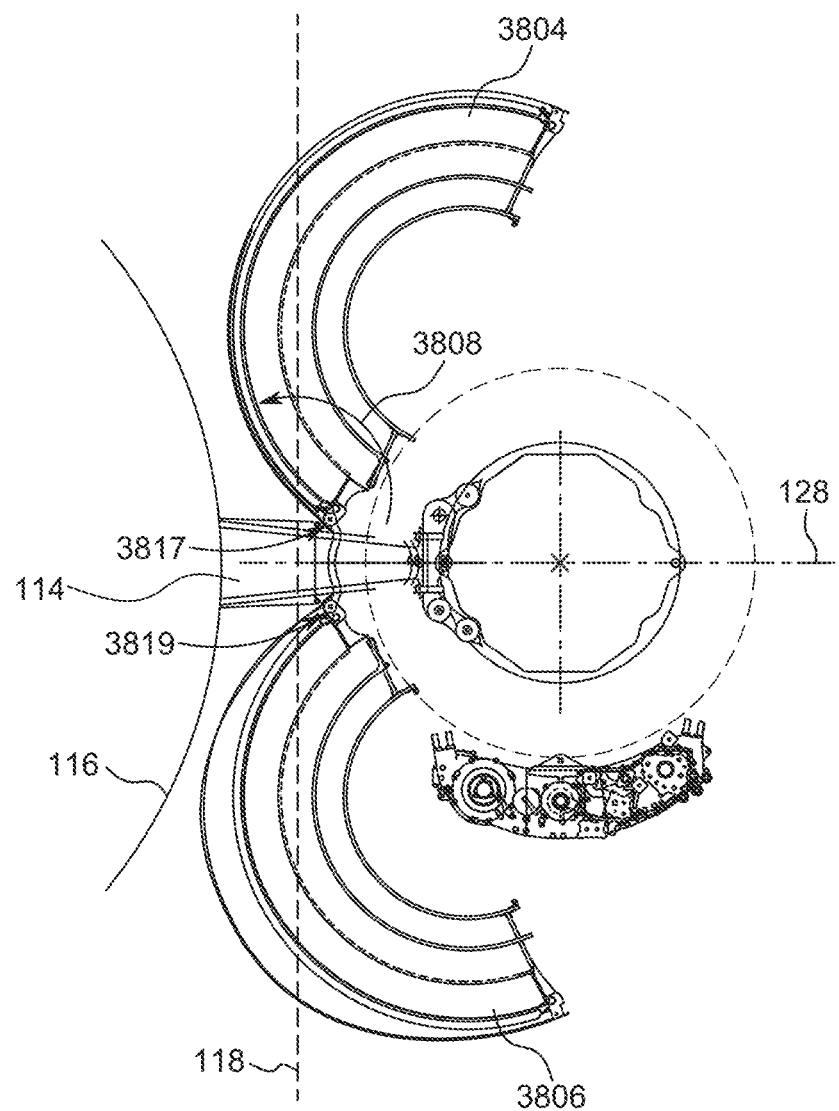
FIG. 38 is a rear-ward looking view of an aircraft propulsion system with a conventional cowl opening mechanism.
Figure 39A:
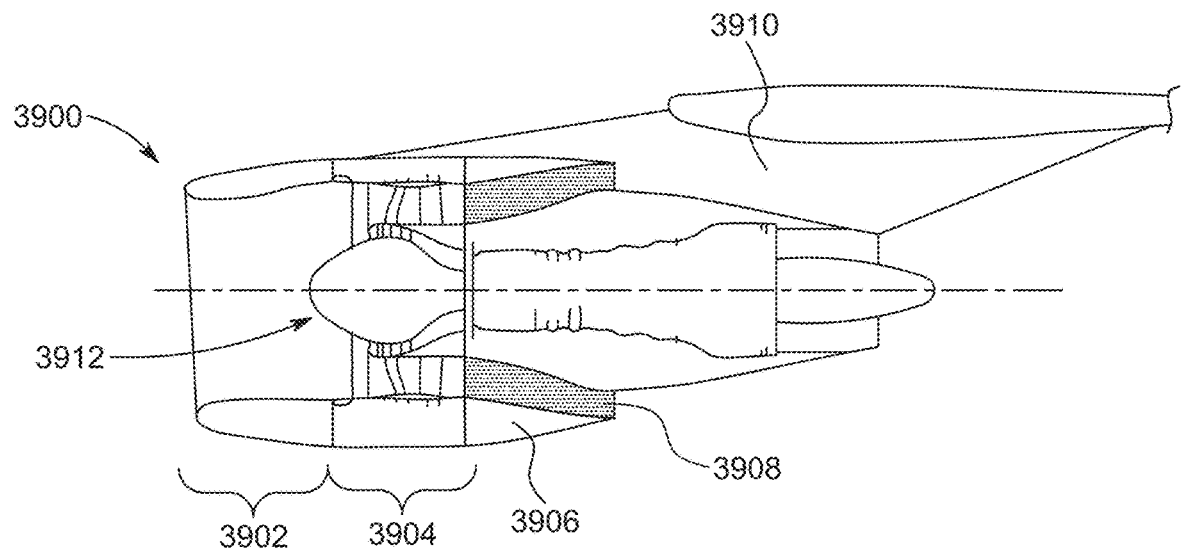
FIG. 39A is a side view of a conventional aircraft propulsion system.
Figure 39B:
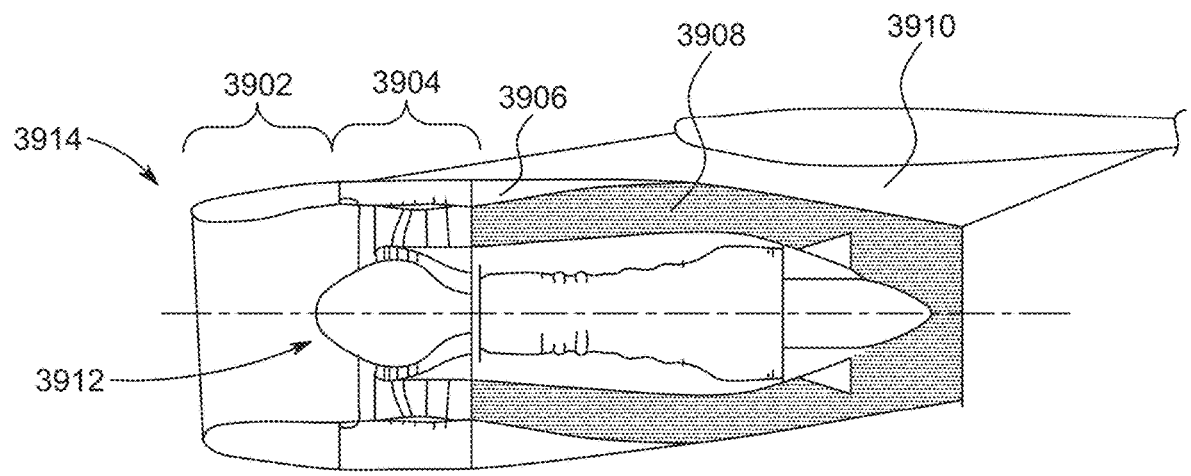
FIG. 39B is a side view of a conventional aircraft propulsion system.

A conventional cowl opening mechanism includes conventional single-axis hinges, and as shown in the comparative example of FIG. 38, such a conventional cowl opening mechanism may cause the upper cowl 3804 to rotate along a circular path 3808 about the axis of the conventional hinge 3817 and may cause the lower cowl 3806 to rotate along a circular path about the axis of the conventional hinge 3819. Thus, due to access requirements in the conventional opening mechanism system, the upper cowl 3804 and lower cowl 3806 must be rotated by an extreme angle that causes the upper cowl 3804 and lower cowl 3806 to extend beyond the clearance plane 118 requiring a longer pylon 114. The area between the pylon and the engine may be difficult to access for maintenance purposes using the conventional opening mechanism, without opening the upper and lower cowls with a sufficient amount of rotation from the closed position, for example, without opening the cowls beyond 45-65 degrees from the closed position. The open position of such a conventional opening mechanism system may drive the designed position of the engine centerline relative to the aircraft to ensure there is adequate clearance between the open thrust reverser cowl exterior surfaces and the fuselage. Thus, using the conventional opening mechanism system, it may be necessary to extend the length of the pylon structure length 112 to provide adequate cowl opening clearance. Such an extended length from the fuselage must be made strong enough (e.g., using sturdier, more expensive, and heavier materials) to adequately support the cantilevered load from the propulsion system, which can result in a disadvantageous increase in the overall weight and cost of the aircraft. Further, such an extension may disadvantageously increase the external surface area that produces drag forces during aircraft operation. Additionally, the large opening angle required of the cowls in the conventional mechanism may disadvantageously expose to the cowl to significant stress (e.g., wind load) from the environment.

Figure 33:
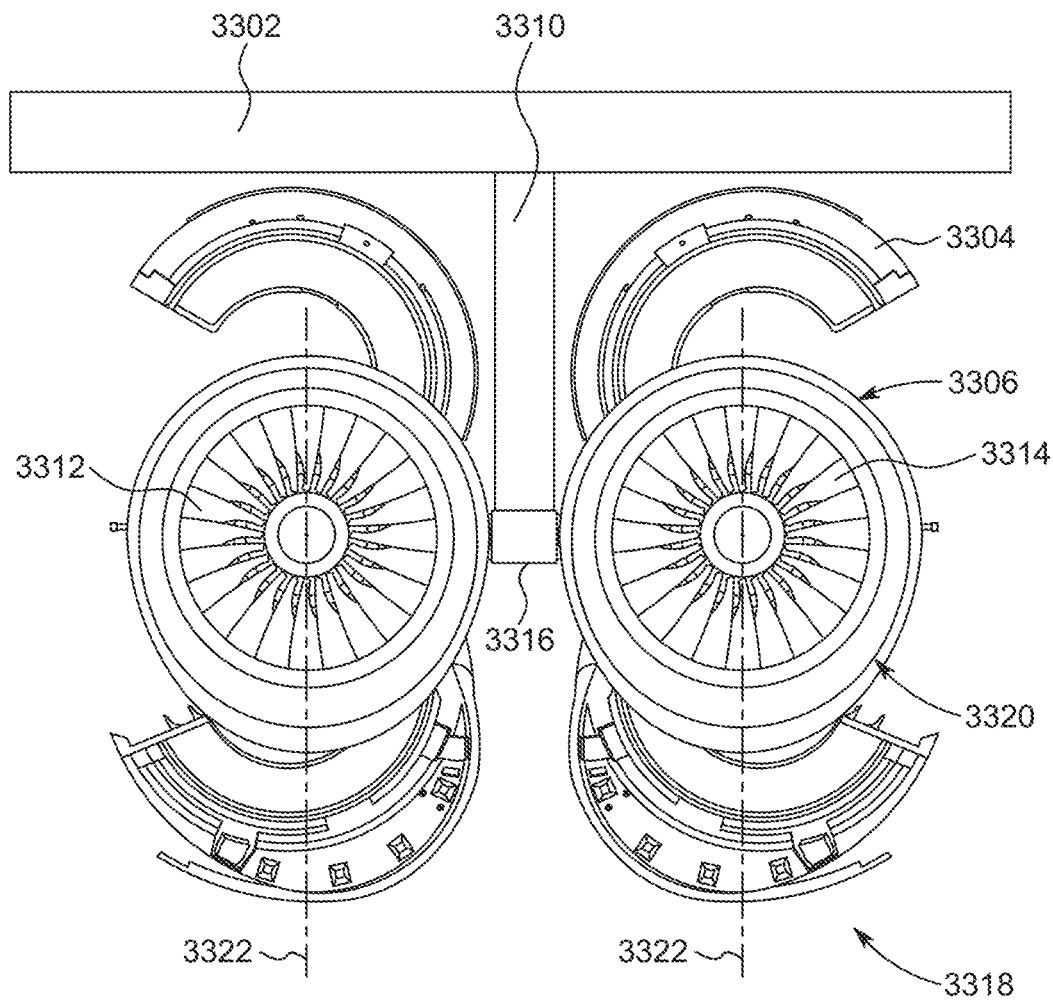
FIG. 33 is a rear-ward looking view of a T-mount close coupled engine configuration according to an embodiment of the invention.

FIG. 33 shows an embodiment of a T-pylon configuration used in an under wing side mounted propulsion system including aircraft engine assemblies 3312 and 3314 (each corresponding to a propulsion system 100 including the cowl mechanisms 102) each having an upper cowl 104 and lower cowl 106 shown in fully opened positions 3304 and 3318, respectively, and also shown in the fully closed positions 3306 and 3320, respectively. In the T-pylon configuration, the engine vertical centerlines 3322 are arranged in close proximity to each other (e.g., typically less than 2 engine fan diameters 140 apart, and preferably less than 1 engine fan diameter 140 apart) to minimize a length of a pylon extension surface 3316, and to minimize the disadvantageous cantilevered loads noted above.

Figure 34:
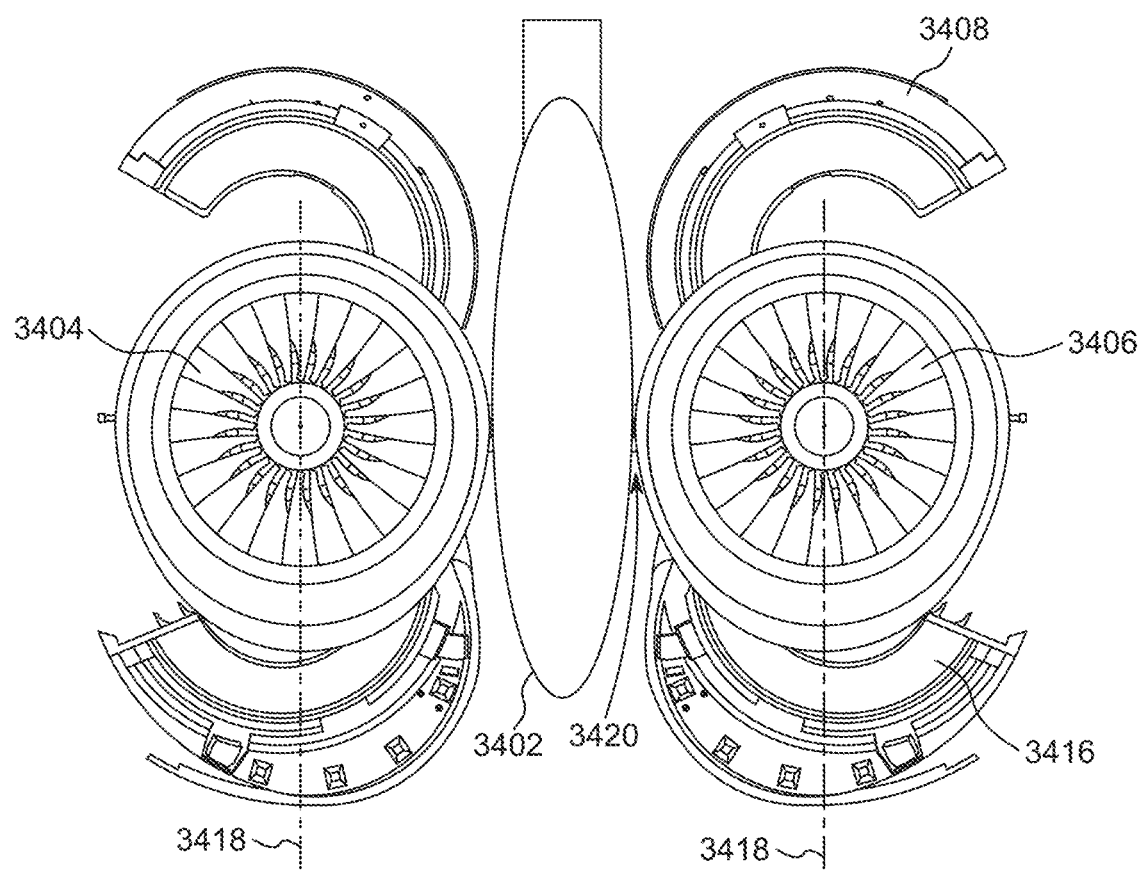
FIG. 34 is a rear-ward looking view of tail mount close coupled engine configuration according to an embodiment of the invention.

FIG. 34 shows an embodiment of a tail mount configuration in which vertical centerlines 3418 of aircraft engine assemblies 3304 and 3406 (each corresponding to a propulsion system 100 including cowl mechanisms 102) are mounted close to each other (e.g., typically less than 2 engine fan diameters apart, and preferably less than 1 engine fan diameter apart on opposite sides of fuselage tail 3402. Open position upper cowl 3408 and open position lower cowl 3416 do not interfere with the obstruction posed by fuselage tail 3402.

Conventionally, for an underwing mounting configuration with a T-pylon, a long duct, mixed flow nacelle has been used with a conventional opening mechanism. Such a conventional nacelle is typically longer in length than a short duct, separate flow nacelle. Thus, the conventional pylon typically associated with a long duct, mixed flow nacelle tends to be longer in the axial direction which can drive weight and increase length and surface area of nacelle which can produce more aero drag to the aircraft. An embodiment of the invention can minimize the disadvantageous weight, length and surface area conditions of such a conventional approach. Furthermore, having a close coupled T-pylon under wing configuration using an embodiment of the opening mechanism 102 can reduce, or eliminate, the pylon extension surface 3316, which extends from the nacelle to the fuselage or other support structure.

Figure 2:
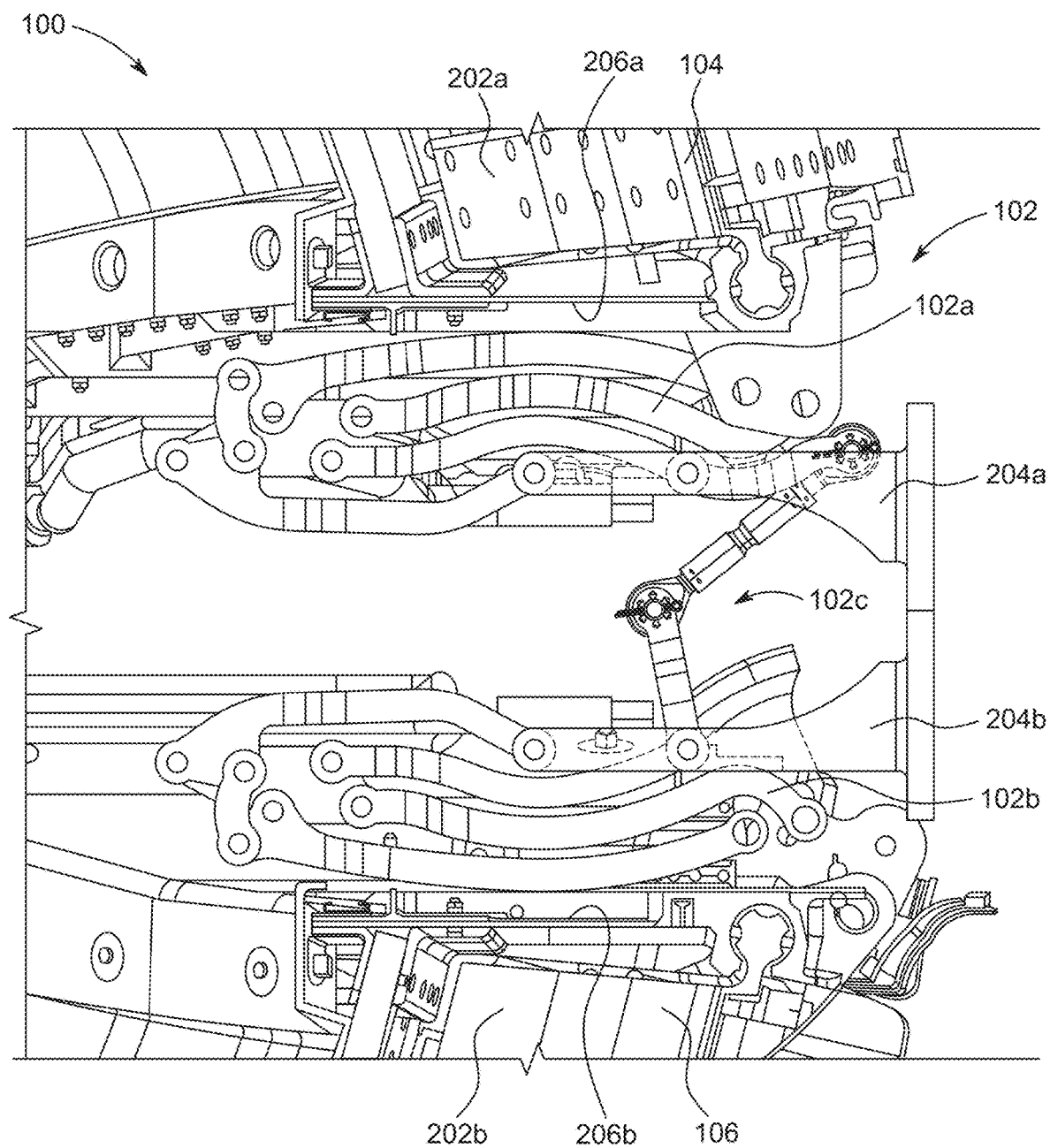
FIG. 2 is a cut-away view of the aircraft propulsion system 100 according to an embodiment of the invention.

FIG. 2 shows a cut-away view of the aircraft propulsion system 100 (looking along an axial direction of the aircraft engine fan, with inboard direction to the right and outboard direction to the left in the drawing) showing a side view of cowl mechanism 102 in fully closed position. The cowl mechanism 102 is attached to an upper cowl 104 that includes an upper cowl fan duct 202a and upper cowl sidewall 206a. The cowl mechanism 102 is also attached to a lower cowl 106 that includes a lower cowl fan duct 202b and lower cowl sidewall 206b. Further, the cowl mechanism 102 is attached to an upper pylon attachment clevis 204a and a lower pylon attachment clevis 204b, which are each fixedly attached to a portion of the aircraft structure (e.g., pylon).

Figure 3:
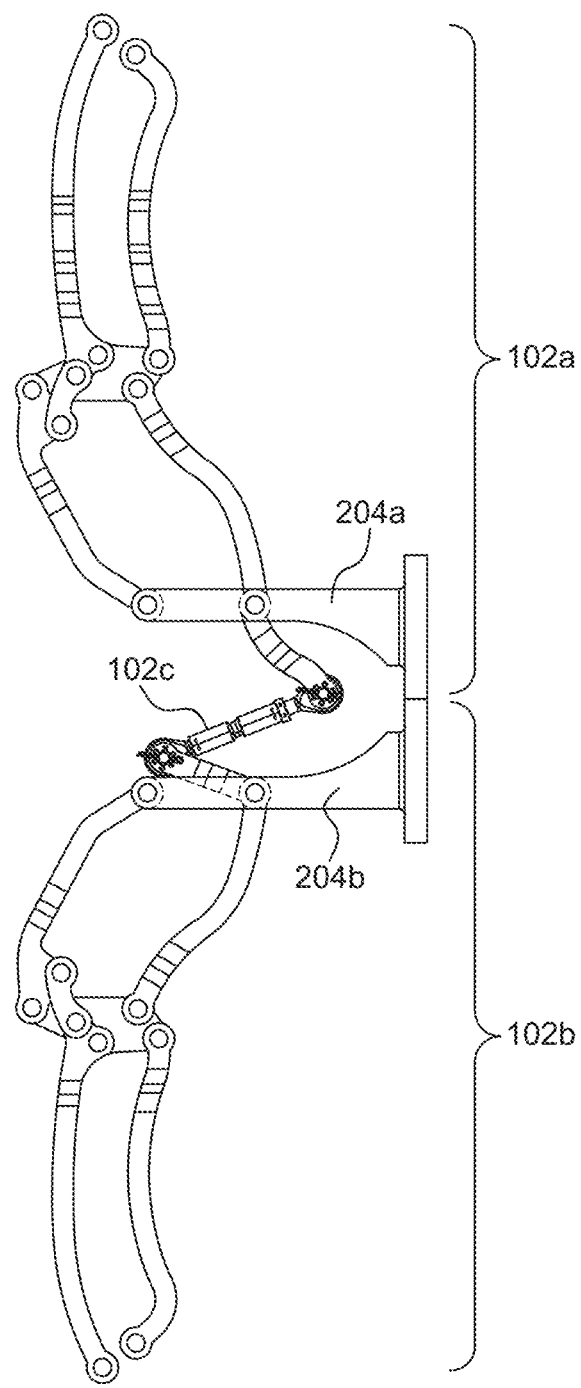
FIG. 3 is a forward looking view of the cowl mechanism 102 according to an embodiment of the invention.

FIG. 3 shows a forward looking view of the cowl mechanism 102 in an aircraft propulsion system in a left-hand (LH) position (relative to a forward-facing pilot sitting in the cockpit). The pylon, strut and fuselage are to the right in FIG. 3. The cowl mechanism 102 of FIG. 3 is in a fully opened position corresponding to the open position of the upper cowl 104 and lower cowl 106. The cowl mechanism 102 includes an upper cowl mechanism 102a and may include an optional lower cowl mechanism 102b that is connected to the upper cowl mechanism 102a by an optional mid-link mechanism 102c. Alternatively, the cowl mechanism 102 may include only one of the upper cowl mechanism 102a and lower cowl mechanism 102b.

Figure 4A:
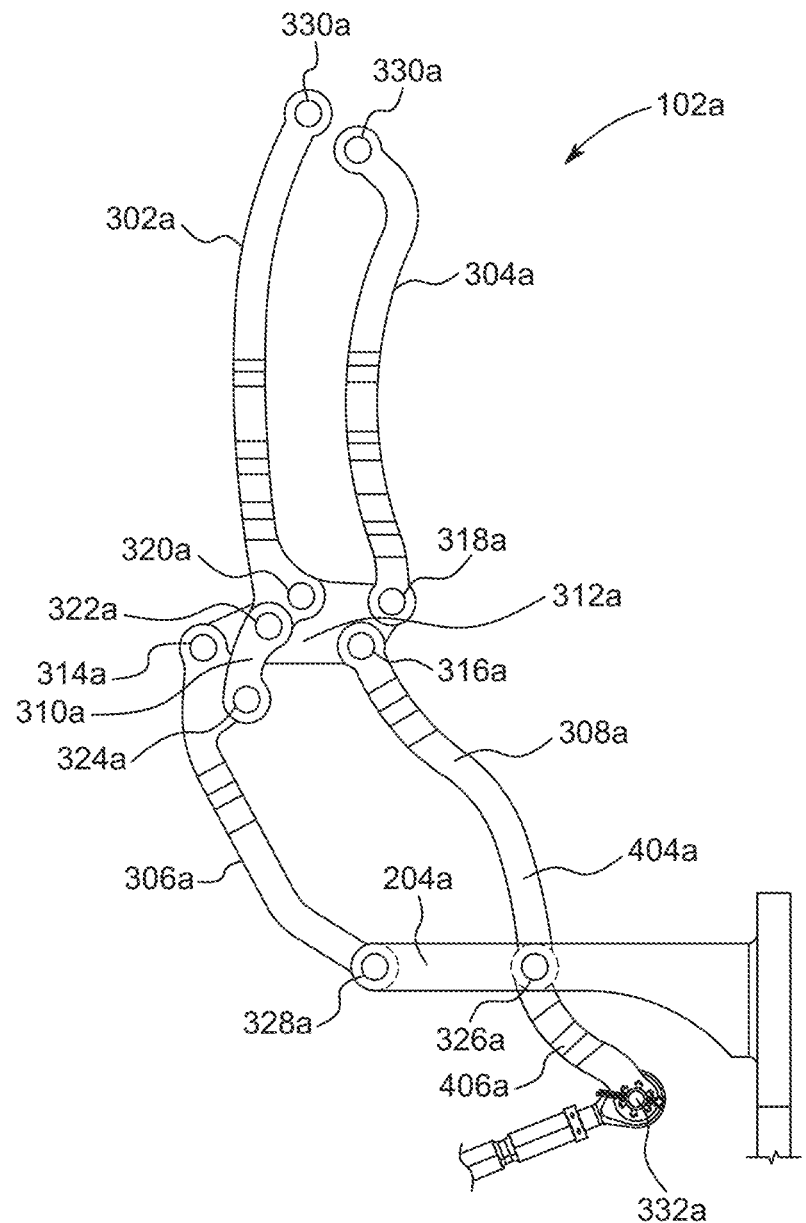
FIG. 4A is a view of the upper cowl mechanism 102a according to an embodiment of the invention.

FIG. 4A shows a side view of upper cowl mechanism 102a, which includes upper inboard cowl forked link 304a, upper outboard cowl forked link 302a, upper forward and aft drive bars 310a, upper connector plate 312a, upper inboard pylon forked link 308a, upper outboard pylon forked link 306a, and pins 314a, 316a, 318a, 320a, 322a, 324a, 326a, and 328a. Upper ends of the upper inboard cowl forked link 304a and upper outboard cowl forked link 302a are each connected to the upper cowl 104 by cowl structure by through hole attachment points 330a. A lower end of the upper inboard cowl forked link 304a (corresponding to 2308) is forked with two lugs 2316 and 2318. As further illustrated by FIG. 23, a first lug 2316 extends on a forward side (in aircraft movement direction) of the upper connector plate 312a, and a second lug 2318 extends on an aft side (in the aircraft movement direction) of the upper connector plate 312a. The first lug 2316 and second lug 2318 include coaxially aligned holes for attachment through a corresponding hole in the connector plate 312 (corresponding to upper connector plate 312a and lower connector plate 312b) by pin 320 (corresponding to 2306).

Figure 24:
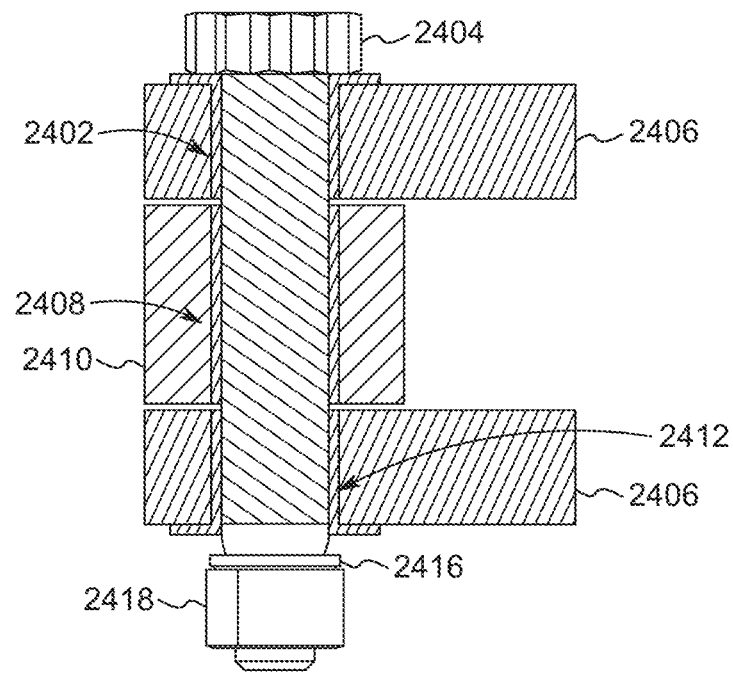
FIG. 24 is a cut-away view of an attachment point according to an embodiment of the invention.
Figure 25:
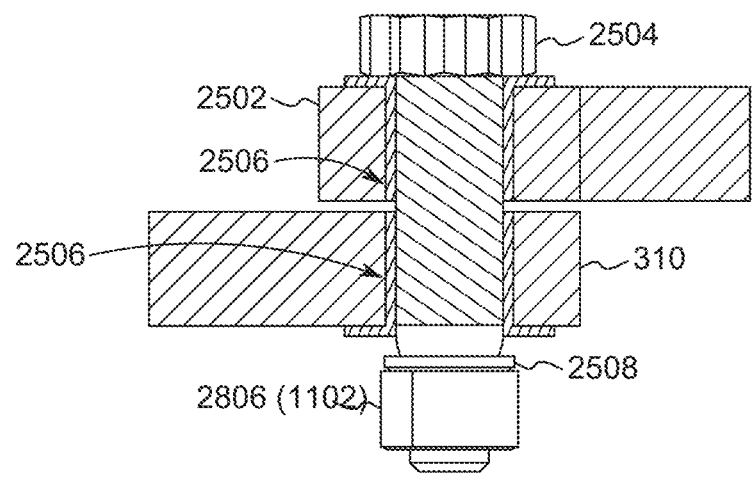
FIG. 25 is a cut-away view of an attachment point according to an embodiment of the invention.

As further shown by the detailed view of FIG. 25, a first pin 322a (corresponding to pin 2504) extends through the first lug 2502 (corresponding to 2316) and the forward drive bar 310a(602), and a second pin 322a extends through the second lug 2502 (corresponding to 2318) and the aft drive bar 310a(604). A lower end of the upper outboard pylon forked link 306a is connected by pin 328a to upper pylon attachment clevis 204a, for example as shown by the detailed view of FIG. 24. An upper end of the upper outboard pylon forked link 306a is forked with two lugs extending on forward and aft sides of the upper connector plate 312a and attached by a pin 314a that extends through corresponding coaxial holes in the lugs and the upper connector plate 312a. One lug is attached to forward drive bar 310a(602) by forward pin 324a that extends through the lug and forward drive bar 310a(602), for example as shown in the detailed view of FIG. 25. Another lug is attached to aft drive bar 310a(604) by aft pin 324a that extends through the lug and aft drive bar 310a(604), as also shown by FIG. 25. Upper inboard pylon forked link 308a includes an upper end part 404a that extends from a pylon attachment point (where pin 326a attaches the upper inboard pylon forked link 308a to the pylon attachment clevis 204a) to a connection point with the upper connector plate 312a, and a lower end part 406a that extends from the pylon attachment point to a connection point with the mid-link mechanism 102c at pin 332a.

Figure 23:
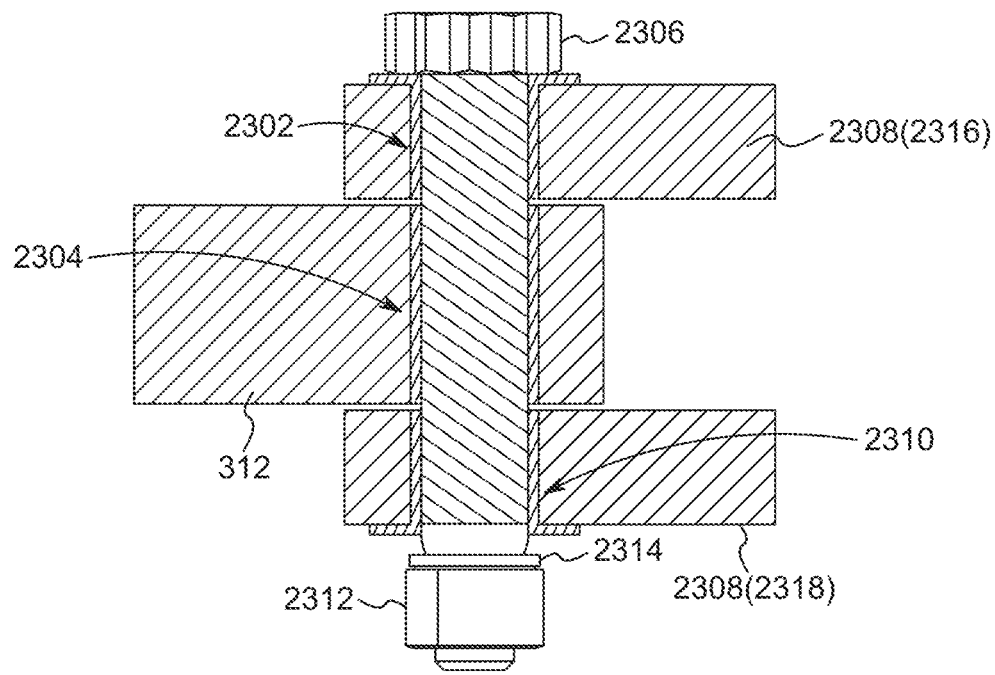
FIG. 23 is a cut-away view of an attachment point according to an embodiment of the invention.

An upper end of the upper end part 404a is forked with lugs 2316/2318 extending on forward and aft sides of the upper connector plate 312a and attached by pin 316a that extends through corresponding coaxial holes in the lugs 2316/2318 and the upper connector plate 312a, for example as shown by the detailed view of FIG. 23. The upper inboard pylon forked link 308a is rotatably attached at the pylon attachment point to the upper pylon attachment clevis 204a by pin 326a. A lower end of the lower end part 406a is attached by pin 332a to mid-link mechanism 102c.

Figure 4B:
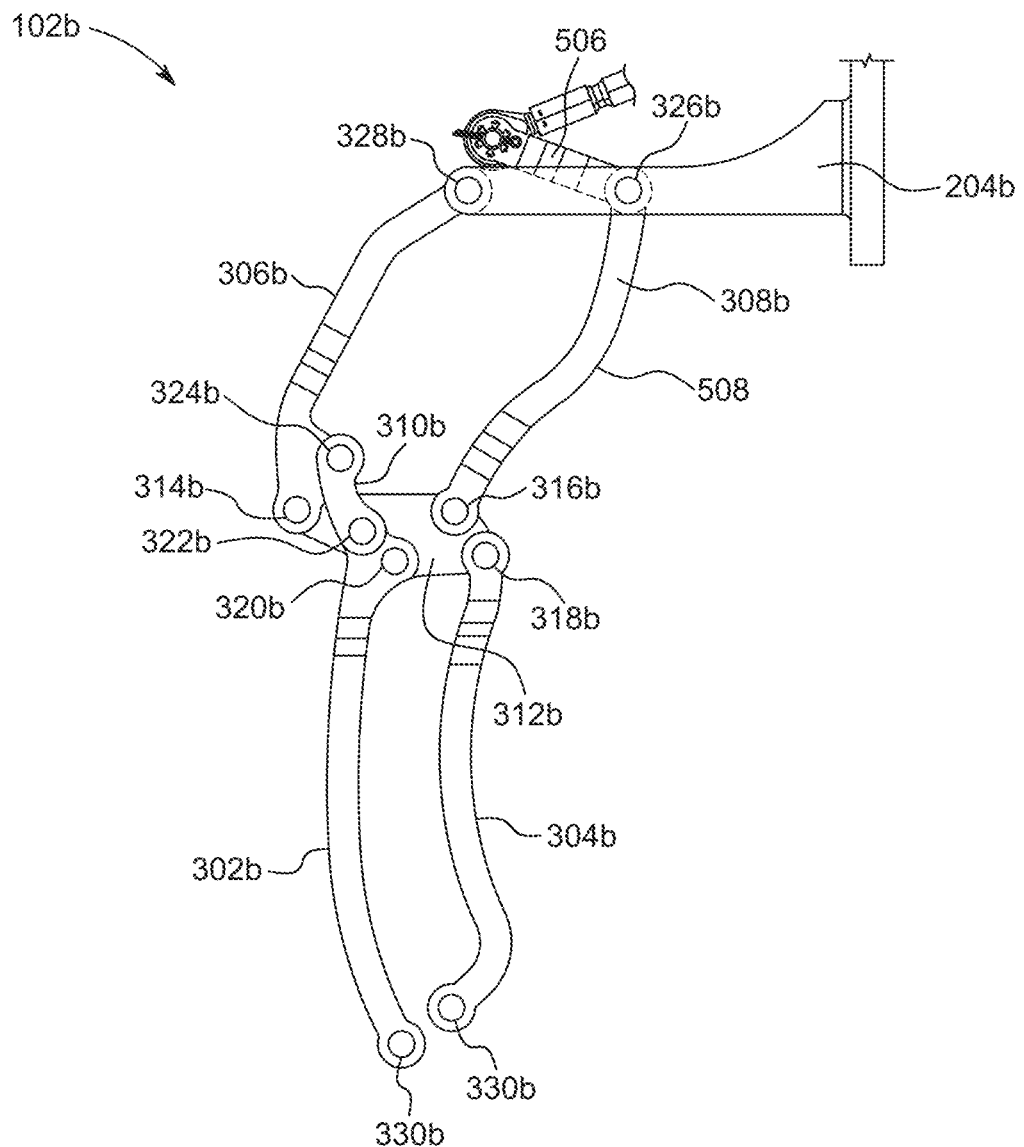
FIG. 4B is a view of the lower cowl mechanism 102b according to an embodiment of the invention.

FIG. 4B shows a side view of lower cowl mechanism 102b, which includes lower inboard pylon forked link 308b, lower outboard pylon forked link 306b, lower drive bars 310b, lower connector plate 312b, lower inboard cowl forked link 304b, lower outboard cowl forked link 302b, and pins 314b, 316b, 318b, 320b, 322b, 324b, 326b, and 328b. Lower ends of the lower inboard cowl forked link 304b and lower outboard cowl forked link 302b are each connected to a forked attachment structure on the lower cowl 106 by through hole attachment points 330b.

Figure 5:
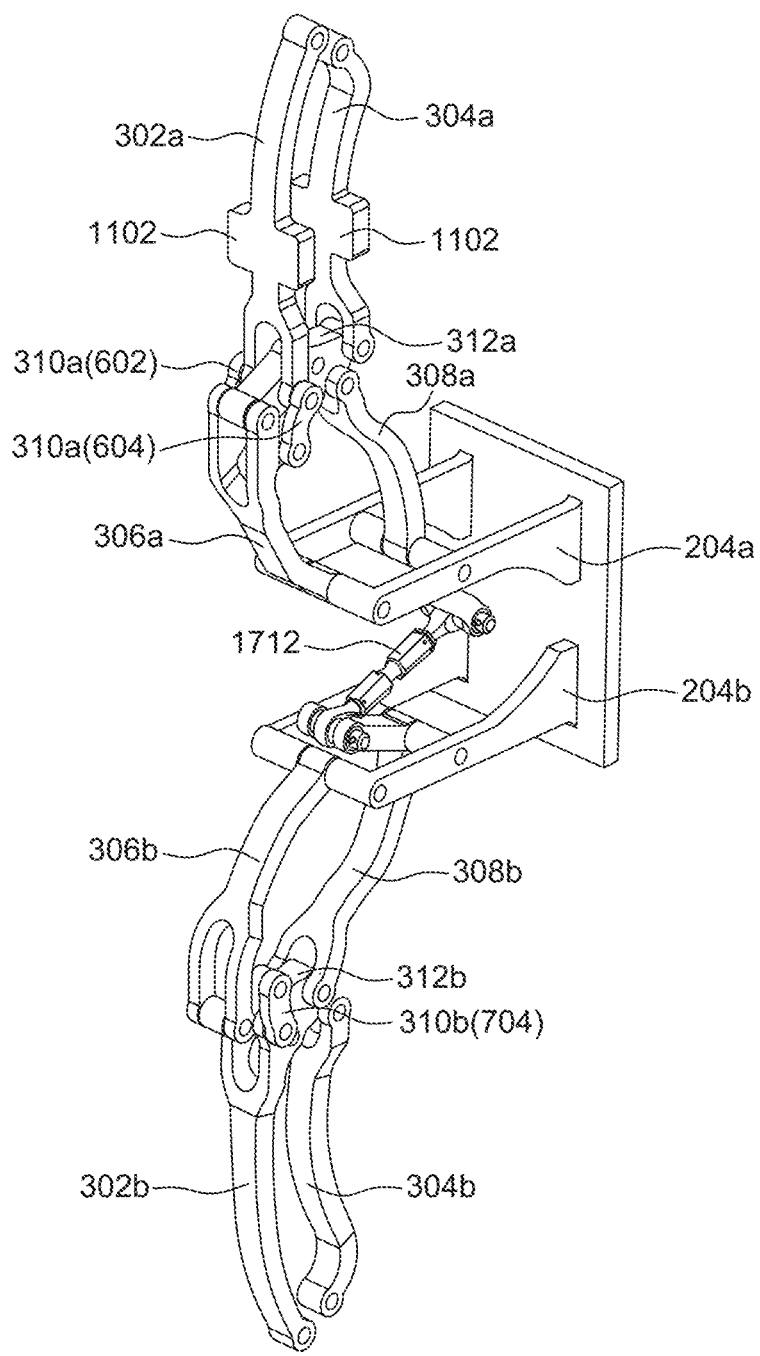
FIG. 5 is an isometric view of the cowl mechanism 102 according to an embodiment of the invention.

FIG. 5 shows an isometric view of the cowl mechanism 102.

The components of the lower cowl mechanism 102b are generally equivalent to the corresponding components of the upper cowl mechanism. However, as shown in the embodiment of FIG. 4B, the shape of the lower inboard pylon forked link 308b may be different from a shape of the upper inboard pylon forked link 308a. Lower inboard pylon forked link 308b includes an upper end part 506 and a lower end part 508, separated by a pylon attachment point at pin 326b. The upper end part 506 extends generally perpendicular to the lower end part 508. Conversely, the upper end part 404a and lower end part 406a of the upper inboard pylon forked link 308a extend in generally the same direction. Although, the upper end part 506 extends generally perpendicular to the lower end part 508 in this embodiment, the invention encompasses other angular arrangements between the upper end part 506 and the lower end part 508. For example, the angle may be larger or smaller than perpendicular. Also, the invention encompasses arrangements in which the upper and lower links have the same shape/bend angle, and where the upper cowl mechanism 102a is a mirror image copy of the lower cowl mechanism 102b.

Figure 6A:
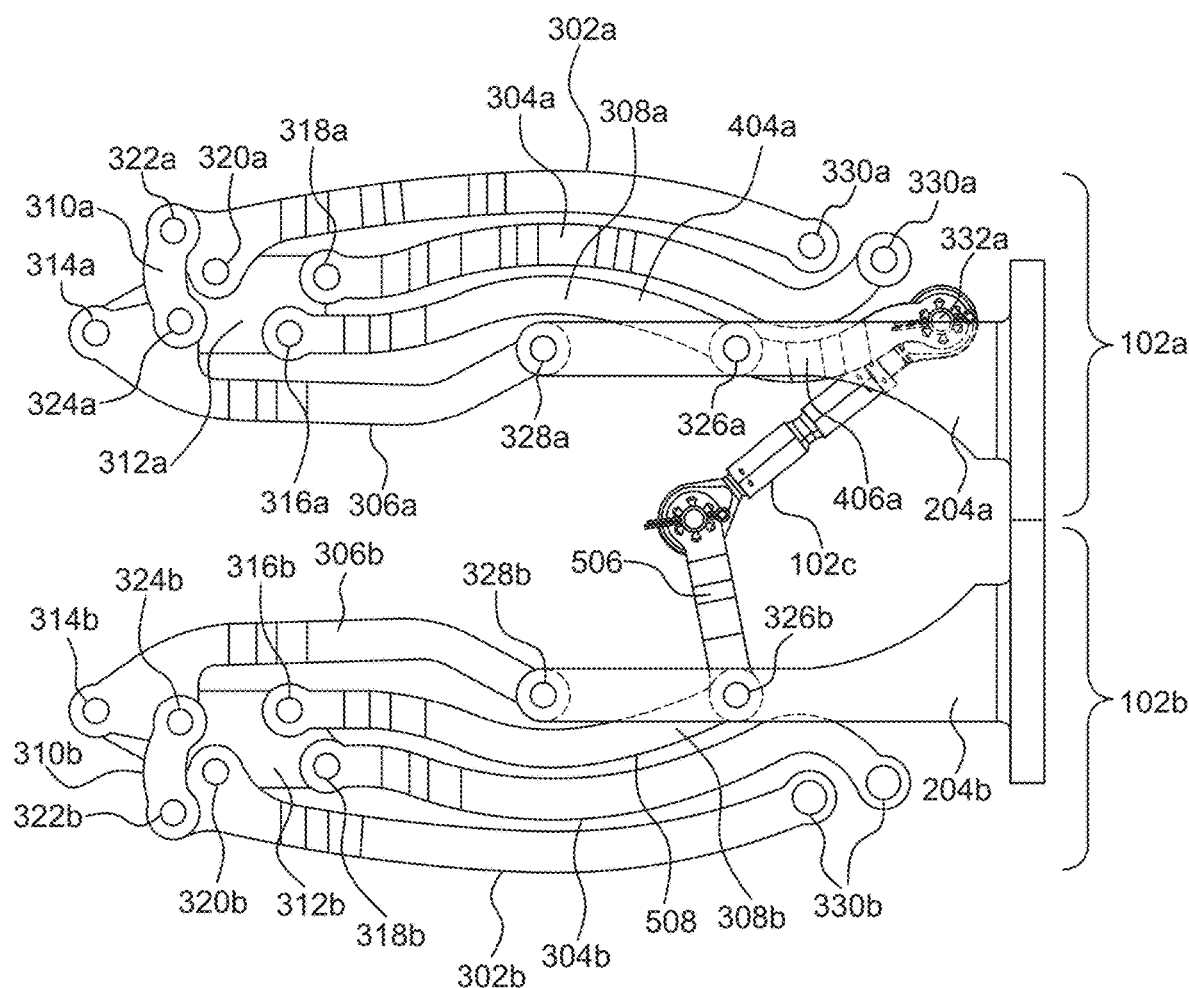
FIG. 6A is a view of the cowl mechanism 102 in a closed position according to an embodiment of the invention.
Figure 6B:
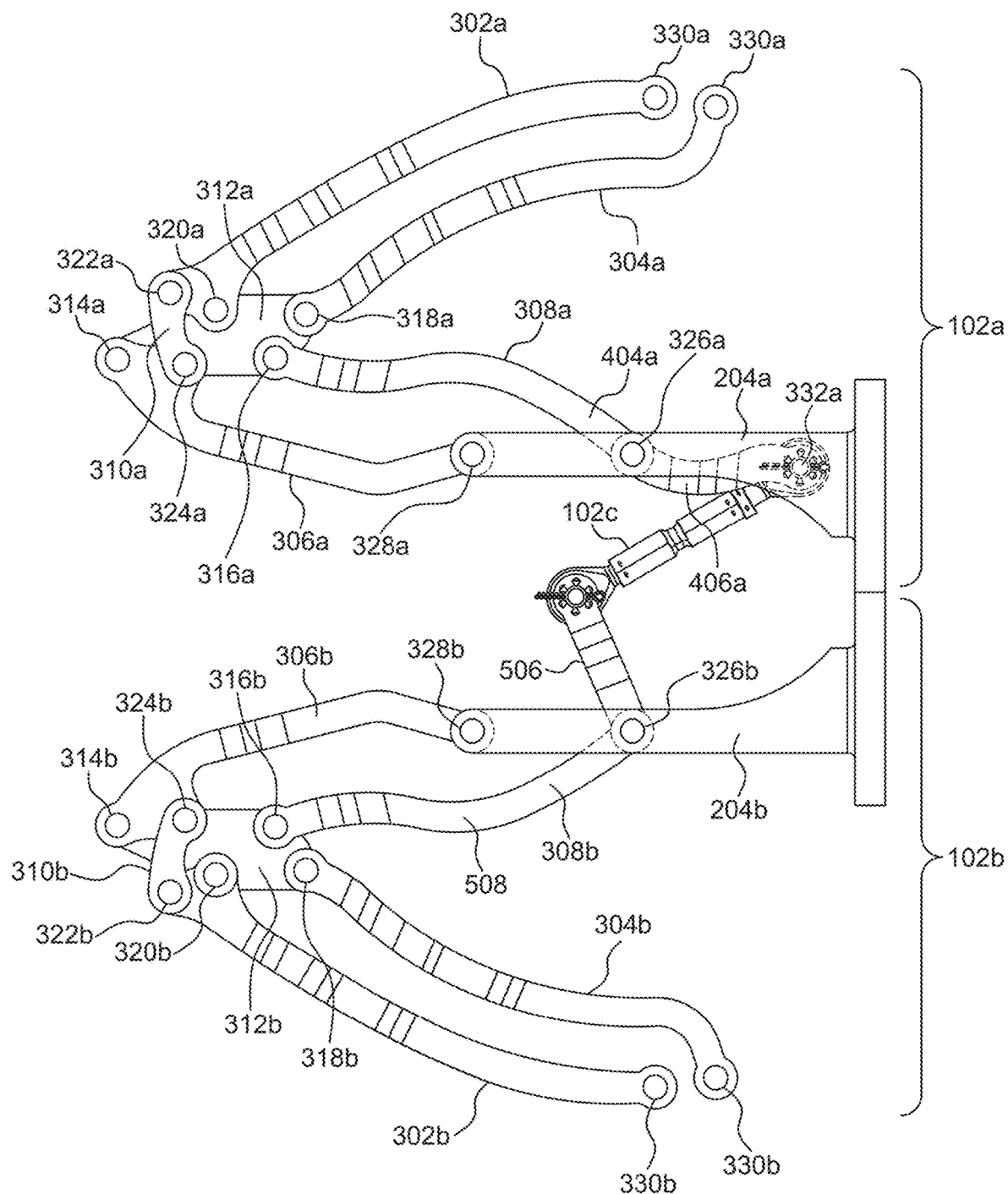
FIG. 6B is a view of the cowl mechanism 102 in a position between the closed position and the open position according to an embodiment of the invention.
Figure 6C:
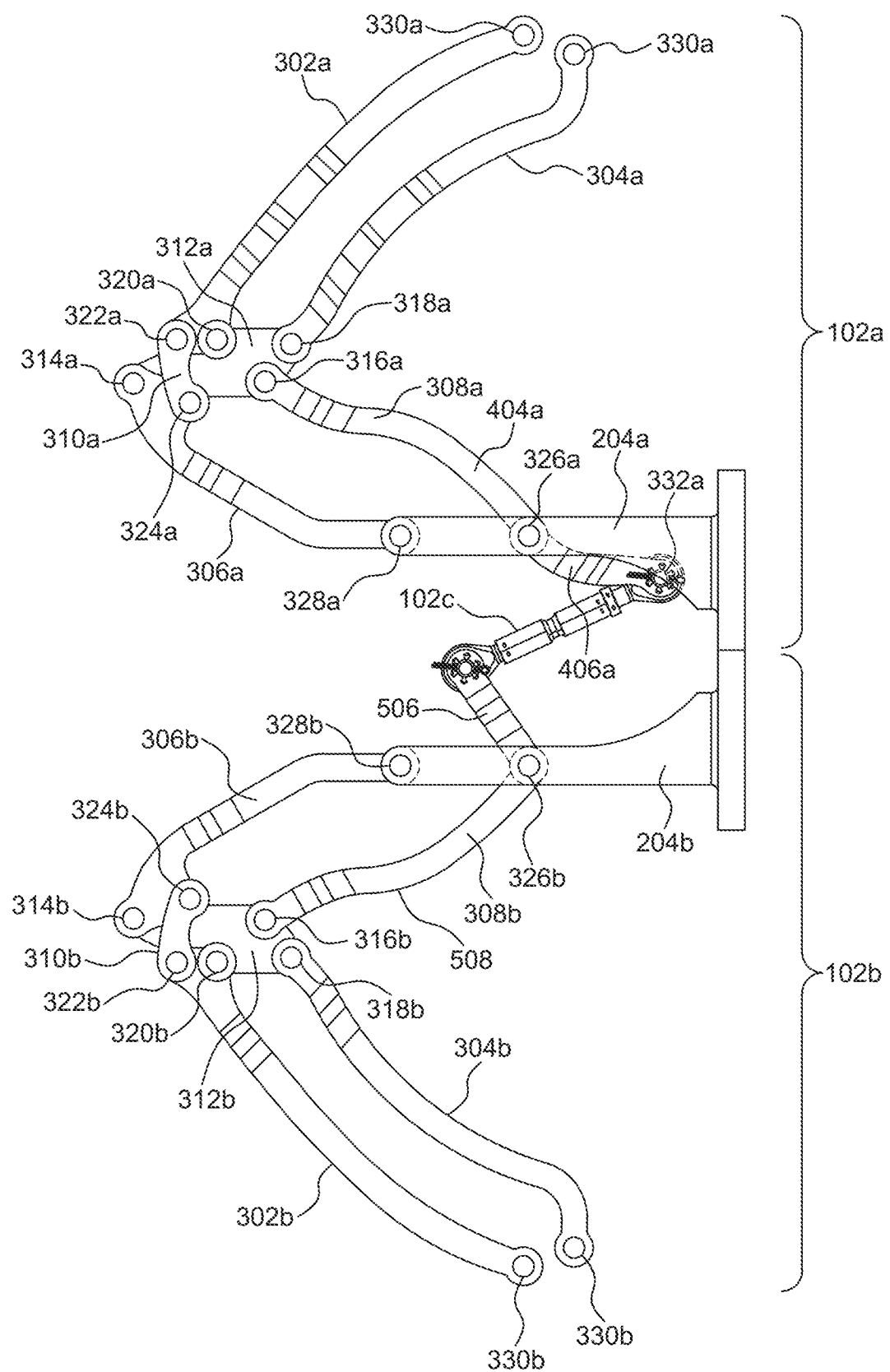
FIG. 6C is a view of the cowl mechanism 102 in a position between the closed position and the open position according to an embodiment of the invention.
Figure 6D:
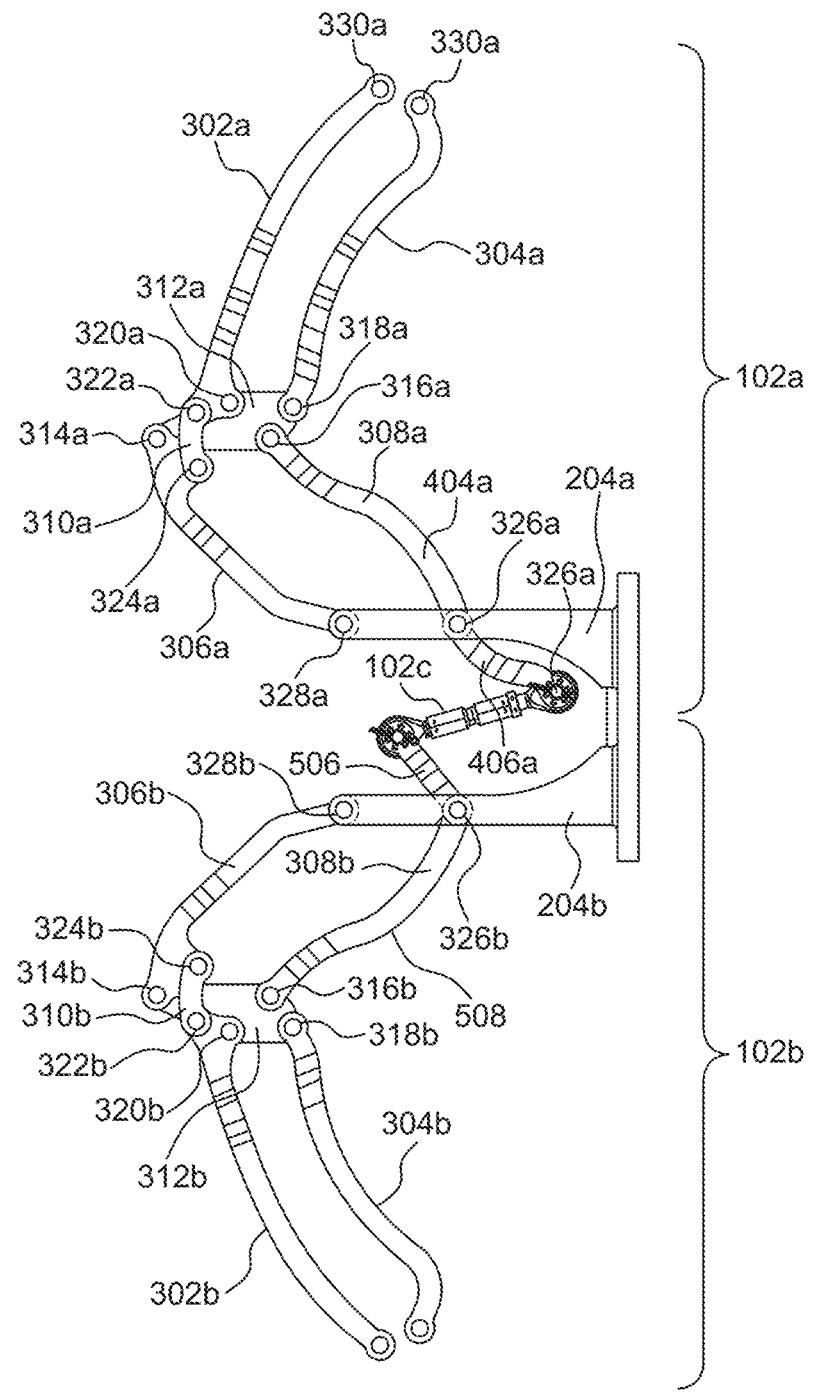
FIG. 6D is a view of the cowl mechanism 102 in a position between the closed position and the open position according to an embodiment of the invention.
Figure 6E:
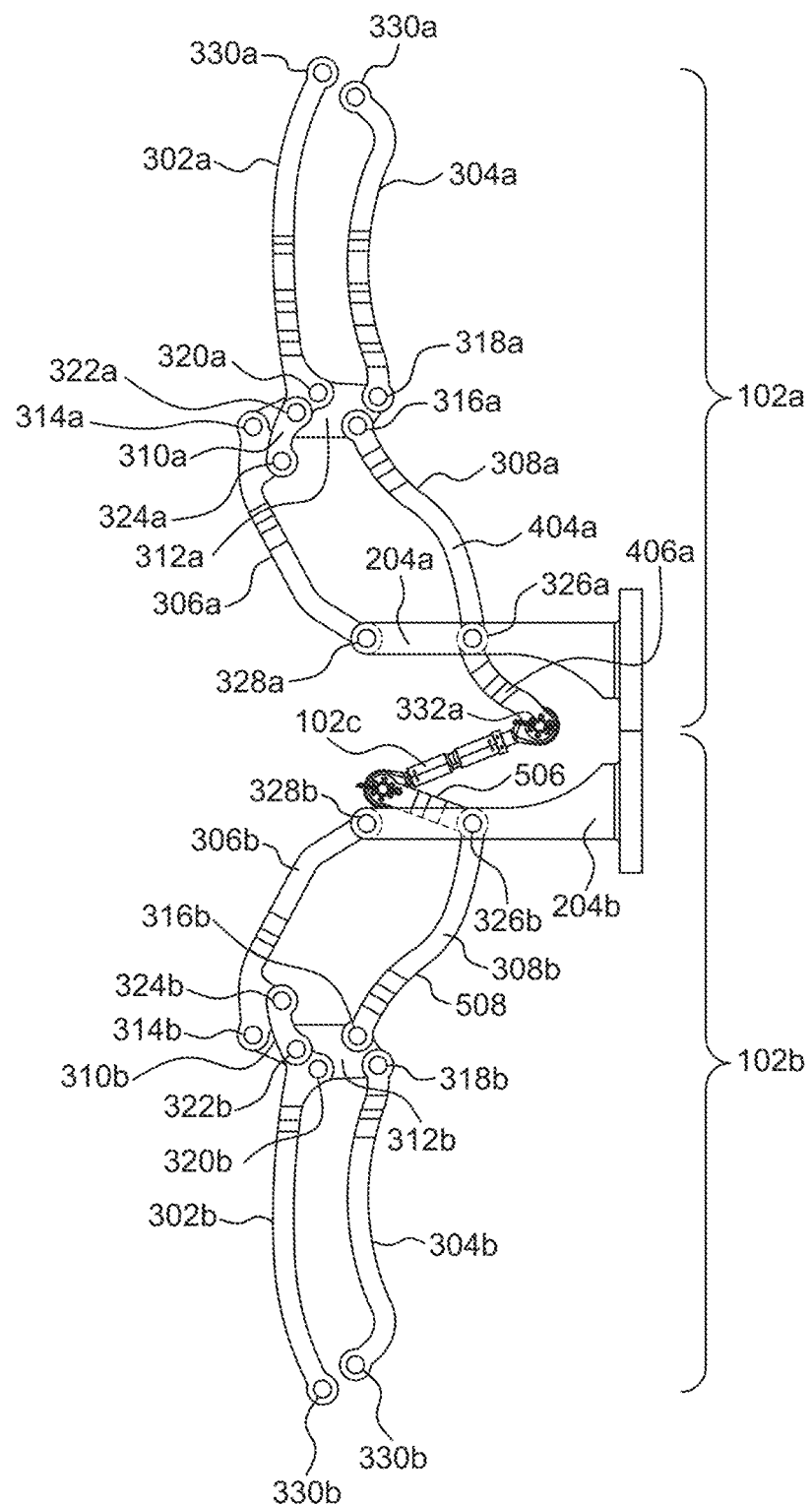
FIG. 6E is a view of the cowl mechanism 102 in the open position according to an embodiment of the invention.

FIGS. 6A-6E show side views of the cowl mechanism 102 at various cowl positions from a fully closed position in FIG. 6A through intermediate positions in FIGS. 6B-6D, to a fully opened position in FIG. 6E. In the closed position, the entire cowl mechanism 102 is arranged entirely between the fan duct upper sidewall 206a and fan duct lower sidewall 206b. The layout and shape of the links relative to their attachments to the connector plate, the cowl and the pylon structure allows for the collapsed links (i.e., when the cowl is in the fully closed position) to be packaged within the upper and lower cowl sidewalls, for example as shown in FIG. 2. The links have curved features to allow for the links to be clear of the attachment pins/shoulder bolts (and associated attachment hardware, such as washers and nuts) when the cowl mechanism 102 is in the collapsed, fully closed position. The cowl mechanism 102 allows for the same fan duct aero lines of a typical hinged thrust reverser to be utilized in a close coupled engine/pylon configuration. The position of the pylon attachment points to links with the upper cowl mechanism 102a relative to the plate attachments at pins 318 and 320 are set to translate and rotate the connector plate 312 away from the pylon attachment structure which is near the engine center WL plane. Similarly, the position of the link attachments to the connector plate at pins 314 and 316 relative to the cowl-to-link attachments are set to translate and rotate the cowl away from the moving connector plate 312.

An opening path of each cowl is dictated by a corresponding cowl mechanism 102a/102b, the mid-link mechanism 102c, and the connection between the pylon and cowl sidewall structure relative to the connector plate 312. As the upper cowl 104 and lower cowl 106 are unlatched at the outboard split line 128, plate 312b will start to drop due to the force of gravity acting on the lower cowl 106, because a weight of the lower cowl 106 is typically greater than a weight of the upper cowl 104. Even if the cowls have similar weights, the cowls can be relatively easily separated by a single individual, without additional powered or mechanical assistance, who applies an opening force to the cowls (i.e., a downward force on the lower cowl 106 or an upward force on the upper cowl 104), because the cowls are interconnected and cantilevered/counterbalanced by the mid-link mechanism 102c. The force required to move the cowls between the open and closed position is less than a maximum force than can be manually and safely applied by a single individual, for example as defined by MIL-STD-1472 (Human Engineering), or preferably less than 25 pounds of force, or more preferably 20 pounds of force.

A translation of each cowl relative to the corresponding connector plate 312 is controlled by the corresponding inboard and outboard cowl forked links 306/308. The motion of the connector plate 312 relative to the corresponding fixed pylon attachment clevis 204 is controlled by the outboard pylon forked link 306 that is attached to the outboard cowl forked link 302 by the pair of drive bars 310 along with the inboard pylon forked link 308. A counter-clockwise rotation of the inboard pylon forked link 308b about its pylon attachment point occurs as the cowls open, and simultaneously, the upper inboard pylon forked link 308a rotates in a clockwise direction around its pylon attachment point.

Figure 7A:
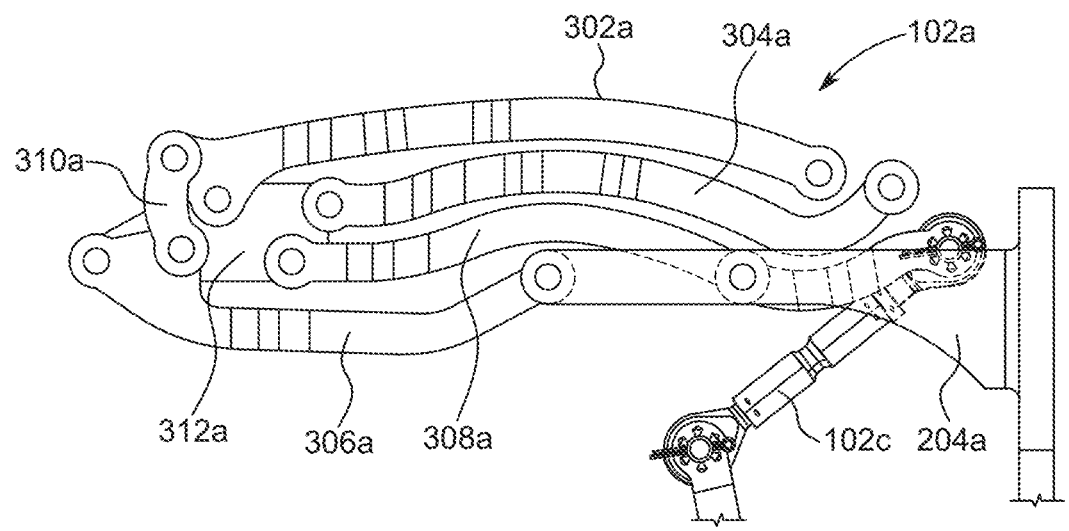
FIG. 7A is a forward looking view of the upper cowl mechanism 102a in the closed position according to an embodiment of the invention.
Figure 7B:
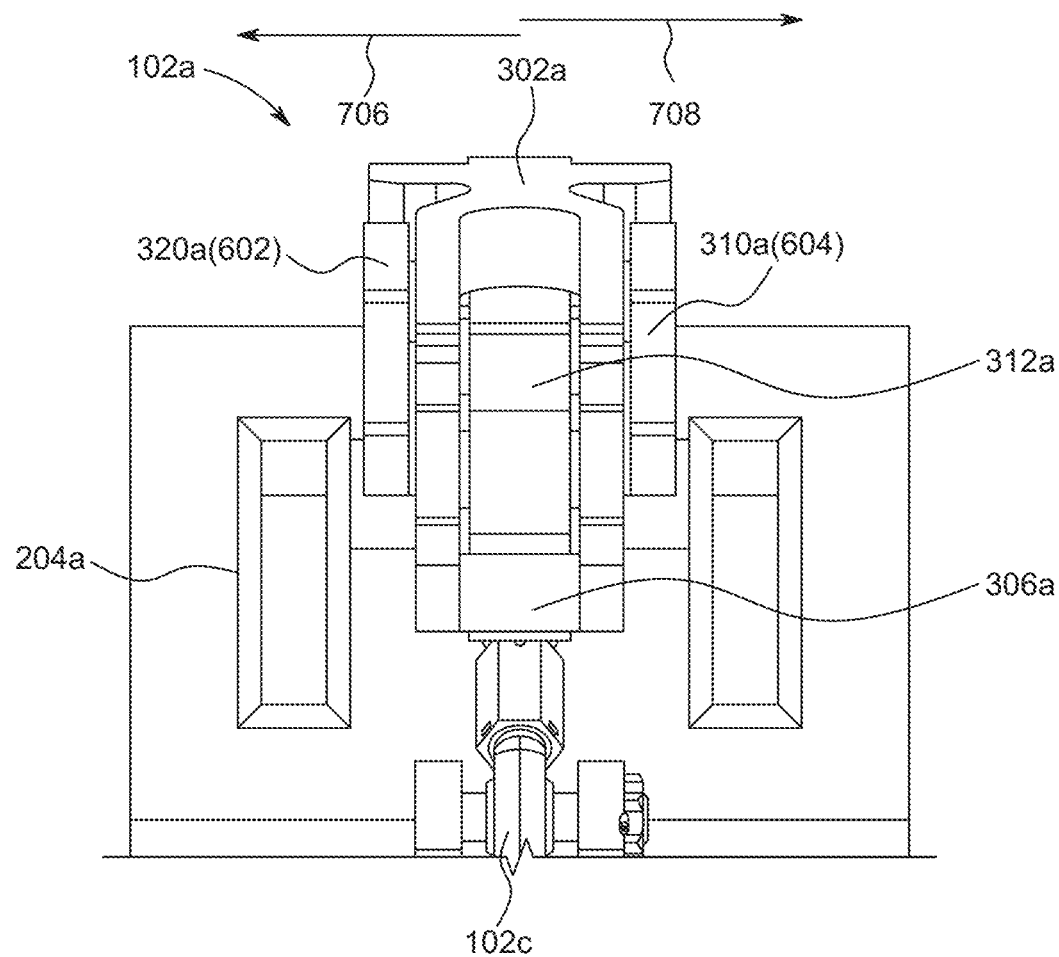
FIG. 7B is a view of the upper cowl mechanism 102a in the closed position.
Figure 8A:
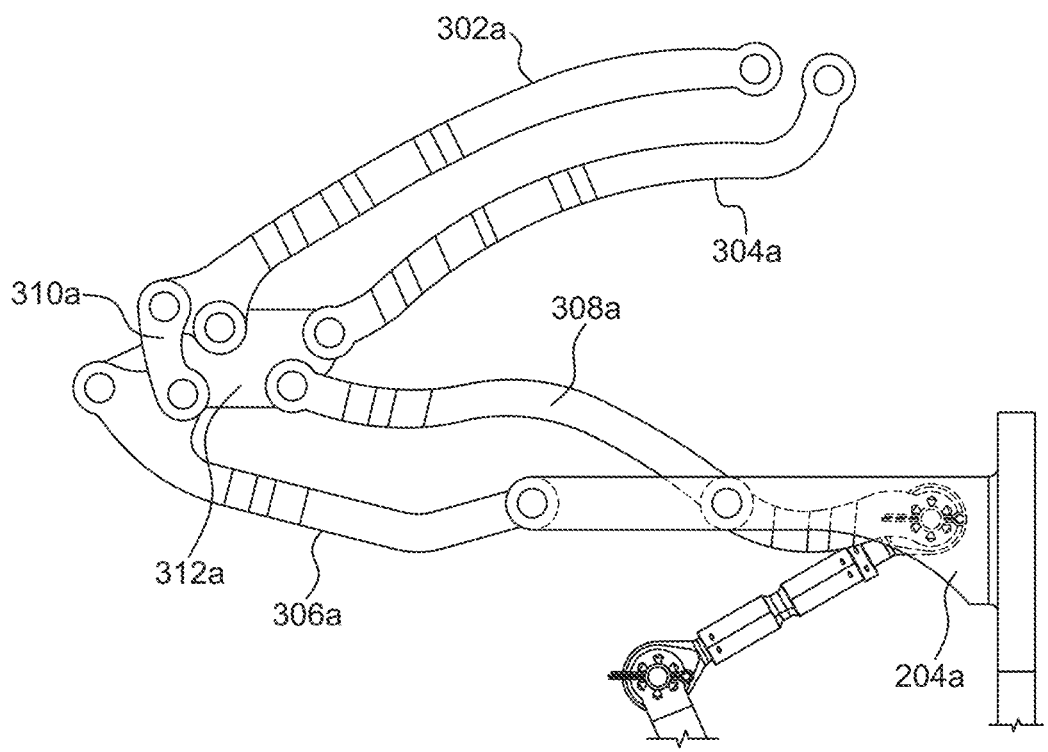
FIG. 8A is a forward looking view of the upper cowl mechanism 102a in a position between the closed position and the open position according to an embodiment of the invention.
Figure 8B:
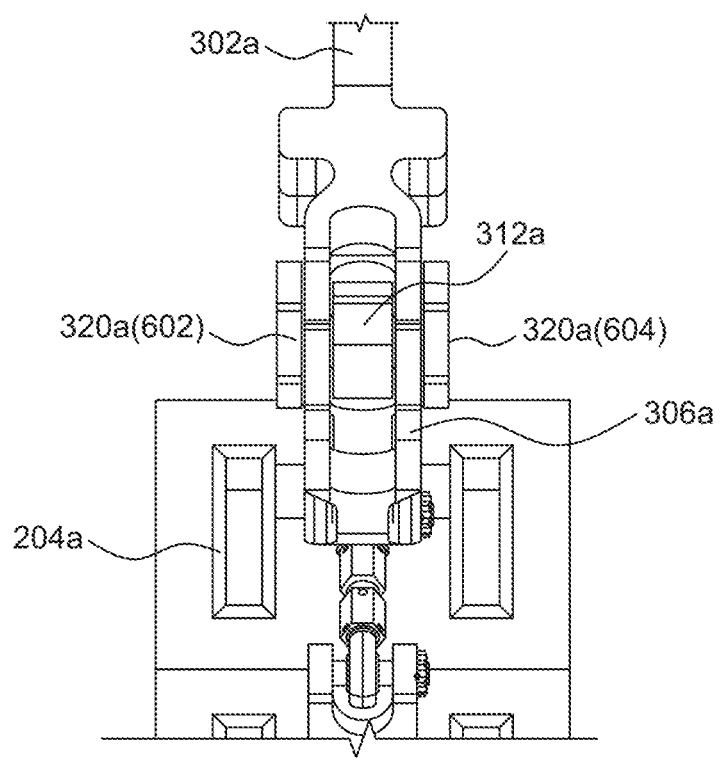
FIG. 8B is a view of the upper cowl mechanism 102a in the position of FIG. 8A.
Figure 9A:
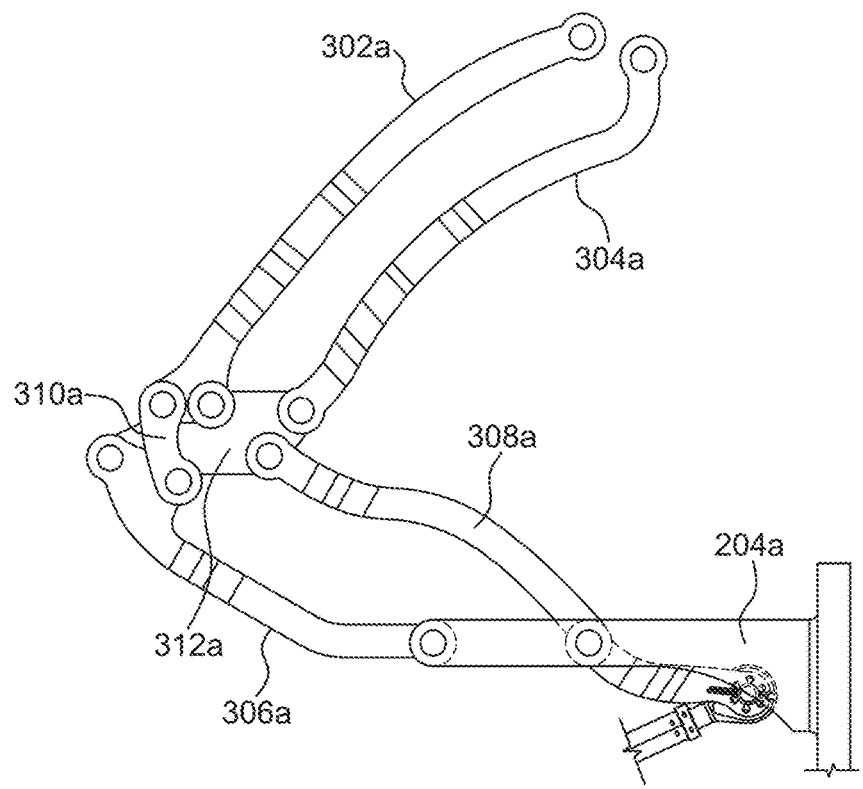
FIG. 9A is a forward looking view of the upper cowl mechanism 102a in a position between the closed position and the open position according to an embodiment of the invention.
Figure 9B:
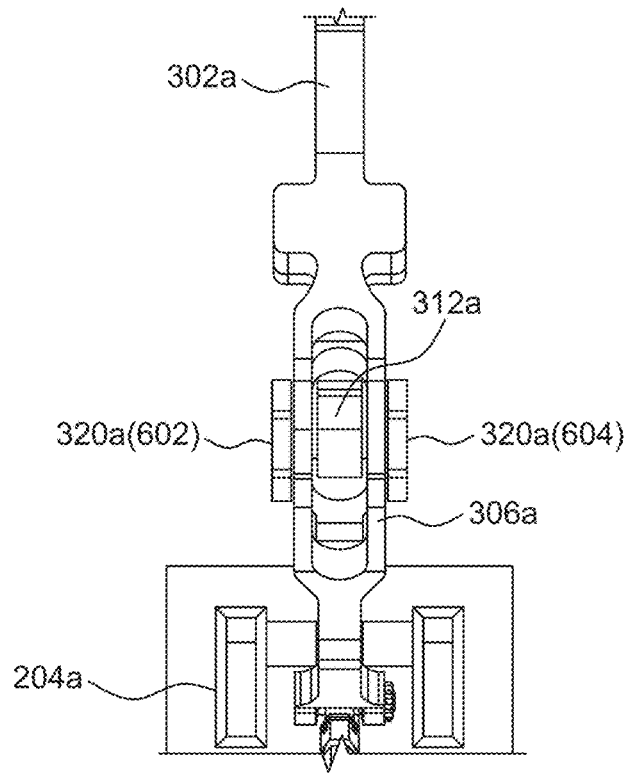
FIG. 9B is a view of the upper cowl mechanism 102a in the position of FIG. 9A.
Figure 10A:
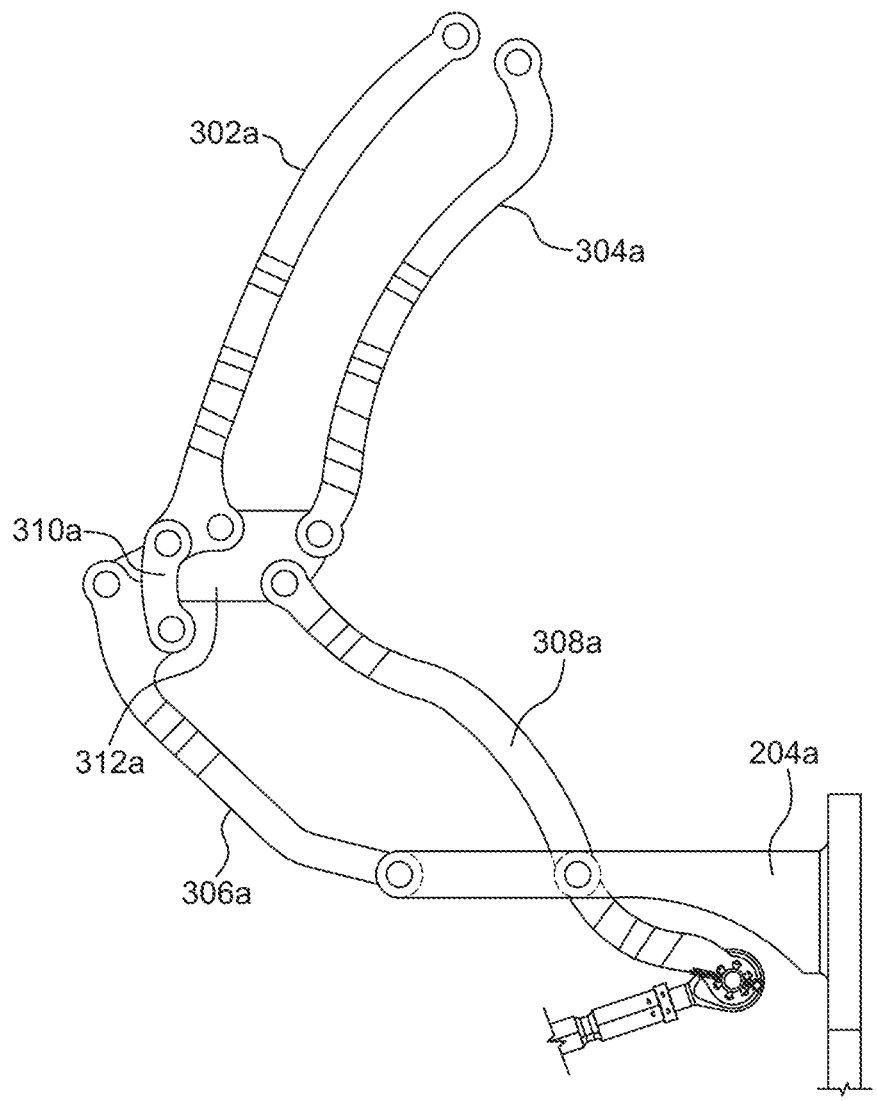
FIG. 10A is a forward looking view of the upper cowl mechanism 102a in a position between the closed position and the open position according to an embodiment of the invention.
Figure 10B:
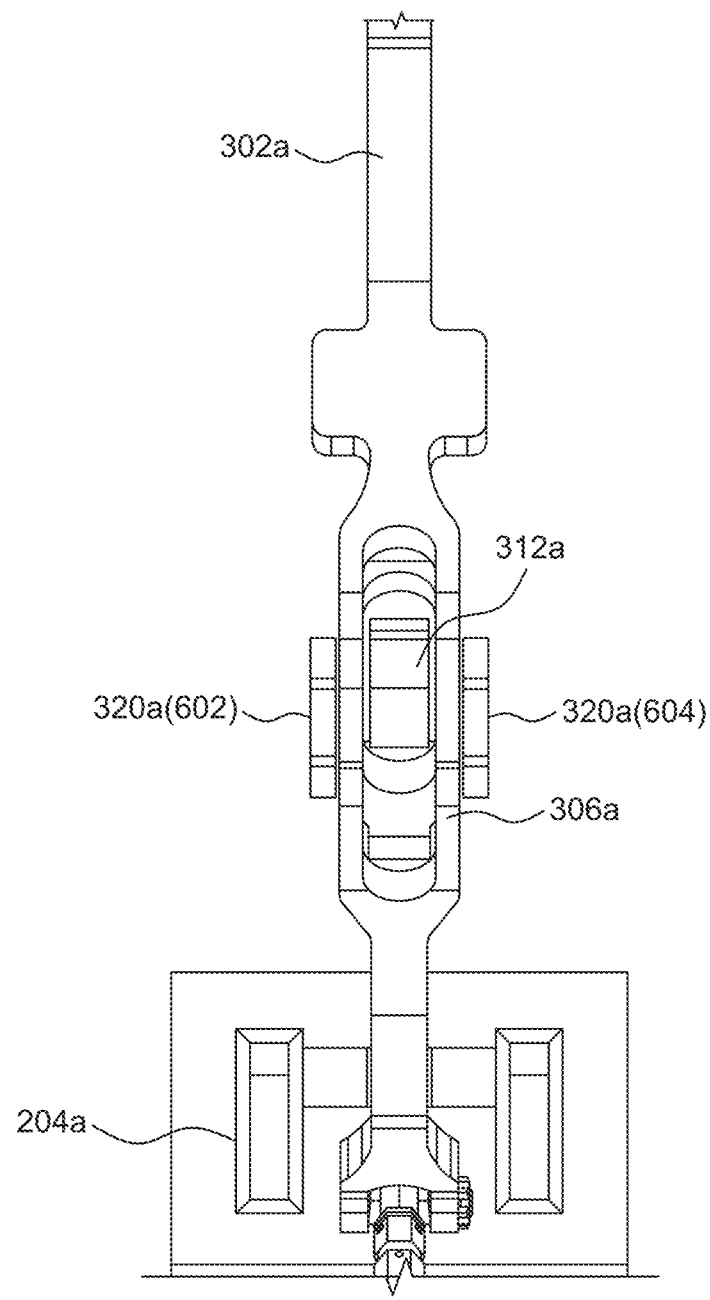
FIG. 10B is a view of the upper cowl mechanism 102a in the position of FIG. 10A.
Figure 11A:
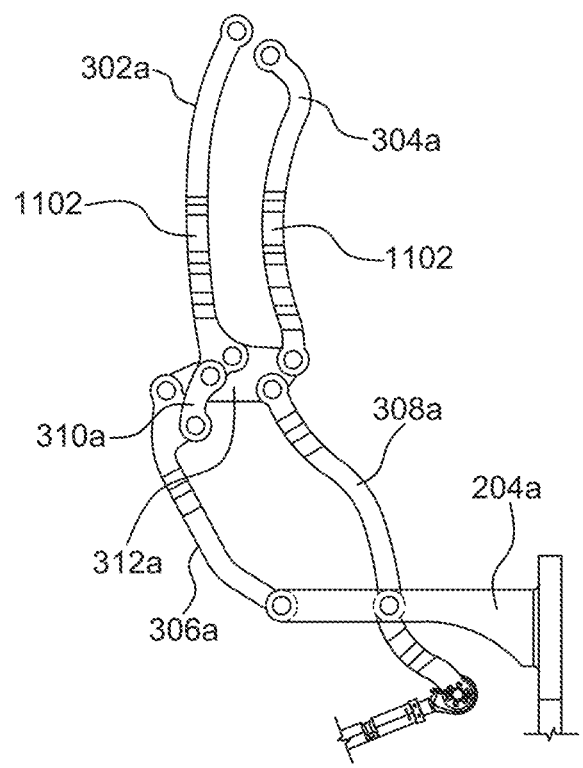
FIG. 11A is a forward looking view of the upper cowl mechanism 102a in the open position according to an embodiment of the invention.

FIGS. 7A, 8A, 9A, 10A, and 11A show detailed side views of the upper cowl mechanism 102a at various positions from a fully closed position in FIG. 7A to a fully opened position in FIG. 11A. FIGS. 7B, 8B, 9B, 10B, and 11B show detailed views looking inboard toward the pylon of the upper cowl mechanism 102a at positions corresponding to FIGS. 7A, 8A, 9A, 10A, and 11A, respectively, with the forward direction 706 towards the left in the drawing and the aft direction 708 towards the right in the drawing. FIG. 7B shows the relative arrangement of upper forward drive bar 602 and upper aft drive bar 604, each corresponding to upper drive bars 310a.

Figure 12A:
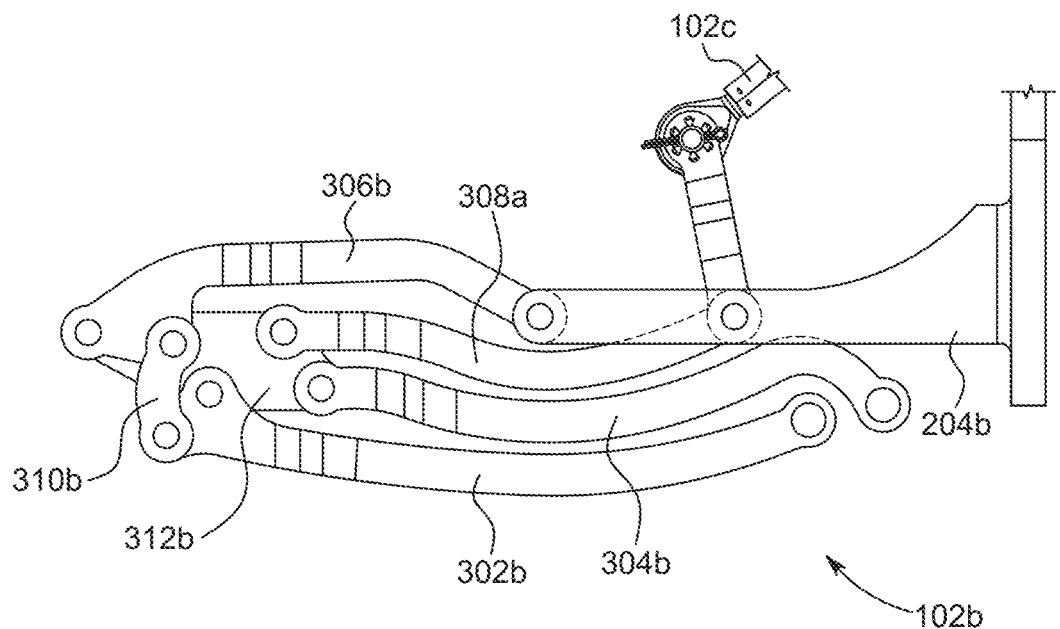
FIG. 12A is a forward looking view of the lower cowl mechanism 102b in the closed position according to an embodiment of the invention.
Figure 12B:
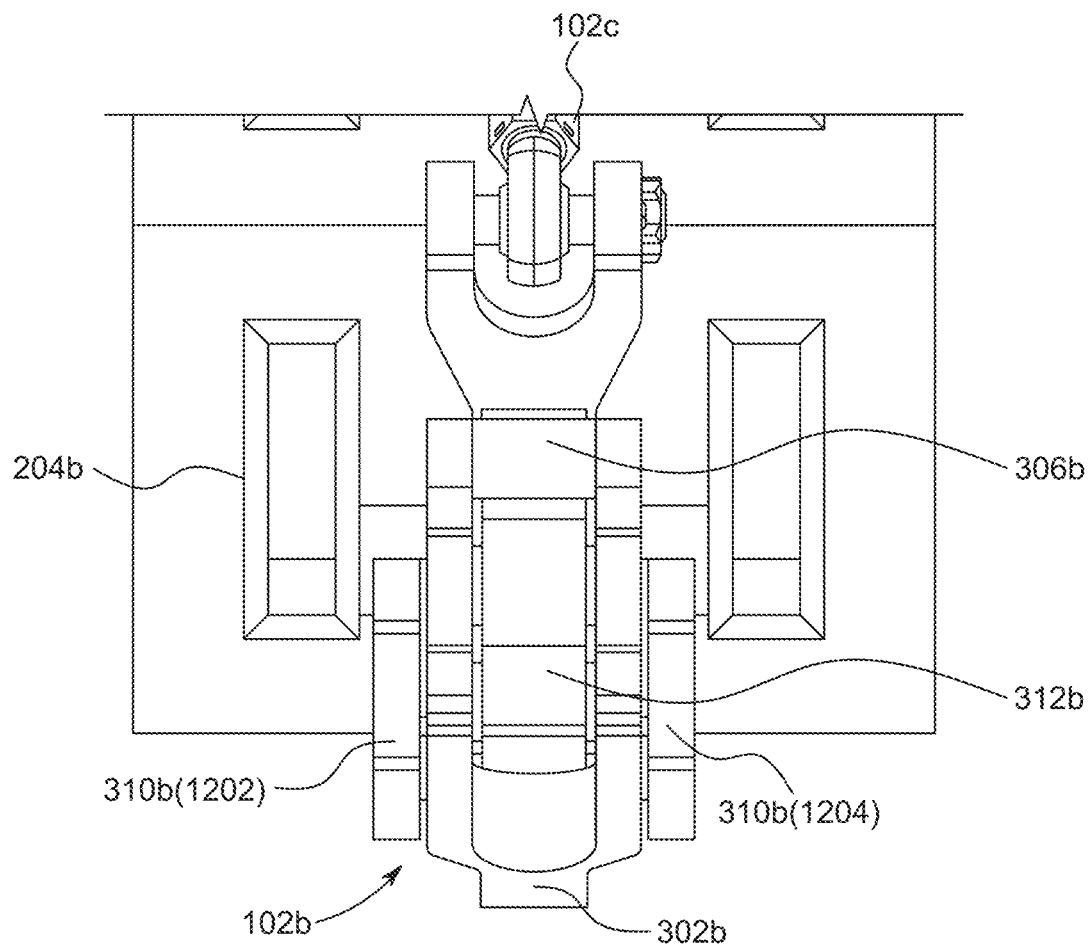
FIG. 12B is a view of the lower cowl mechanism 102b in the closed position.
Figure 13A:
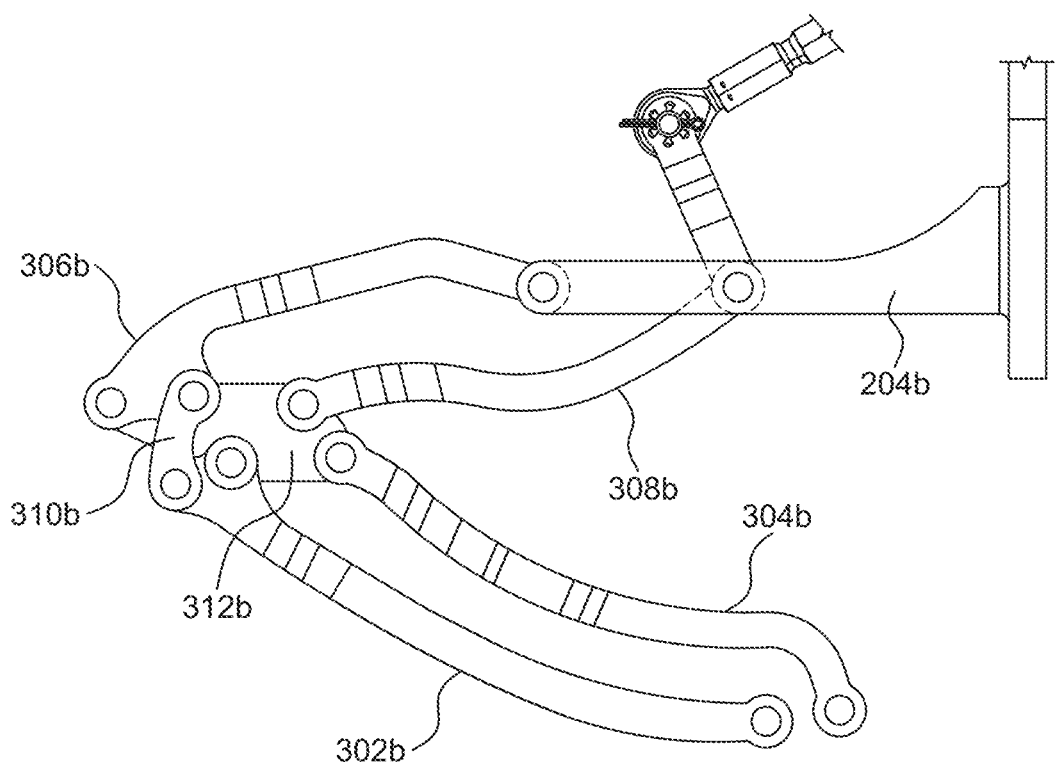
FIG. 13A is a forward looking view of the lower cowl mechanism 102b in a position between the closed position and the open position according to an embodiment of the invention.
Figure 13B:
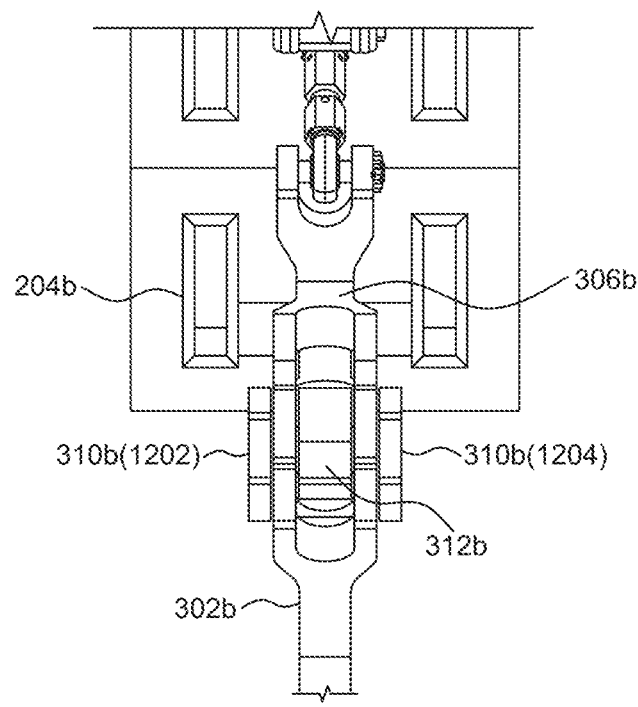
FIG. 13B is a view of the lower cowl mechanism 102b in the position of FIG. 13A.
Figure 14A:
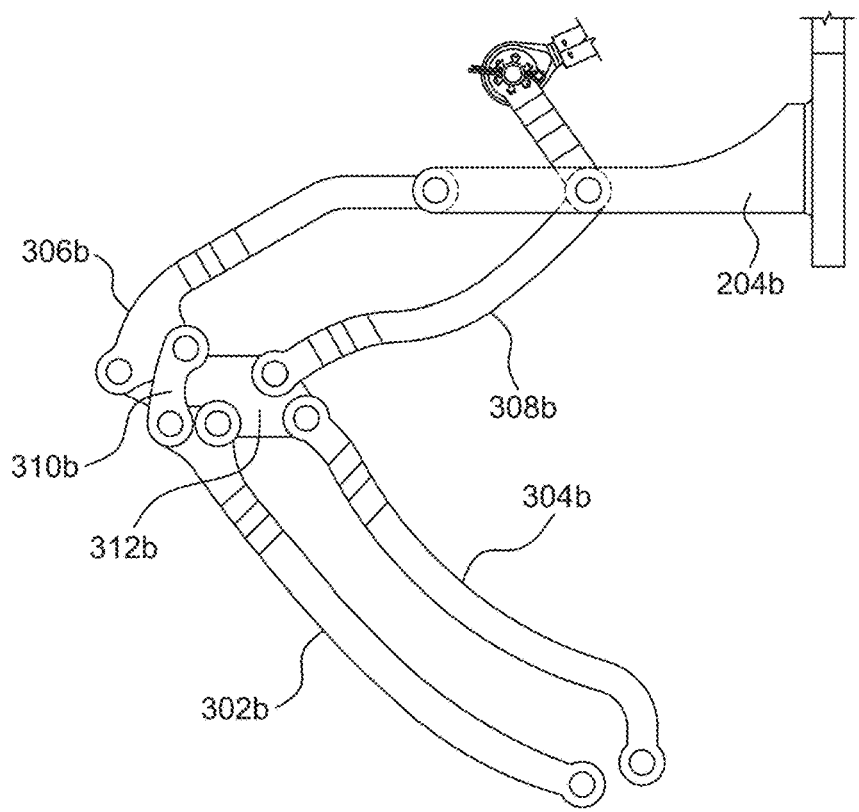
FIG. 14A is a forward looking view of the lower cowl mechanism 102b in a position between the closed position and the open position according to an embodiment of the invention.
Figure 14B:
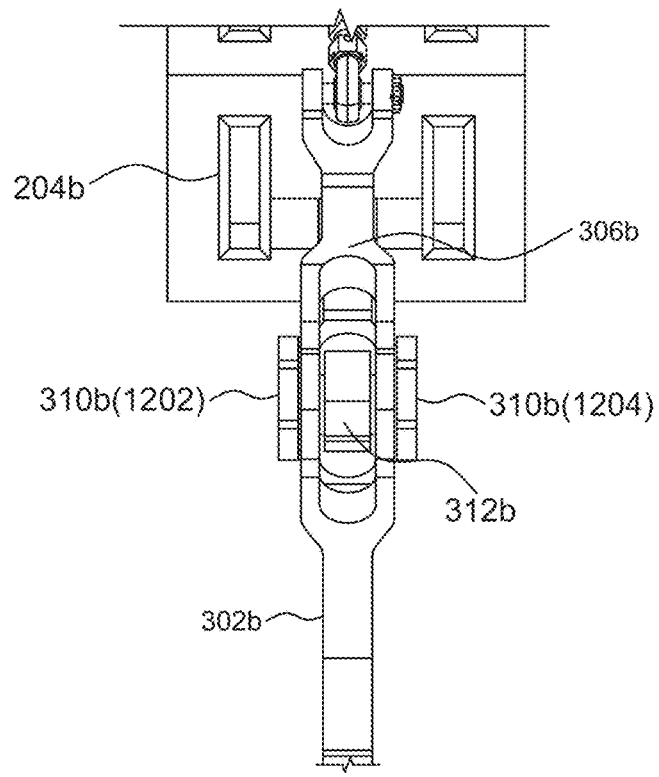
FIG. 14B is a view of the lower cowl mechanism 102b in the position of FIG. 14A.
Figure 15A:
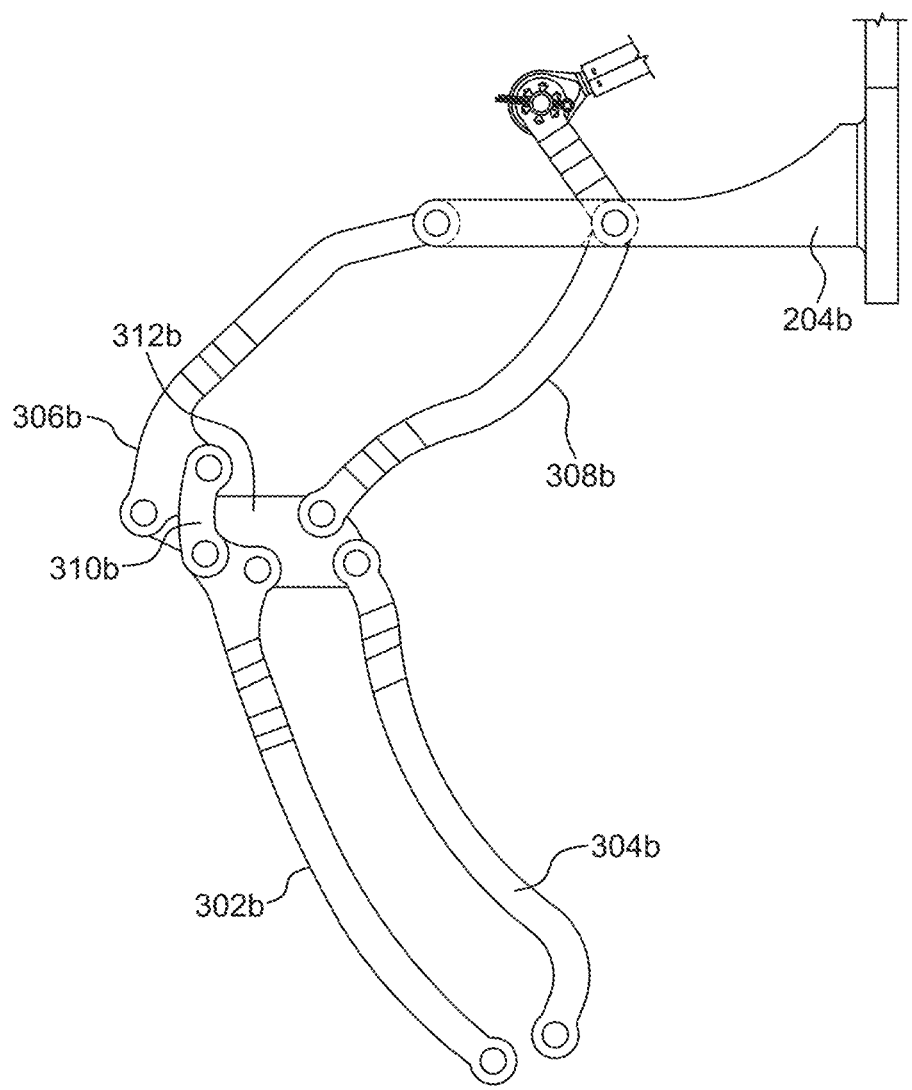
FIG. 15A is a forward looking view of the lower cowl mechanism 102b in a position between the closed position and the open position according to an embodiment of the invention.
Figure 15B:
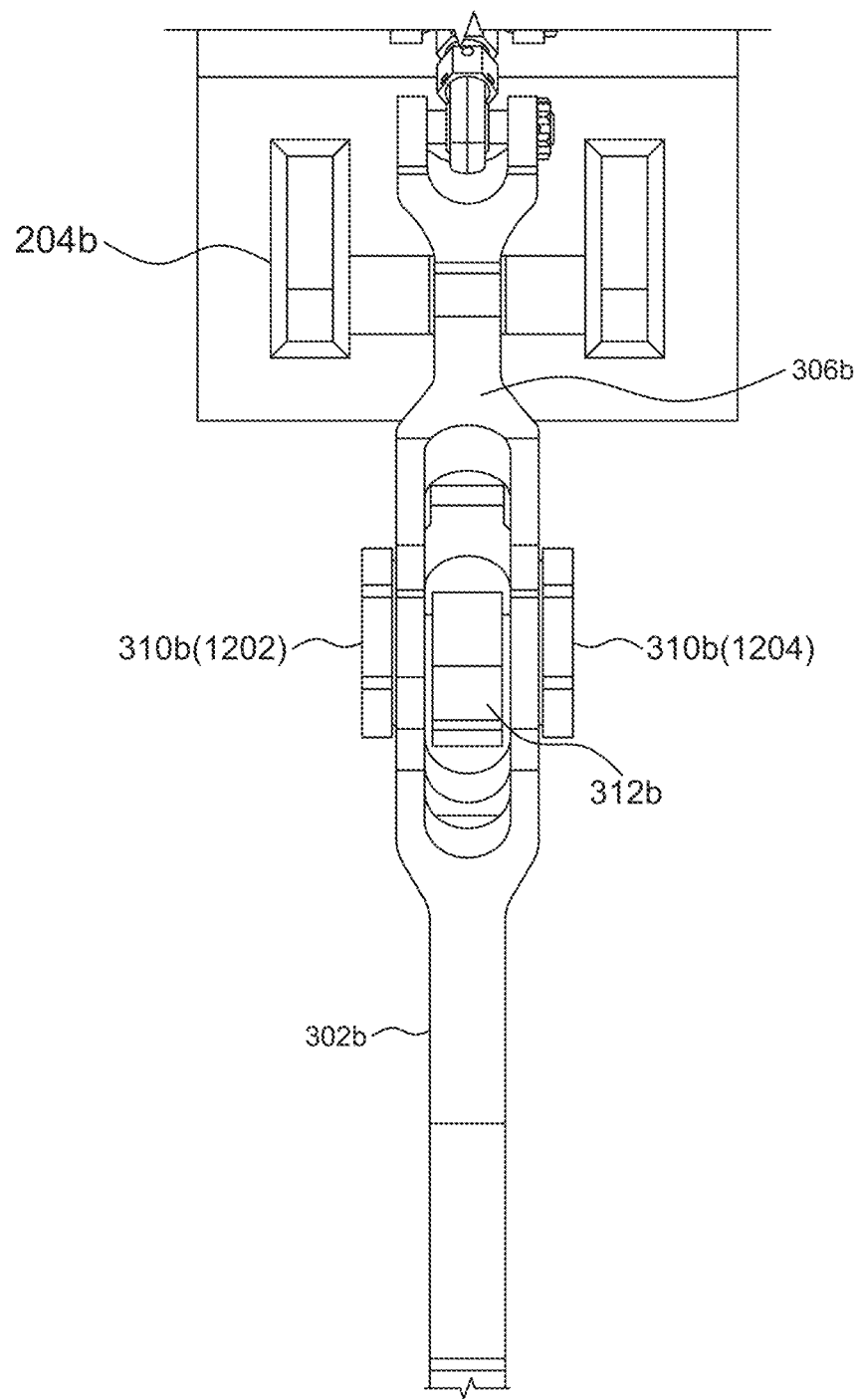
FIG. 15B is a view of the lower cowl mechanism 102b in the position of FIG. 15A.
Figure 16A:
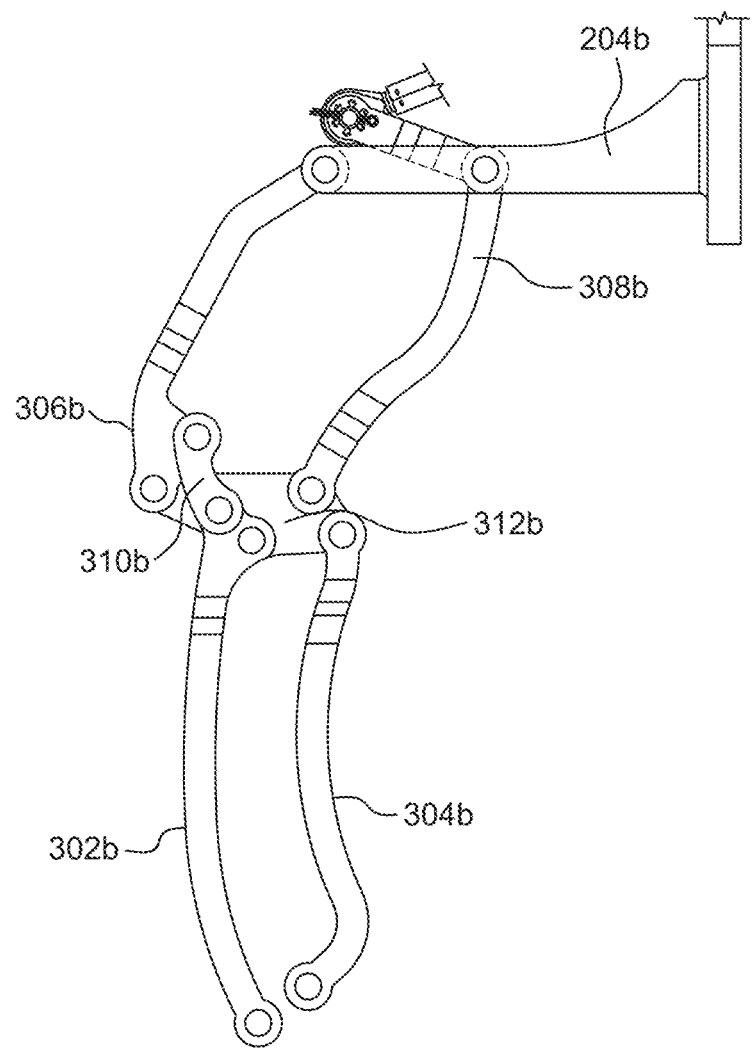
FIG. 16A is a forward looking view of the lower cowl mechanism 102b in the open position according to an embodiment of the invention.
Figure 16B:
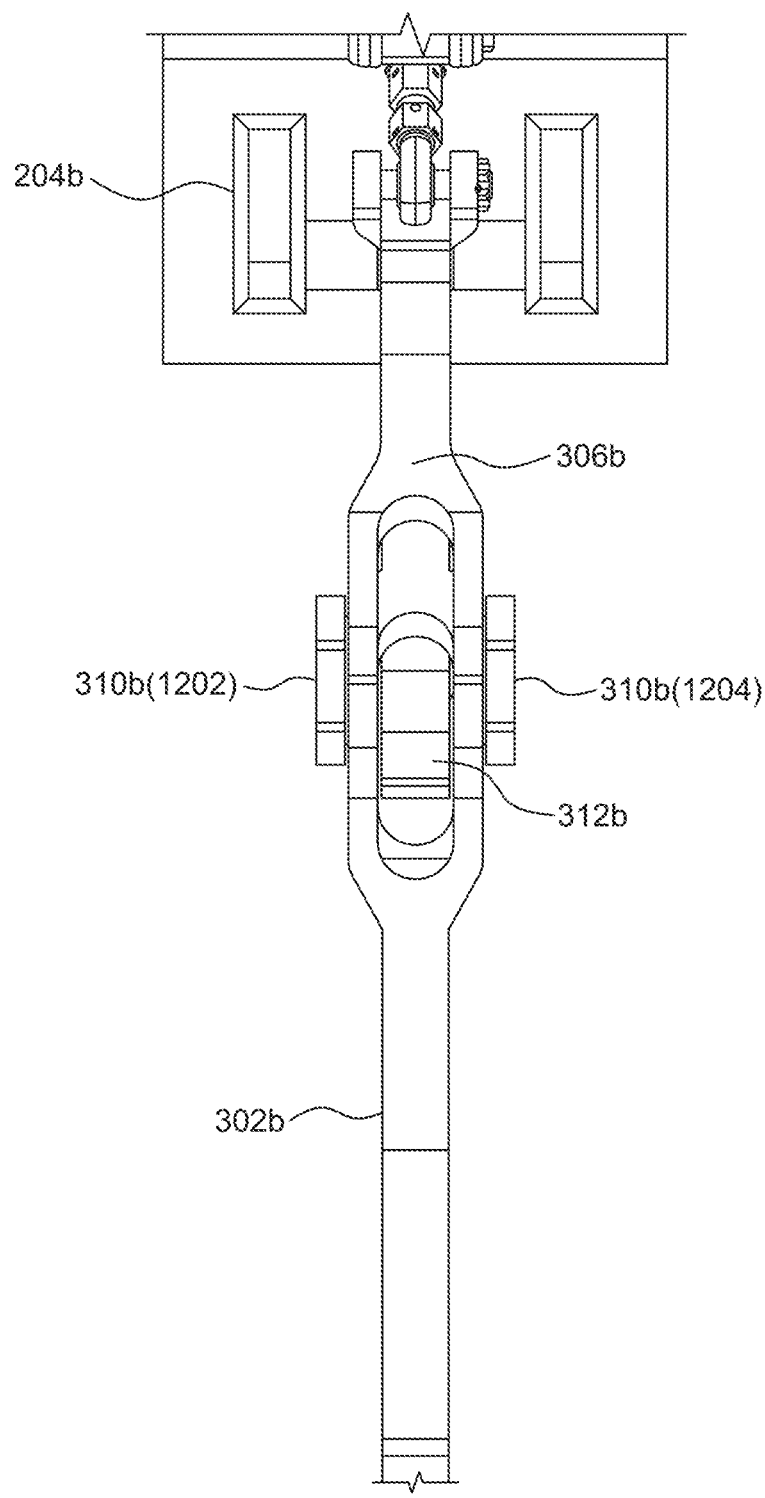
FIG. 16B is a view of the lower cowl mechanism 102b in the open position according to an embodiment of the invention.

FIGS. 12A, 13A, 14A, 15A, and 16A show detailed side view of the lower cowl mechanism 102b at various positions from a fully closed position in FIG. 12A to a fully opened position in FIG. 16A. FIGS. 12B, 13B, 14B, 15B, and 16B show detailed views looking inboard towards the pylon of the lower cowl mechanism 102b at positions corresponding to FIGS. 12A, 13A, 14A, 15A, and 16A, respectively. FIG. 12B shows the relative arrangement of lower forward drive bar 1202 and lower aft drive bar 1204, each corresponding to lower drive bars 310b.

Figure 17A:
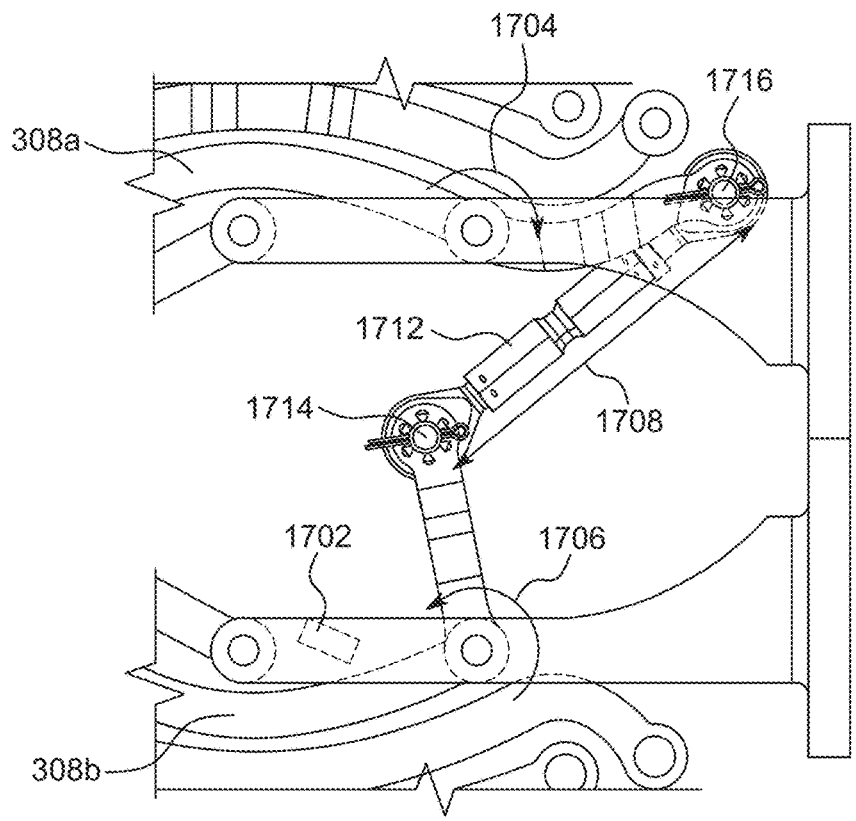
FIG. 17A is a forward looking view of the mid-link mechanism 102c in the closed position according to an embodiment of the invention.
Figure 17B:
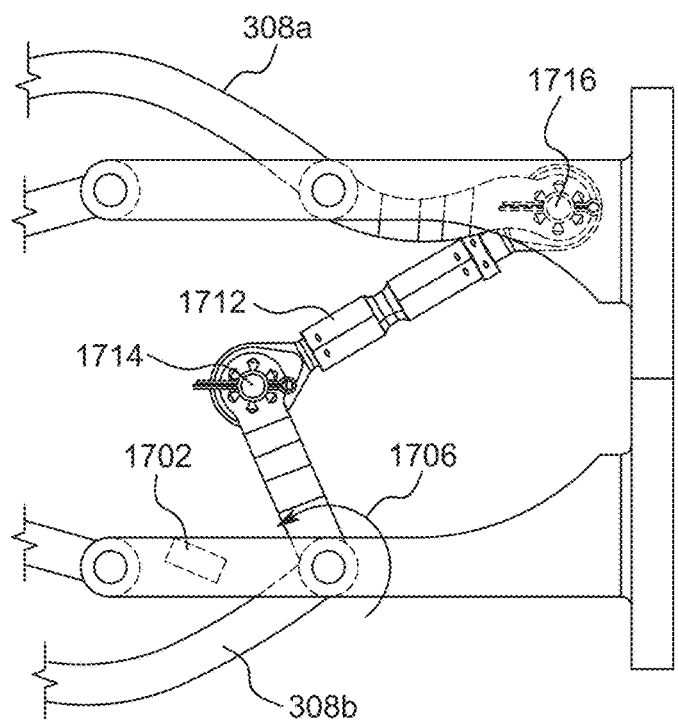
FIG. 17B is a forward looking view of the mid-link mechanism 102c in a position between the closed position and the open position according to an embodiment of the invention.
Figure 17C:
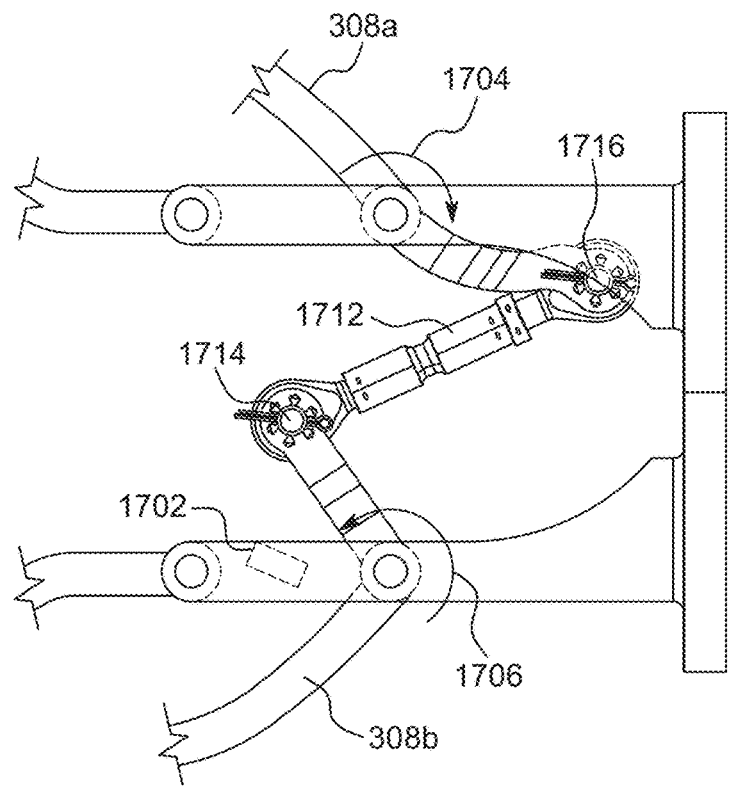
FIG. 17C is a forward looking view of the mid-link mechanism 102c in a position between the closed position and the open position according to an embodiment of the invention.
Figure 17D:
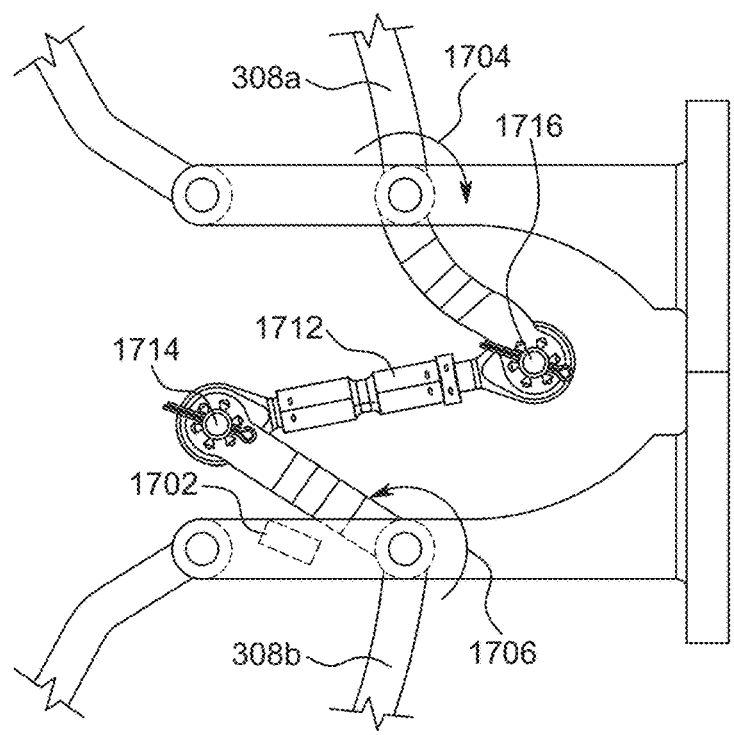
FIG. 17D is a forward looking view of the mid-link mechanism 102c in a position between the closed position and the open position according to an embodiment of the invention.
Figure 17E:
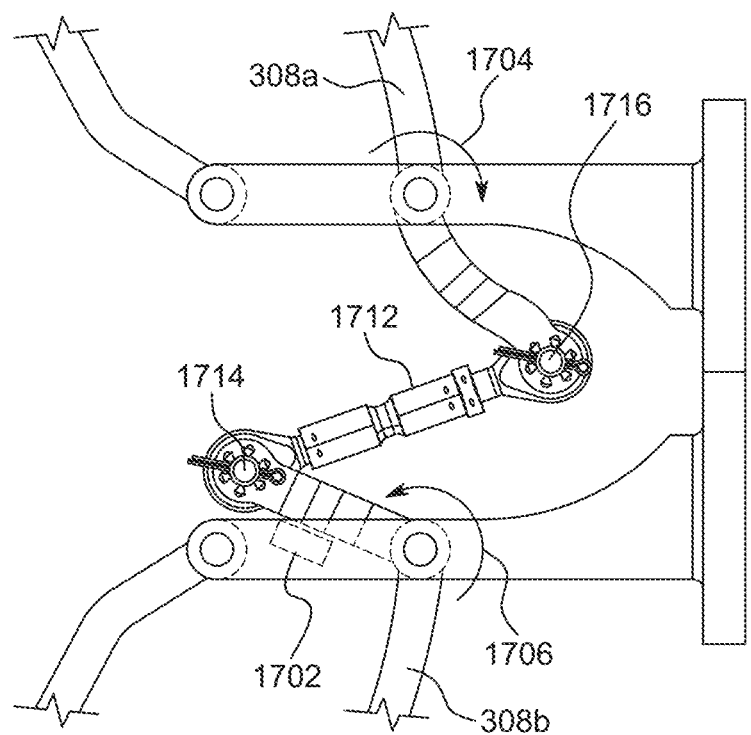
FIG. 17E is a forward looking view of the mid-link mechanism 102c in the open position according to an embodiment of the invention.
Figure 18A:
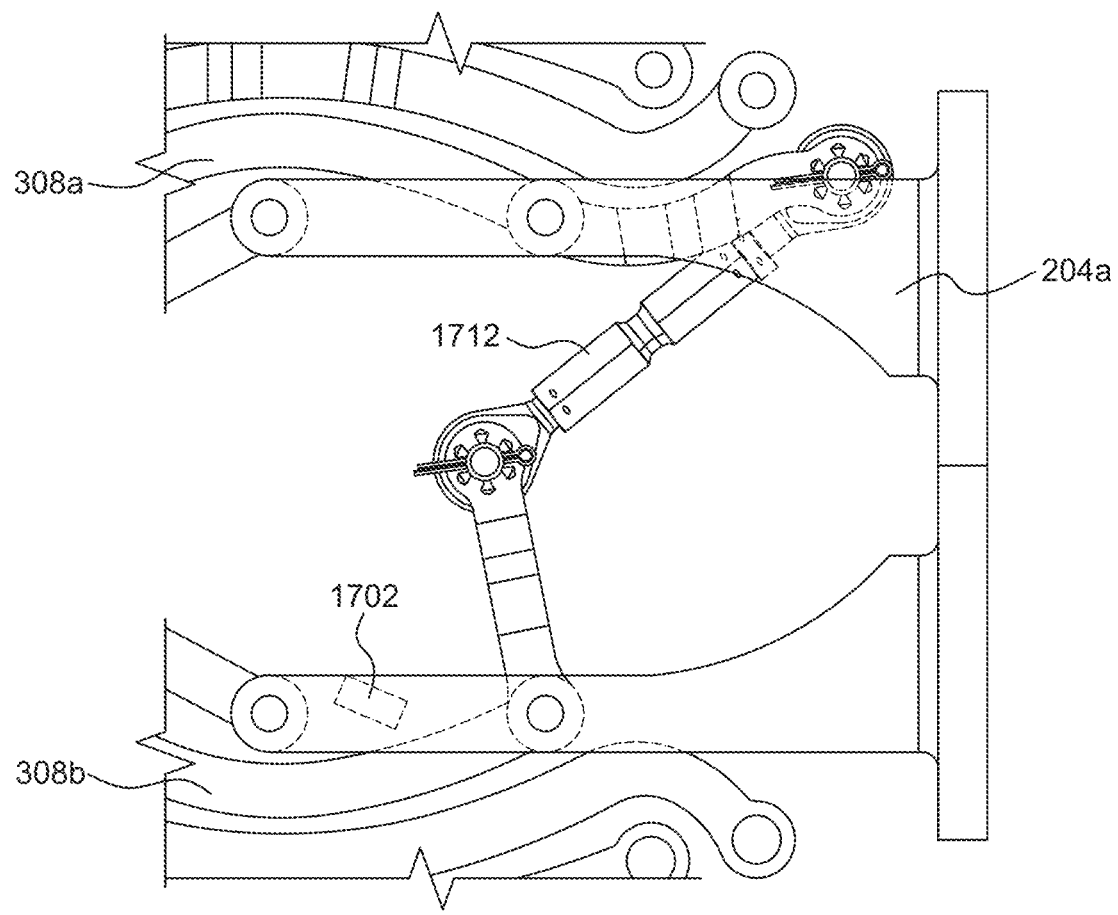
FIG. 18A is a forward looking view of the mid-link mechanism 102c in the closed position according to an embodiment of the invention.
Figure 18B:
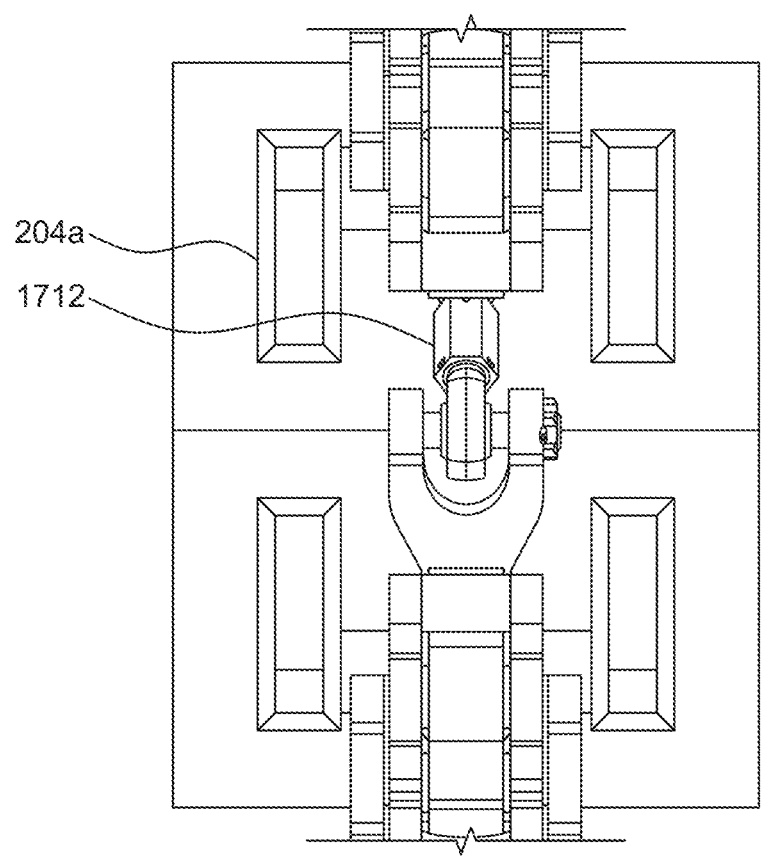
FIG. 18B is a view of the mid-link mechanism 102c in the closed position.
Figure 19A:
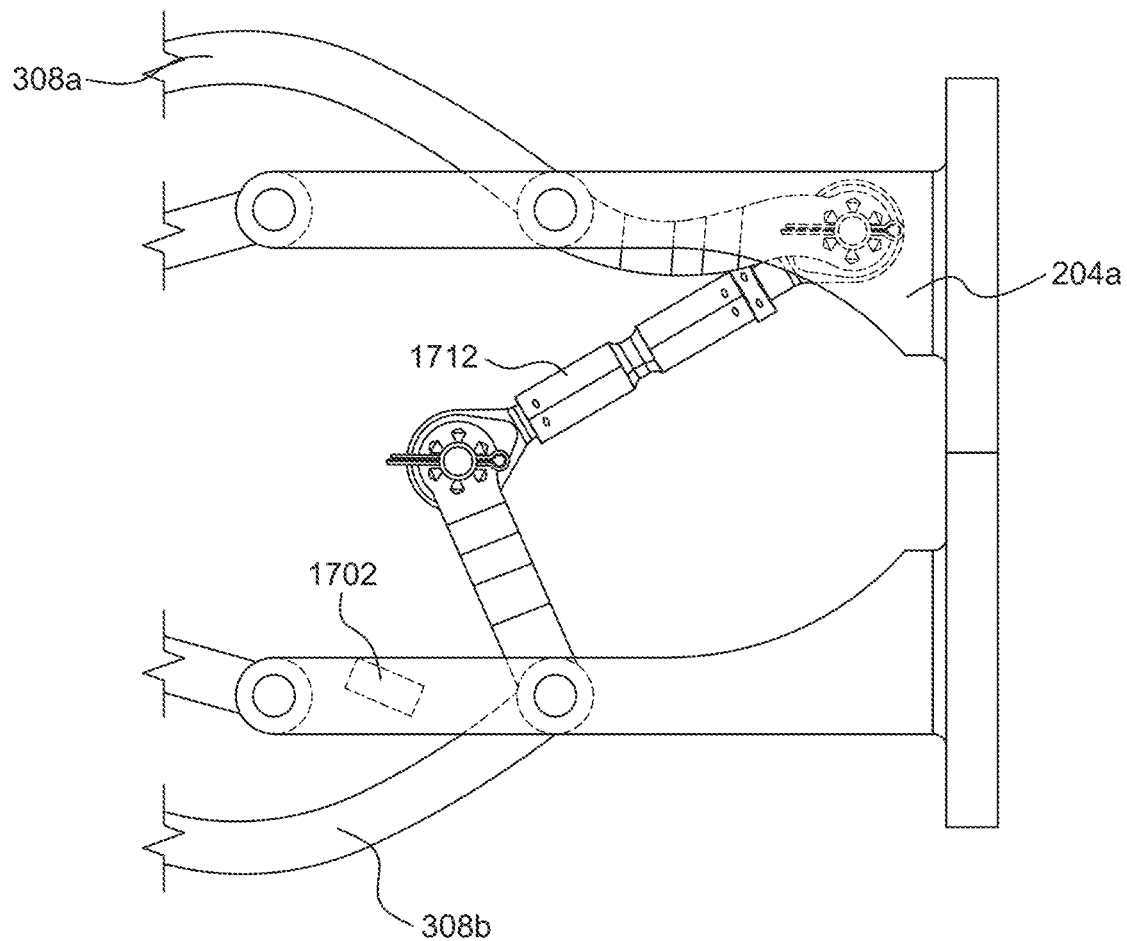
FIG. 19A is a forward looking view of the mid-link mechanism 102c in a position between the closed position and the open position according to an embodiment of the invention.
Figure 19B:
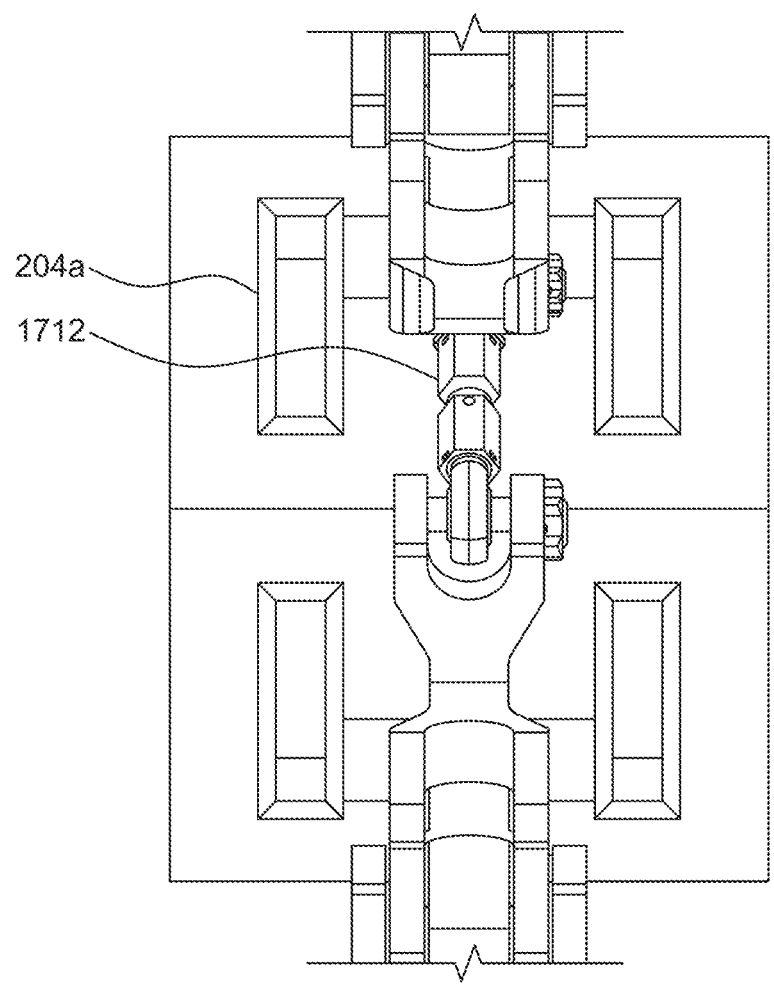
FIG. 19B is a view of the mid-link mechanism 102c in the position of FIG. 19A.
Figure 20A:
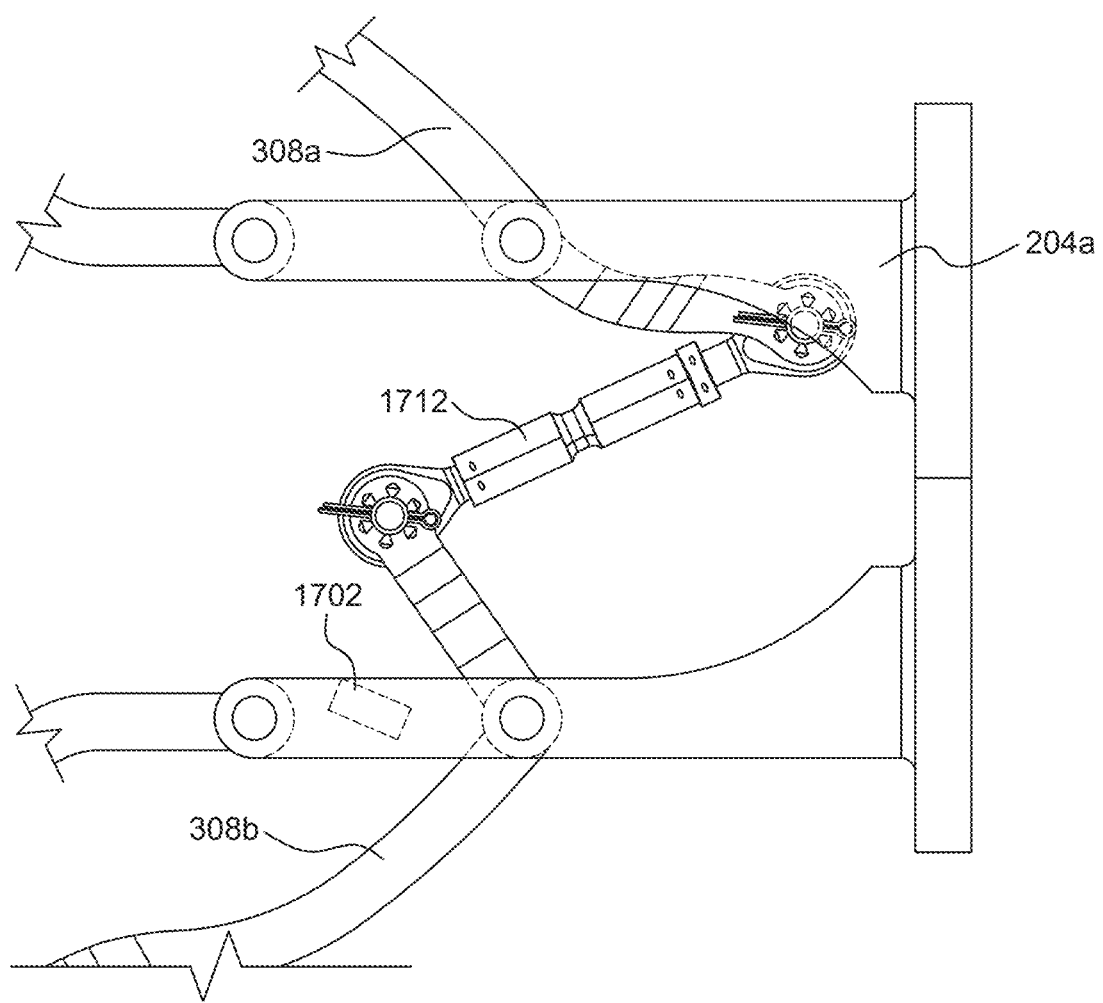
FIG. 20A is a forward looking view of the mid-link mechanism 102c in a position between the closed position and the open position according to an embodiment of the invention.
Figure 20B:
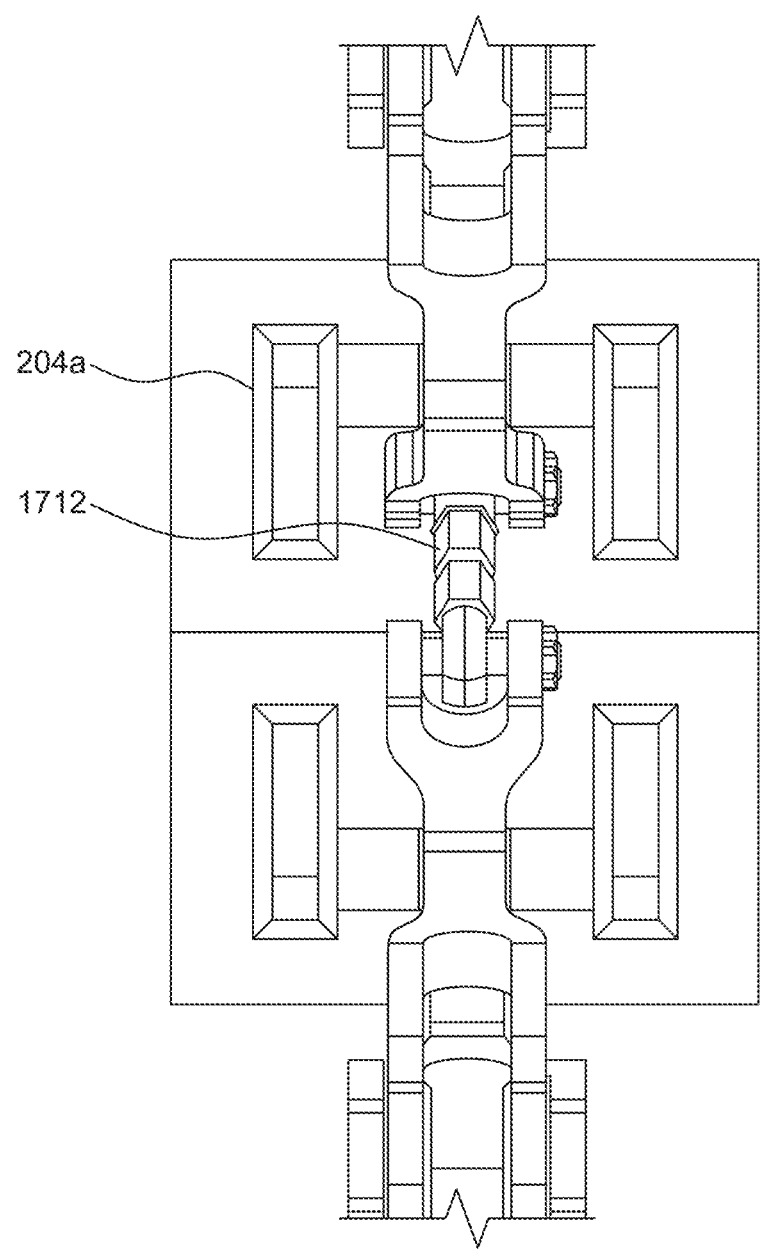
FIG. 20B is a view of the mid-link mechanism 102c in the position of FIG. 20A.
Figure 21A:
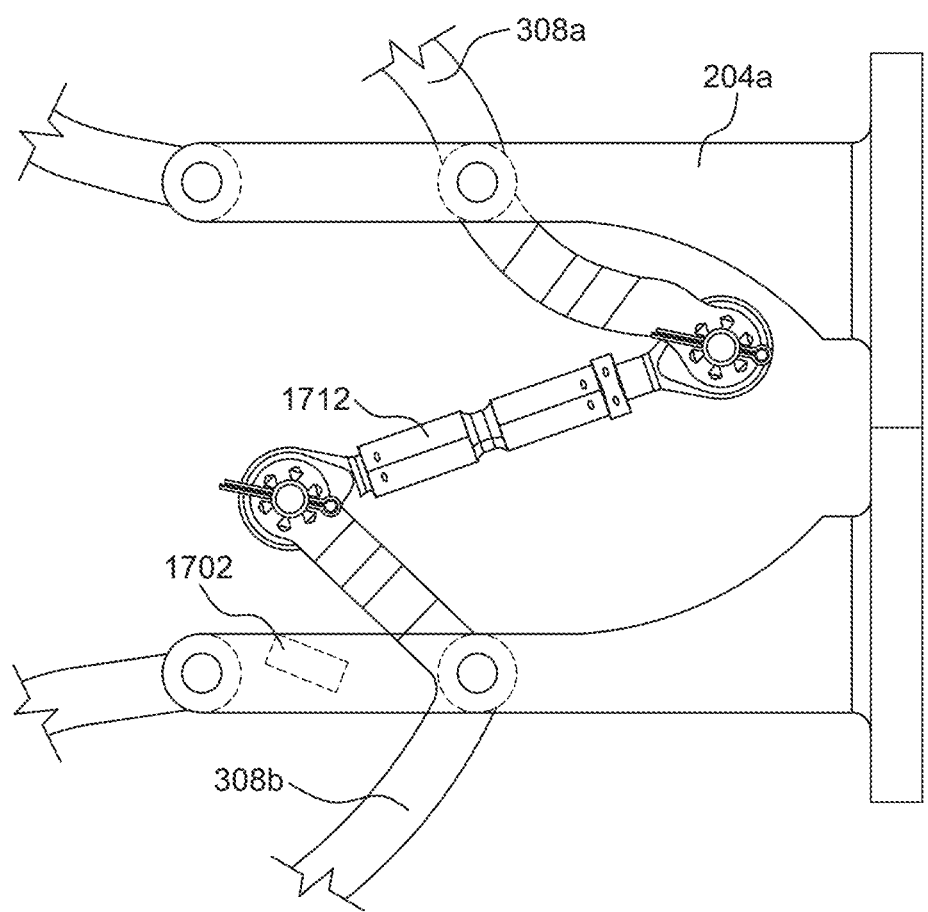
FIG. 21A is a forward looking view of the mid-link mechanism 102c in a position between the closed position and the open position according to an embodiment of the invention.
Figure 21B:
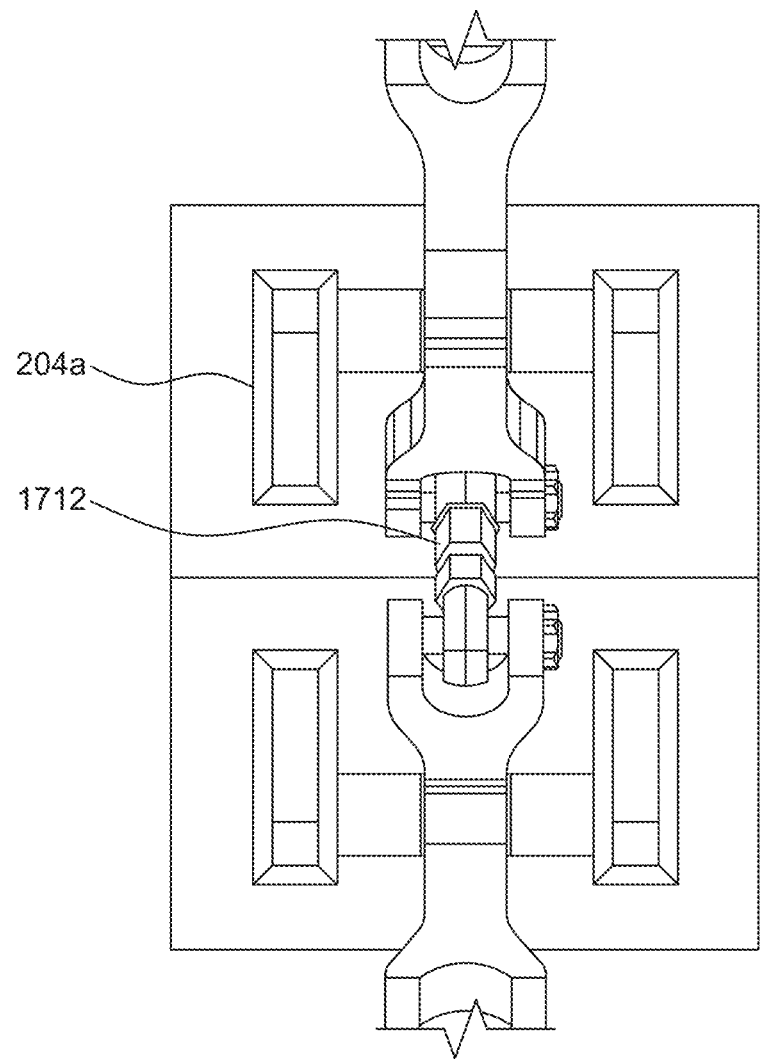
FIG. 21B is a view of the mid-link mechanism 102c in the position of FIG. 21A.

FIGS. 17A-17E show detailed side views of the mid-link mechanism 102c at various positions from a fully closed position in FIG. 17A to a fully opened position in FIG. 17E. The mid-link mechanism 102c provides a mechanical linkage between the upper cowl mechanism 102a and the lower cowl mechanism 102b so that the angle of the upper cowl mechanism 102a away from a fully closed position is always equal to the angle of the lower cowl mechanism 102b away from the fully closed position. Thus, the arrangements of the upper cowl mechanism 102a in FIGS. 7A, 8A, 9A, 10A, and 11A, corresponds to the positions of the lower cowl mechanism 102b in FIGS. 12A, 13A, 14A, 15A, and 16A, respectively, and also corresponds to the positions of the mid-link mechanism 102c in FIGS. 17A-17E, respectively.

The mid-link mechanism 102c includes a pylon bumper 1702, a linkage arm 1712, and a pin 1714. An upper end of the linkage arm 1712 is connected by a pin 1716 to the lower end of the upper inboard pylon forked link 308a. A lower end of the linkage arm 1712 is connected by the pin 1714 to the upper end of the lower inboard pylon forked link 308b. The pylon bumper 1702 is fixedly attached to the lower pylon attachment clevis 204b and may limit an extent of movement of the lower inboard pylon forked link 308b in the opening direction. A length 1708, between a center of a hole for pin 1716 and a center of a hole for pin 1714 of the linkage arm 1712 may be adjustable, for example using a turnbuckle, to set a range of motion and the closed and open positions of the upper cowl 104 and lower cowl 106.

The counter-clockwise rotation of the lower inboard pylon forked link 308b around its pylon attachment point, and the simultaneous clockwise rotation of the upper inboard pylon forked link 308a around its pylon attachment point cause the linkage arm 1712 to be in tension. The rotation causes moments about the respective pylon attachment points. The moments cause the inboard pylon forked links 308 to both rotate. The rotation of the inboard pylon forked links 308 coupled with the outboard pylon forked links 306 cause the corresponding connector plates 312 to translate away from the pylon structure in a vertical direction (relative to the ground).

Initially, the connector plates (and corresponding cowls) translate away from the outboard split line 128 in a perpendicular direction. As the outboard pylon forked link 306 rotates about the pin 314 connection to connector plate 312, the pinned connection between the drive bars 310 and the pylon forked link 306 will translate between pins 314 and 320 and such that the ends of the drive bars 310 closest to the pylon brackets will rotate around pin 314 and the ends of the drive bars closest to the cowl will rotate around pin 320. As a result, the drive bars 310 will cause the outboard cowl forked link 302 to rotate about the pin 320. This motion of the outboard cowl forked link 302 coupled with the motion of inboard cowl forked link 304 cause the corresponding cowl to move away from the translating connector plate 312 towards the fully opened position.

FIGS. 18A, 19A, 20A, 21A, and 22A show detailed side views of the mid-link mechanism 102c at positions corresponding to those of FIGS. 17A-17E, respectively. FIGS. 18B, 19B, 20B, 21B, and 22B show detailed views looking inboard towards the pylon direction at positions corresponding to those of FIGS. 18A, 19A, 20A, 21A, and 22A, respectively.

FIG. 23 shows a side cut-away view of pin 2306 (corresponding to pins 318, 320, 314, and 316) used to connect forked links to the connector plates 312. Pin 2306 extends through holes in a forked link 2308 and also through a hole in connector plate 312. The holes through a fork tine may optionally include a flanged bushing 2302 and/or 2310. The hole through the connector plate 312 may optionally include a bushing 2304. The pin 2306 may be secured by nut 2312 and washer 2314. Alternatively, pin 2306 may be implemented as a shoulder bolt. The pin 2306 may preferably have a 12 or 6 point style head, a torx style head, a Philips style head, or be any other suitable fastener type.

FIG. 24 shows a side cut-away view of pin 2404 (corresponding to pins 326 and 328) used to connect forked links to the corresponding pylon attachment clevis. Pin 2404 extends through holes in a forked portion of the pylon attachment clevis 2406, which is a forked bracket also through a hole in an end of a link (e.g., end of link 306 or 308). The holes through the clevis may optionally have flanged bushings 2402 and 2412. The pin 2404 may be secured by nut 2418 and washer 2426. The hole through the forked link may optionally have a bushing 2408. Alternatively, pin 2404 may be implemented as a shoulder bolt. The pin 2404 may preferably have a 12 or 6 point style head or be any other suitable fastener type.

FIG. 25 shows a side cut-away view of pin 2504 (corresponding to pins 322 and 324) used to connect drive bars 310 to forked links (e.g., forked ends of links 306). Pin 2504 extends through holes in a forked/lug portion 2502 of the link and through the drive bar 310. The holes may optionally include flanged bushings 2506. The pin 2504 may be secured by nut 2510 and washer 2508. Alternatively, pin 2504 may be implemented as a shoulder bolt. The pin 2504 may preferably have a 12 or 6 point style head.

Figure 26:
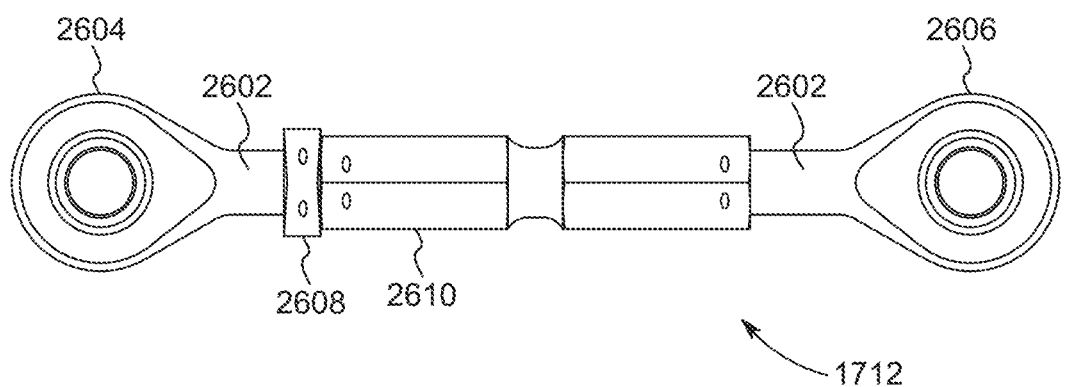
FIG. 26 is a side-view of a linkage arm 1712 according to an embodiment of the invention.

FIG. 26 shows a detailed view of an embodiment of the linkage arm 1712 having threaded portions 2602 and spherical ball threaded rod ends 2604 and 2606 to connect to the upper inboard pylon forked link 308a and the lower inboard pylon forked link 308b, respectively. The turnbuckle 2610 may be rotated around the lengthwise axis of the linkage arm 1712 to change the distance between the ends 2604 and 2606. A jam nut 2608 may be loosened to allow motion of the turnbuckle 2610 and tightened to prevent motion of the turnbuckle 2610.

Figure 22A:
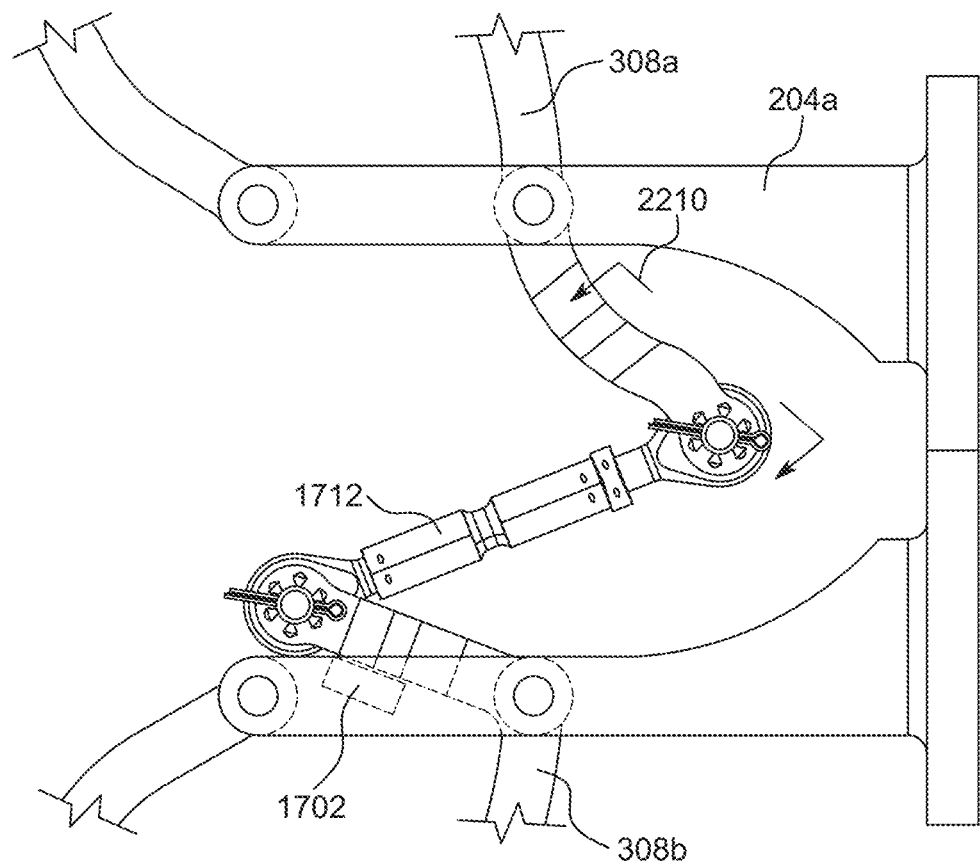
FIG. 22A is a forward looking view of the mid-link mechanism 102c in the open position according to an embodiment of the invention.
Figure 22B:
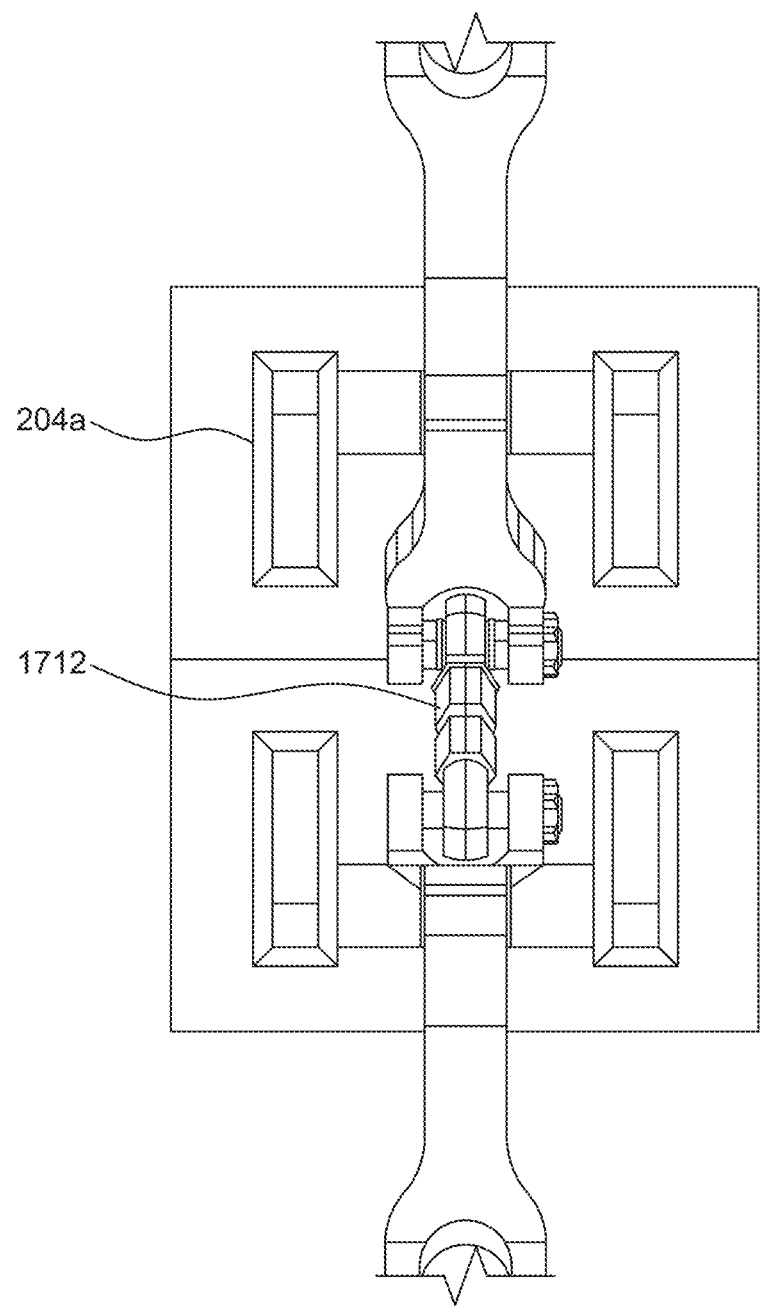
FIG. 22B is a view of the mid-link mechanism 102c in the open position according to an embodiment of the invention.
Figure 27A:
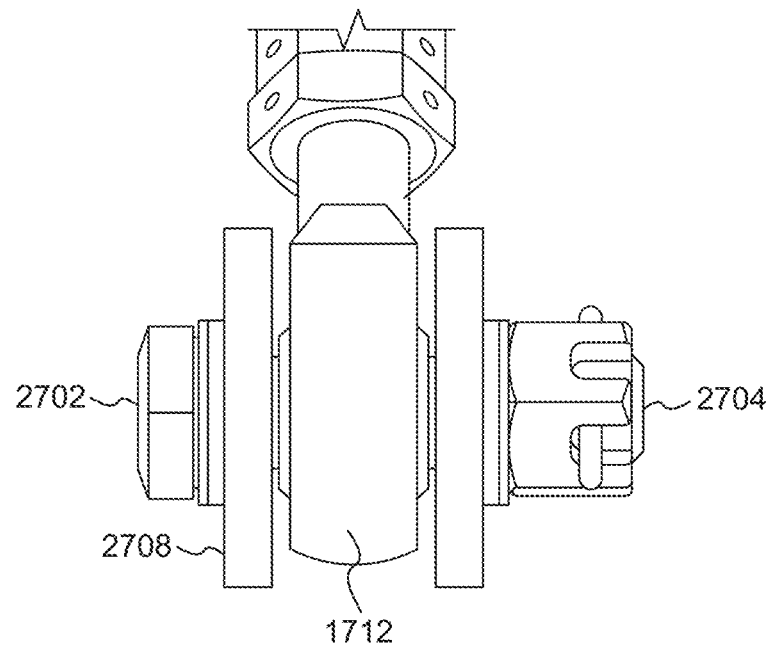
FIG. 27A is a view from perspective line 2210 of a connection point on the linkage arm 1712 according to an embodiment of the invention.
Figure 27B:
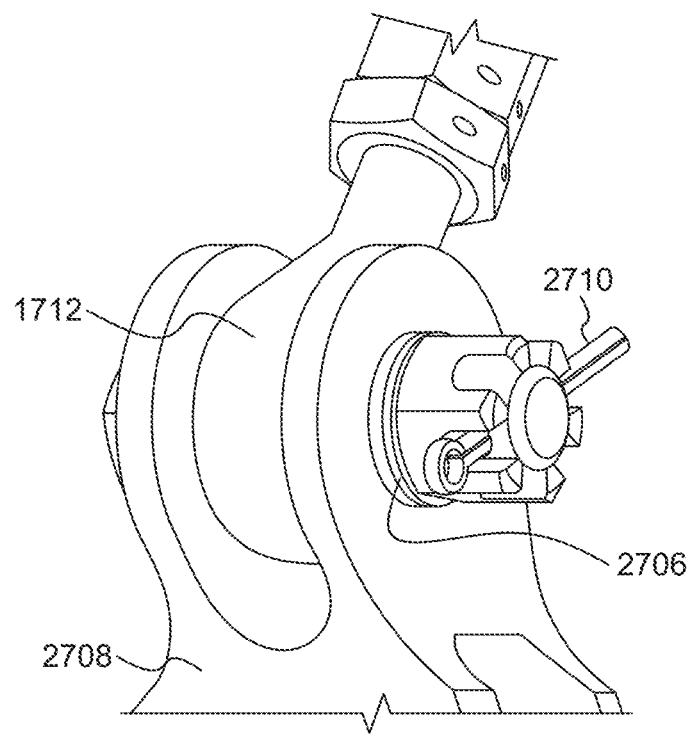
FIG. 27B is an isometric view of the connection point in FIG. 27A.

FIG. 27A shows a side view from a direction indicated by perspective line 2210 in FIG. 22A. FIG. 27B shows an isometric view of attachments between the threaded rod ends 2604 and 2606 of the linkage arm 1712 and a forked link 308 (corresponding to 2708). The attachment may include pin 2702 (corresponding to pin 1716 or 1714) that extends through holes in lugs of the forked link 308 and through one of the threaded rod ends 2604 and 2606. The pin 2702 may be secured by a nut 2704 and washer 2706. A pin 2710 may further secure and/or, prevent rotation of, the pin 2702. Pin 2702 may alternatively be implemented as a bolt.

Figure 11B:
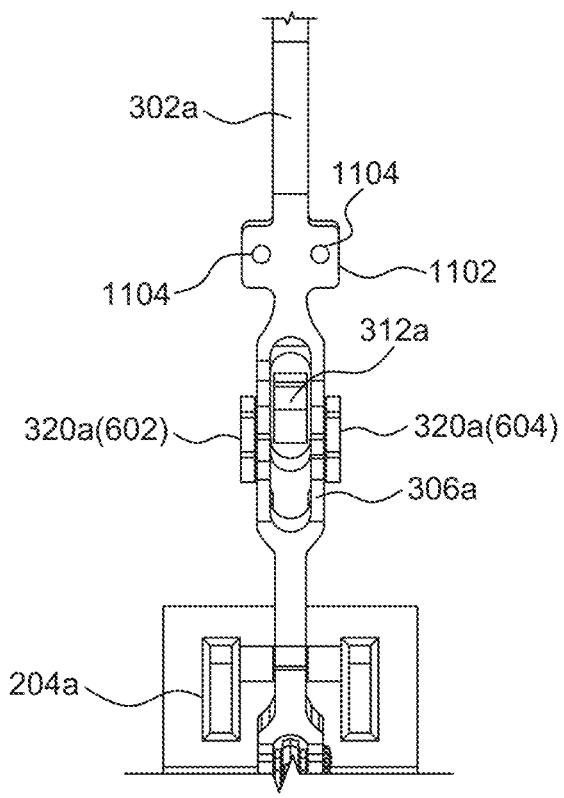
FIG. 11B is a view of the upper cowl mechanism 102a in the open position.
Figure 28A:
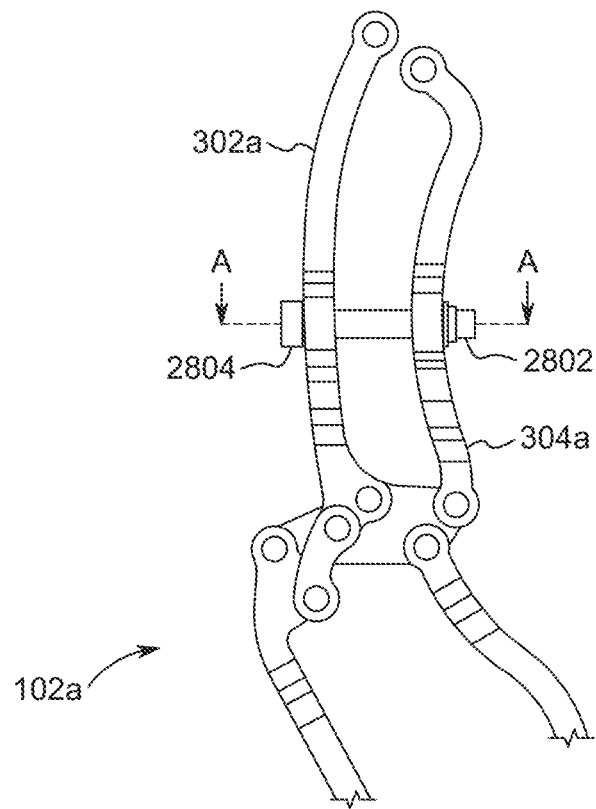
FIG. 28A is a forward looking view of the upper cowl mechanism 102a with the locking feature installed/enabled according to an embodiment of the invention.
Figure 28B:
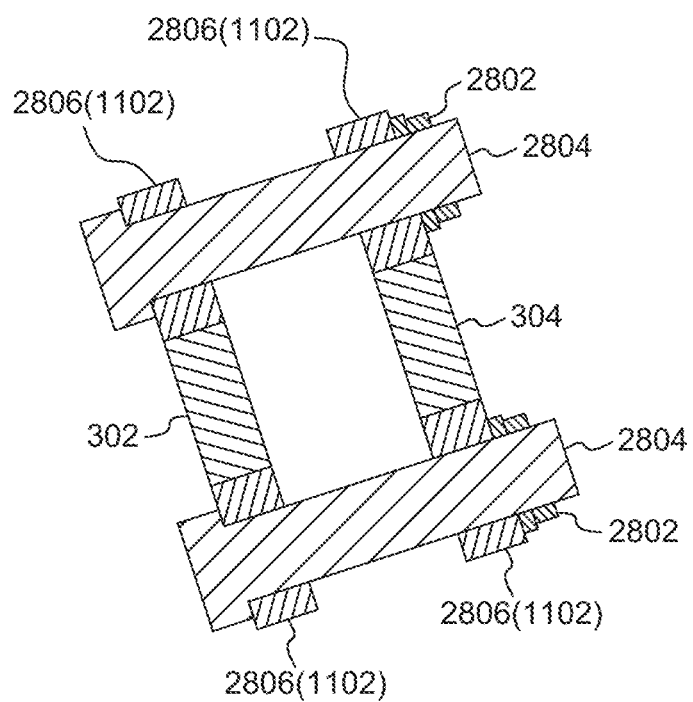
FIG. 28B is a cut-away view from line A-A in FIG. 28A.
Figure 28C:
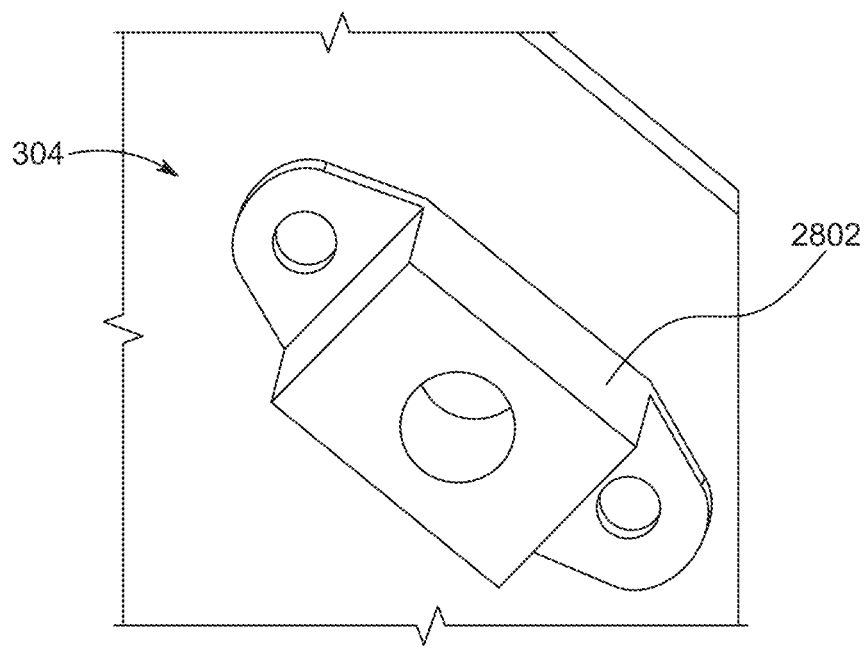
FIG. 28C is an isometric view of a nut plate 2802 in FIG. 28B.

FIGS. 28A-28C show an optional locking assembly that can be used to selectively hold the upper cowl 104 and lower cowl 106 in a fully opened position, even when the aircraft engine is removed. For example, in a typical maintenance scenario, an aircraft engine may need to be completely removed, without removing the nacelle hardware from the pylon. With no engine in place, the upper and lower cowls and their upper and lower opening mechanisms are no longer constrained. The optional locking assembly is optionally included in at least one pair of the (i) upper inboard cowl forked link 304a and upper outboard cowl forked link 302a (i.e., the embodiment described below), and/or (ii) lower inboard cowl forked link 304b and lower outboard cowl forked link 302b. As shown in the example of FIG. 11B and FIG. 28B, the upper outboard cowl forked link 302a may include a tab region 2806 (corresponding to tab regions 1102) including through holes 1104.

FIG. 28A shows a side view of the upper cowl mechanism 102a with removable pins/bolts 2804 and nut plate 2802 installed. FIG. 28B shows a section view along line A-A in FIG. 28A. FIG. 28C shows an isometric view of a nut plate 2802 affixed to a link 304. Alternatively, the nut plate 2802 may be affixed to the link 302 and the direction of the pins/bolts 2804 may be reversed. Further alternatively, the link 304 may be threaded to receive the pins/bolts 2804, or another captive or removable fastener may be used instead of the nut plate 2802. When the pins/bolts 2804 are secured by the nut plate 2802, a distance between the links 302 and 304 is prevented from changing, thereby preventing the upper cowl 104 and lower cowl 106 from moving. To disable the locking feature, the pins/bolts 2804 may be removed.

Figure 29:
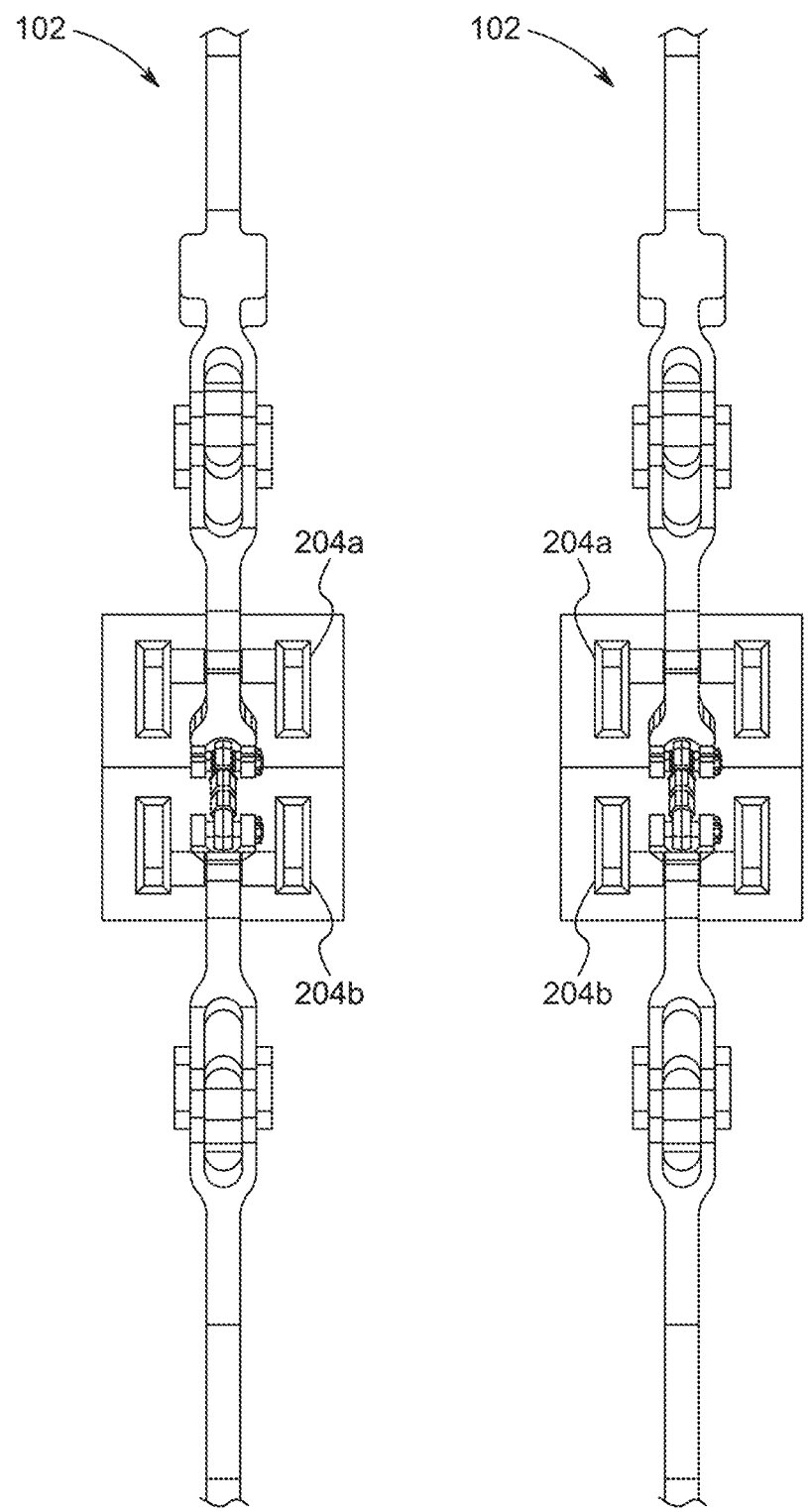
FIG. 29 is a side view of an arrangement of two cowl mechanisms 102 according to an embodiment of the invention.

FIG. 29 shows a side view of an arrangement of two cowl mechanisms 102 attached to a pair of upper 204a and lower 204b pylon attachment devises, within an aircraft engine assembly 100. Although the present embodiment is shown with two pins/bolts 2804 per cowl mechanism 102, the invention also encompasses using only one pin/bolt 2804, or using more than two pins/bolts 2804. In addition, the locking feature may be incorporated in both of the upper cowl mechanism 102a and the lower cowl mechanism 102b. The links may be alternatively arranged to have multiple holes allowing for pins/bolts with different lengths to accommodate locking the cowl in various positions between the open and closed positions. In alternative embodiments, a size of the tab region 2806 may be increased in the lengthwise direction of the forked link 302 to accommodate plural holes each for mounting a pin/bolt to hold the links in a fixed position, and thereby lock the upper cowl 104 and lower cowl 106 at different corresponding positions between the open and closed position.

Figure 30:
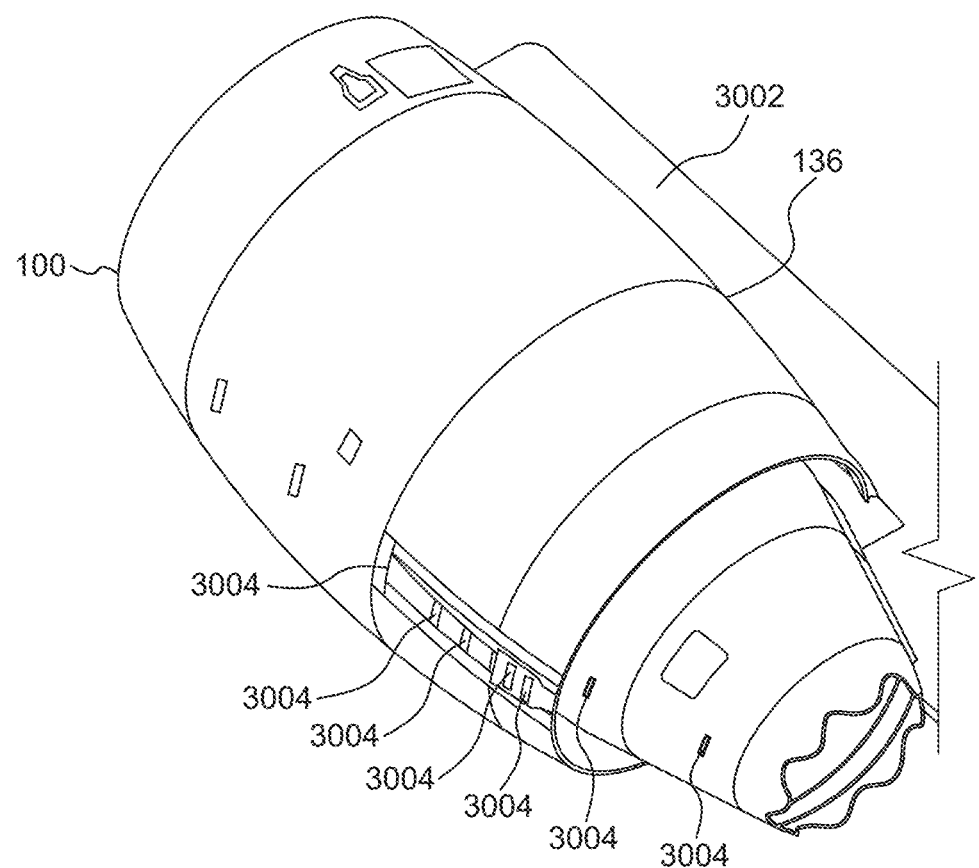
FIG. 30 is an isometric view of an aircraft engine assembly 100 according to an embodiment of the invention.

As shown in FIG. 30, the upper cowl 104 and lower cowl 106 may be latched to each other in the fully closed position using latches 3004 arranged along an outboard split line 128. Further, the aircraft propulsion system 100 is attached to a pylon 3002.

Figure 31A:
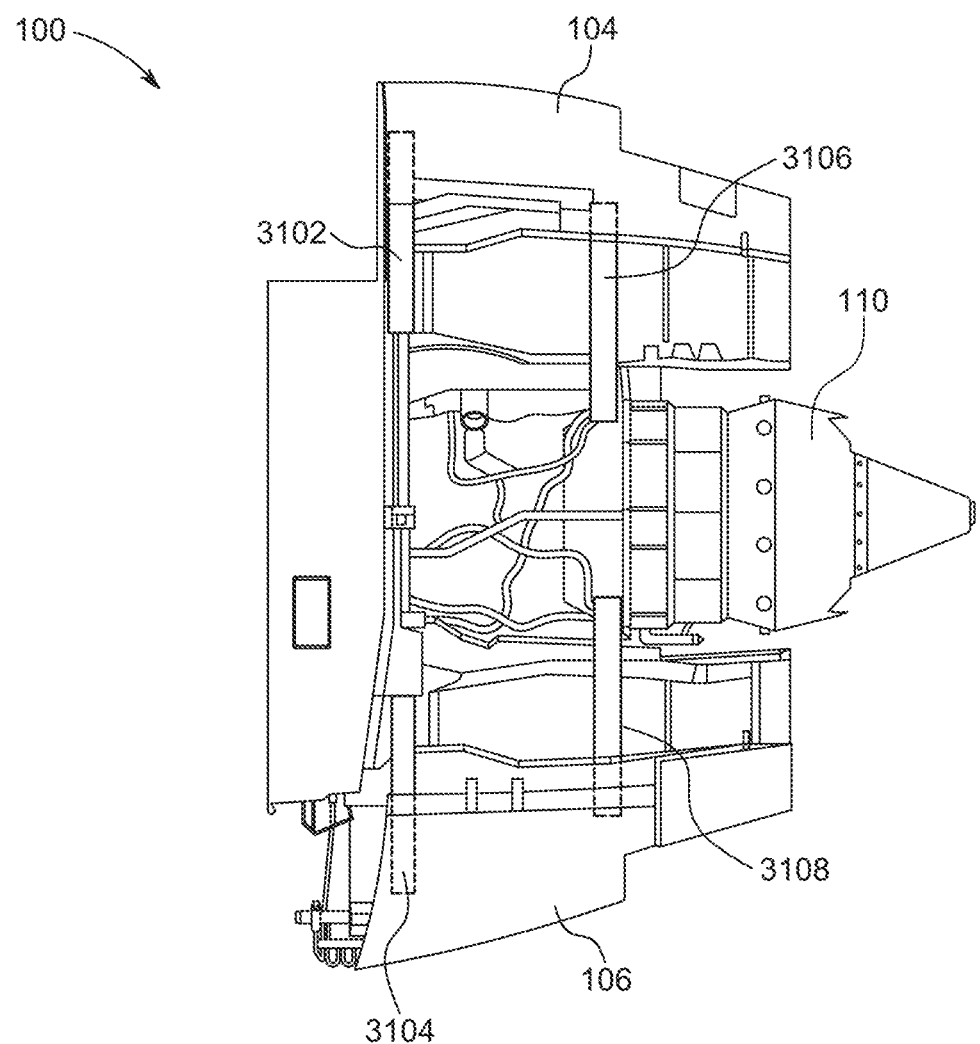
FIG. 31A is a side view of an aircraft engine assembly 100 according to an embodiment of the invention.

FIG. 31A shows a side view of an aircraft engine assembly 100 according to an embodiment of the invention with upper cowl 104 and lower cowl 106 in the fully open position.

Figure 31B:
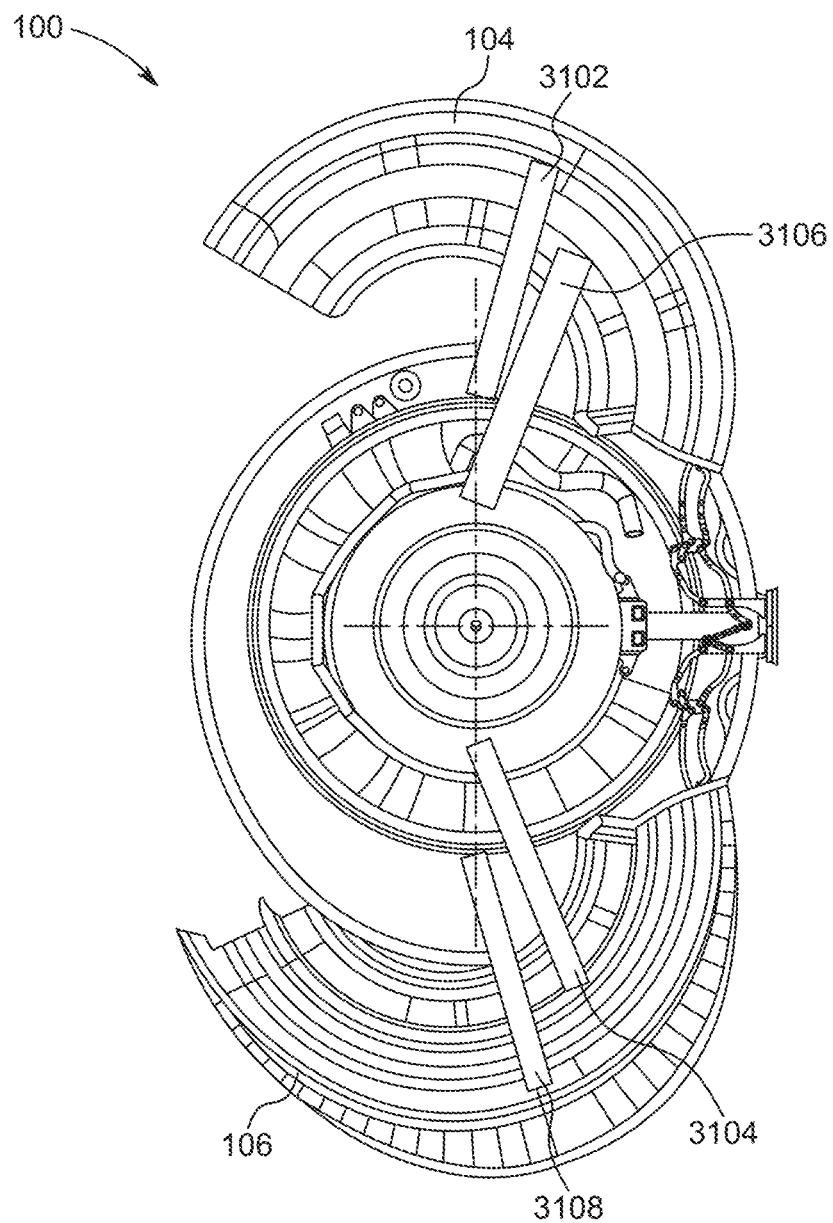
FIG. 31B is a forward looking cut-away view of an aircraft engine assembly 100 according to an embodiment of the invention.

In this example, the aircraft propulsion system 100 includes optional hold open rods (HOR): upper forward HOR 3102, upper aft HOR 3106, lower forward HOR 3104, and lower aft HOR 3108. The HORs may be optionally used to provide added security in holding the cowls in the fully opened position. FIG. 31B shows a front cut-away view of the installed HORs.

Figure 32:
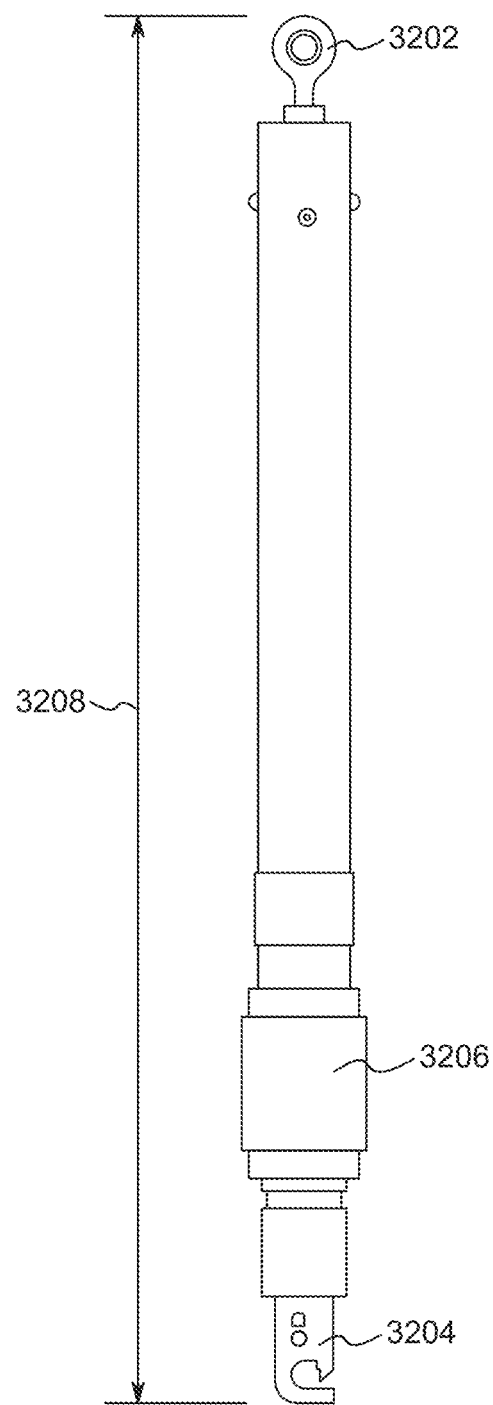
FIG. 32 is a detailed view of a Hold Open Rod (HOR) according to an embodiment of the invention.

FIG. 32 shows a detailed view of a typical HOR having ends 3202 and 3204 that are removably connected to the cowls and the engine, respectively, as well as a length adjustment turnbuckle 3206 to adjust overall length 3208 of the HOR.

Figure 36A:
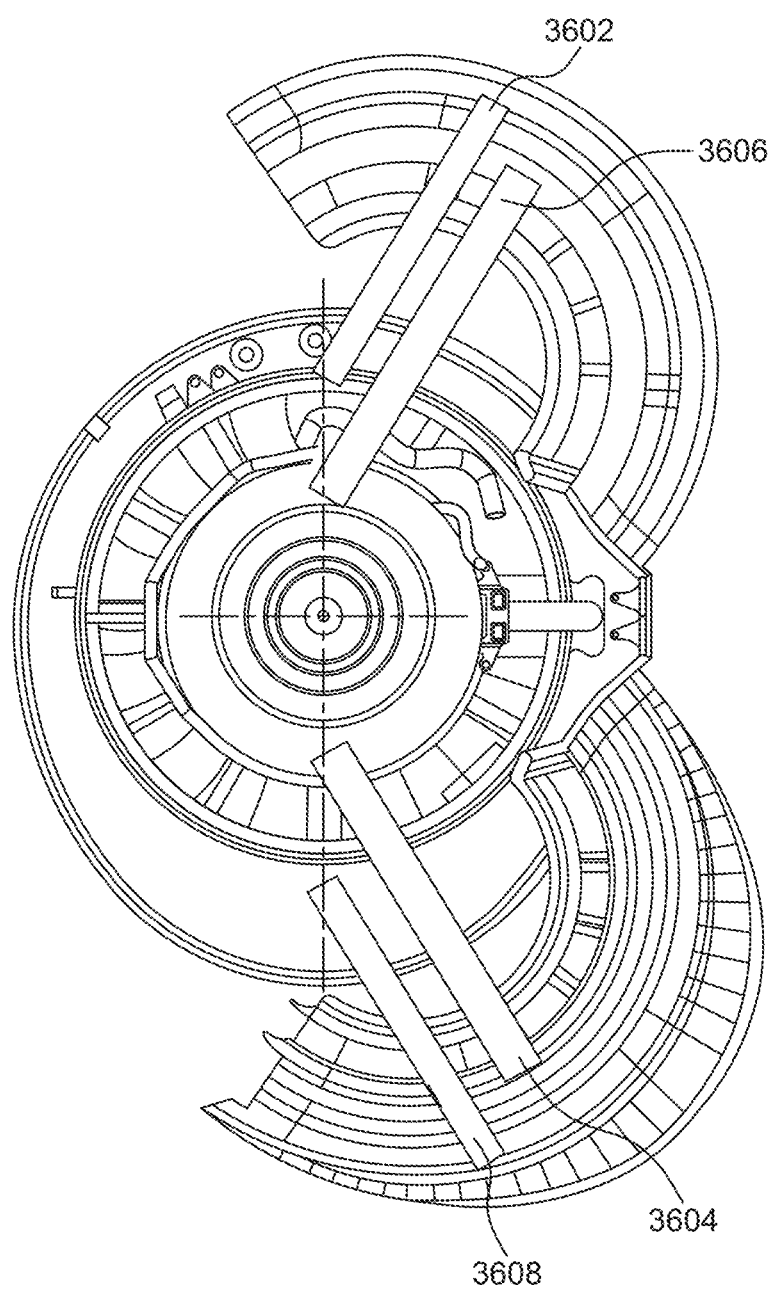
FIG. 36A shows a conventional cowl opening mechanism with HORs in an open position.
Figure 36B:
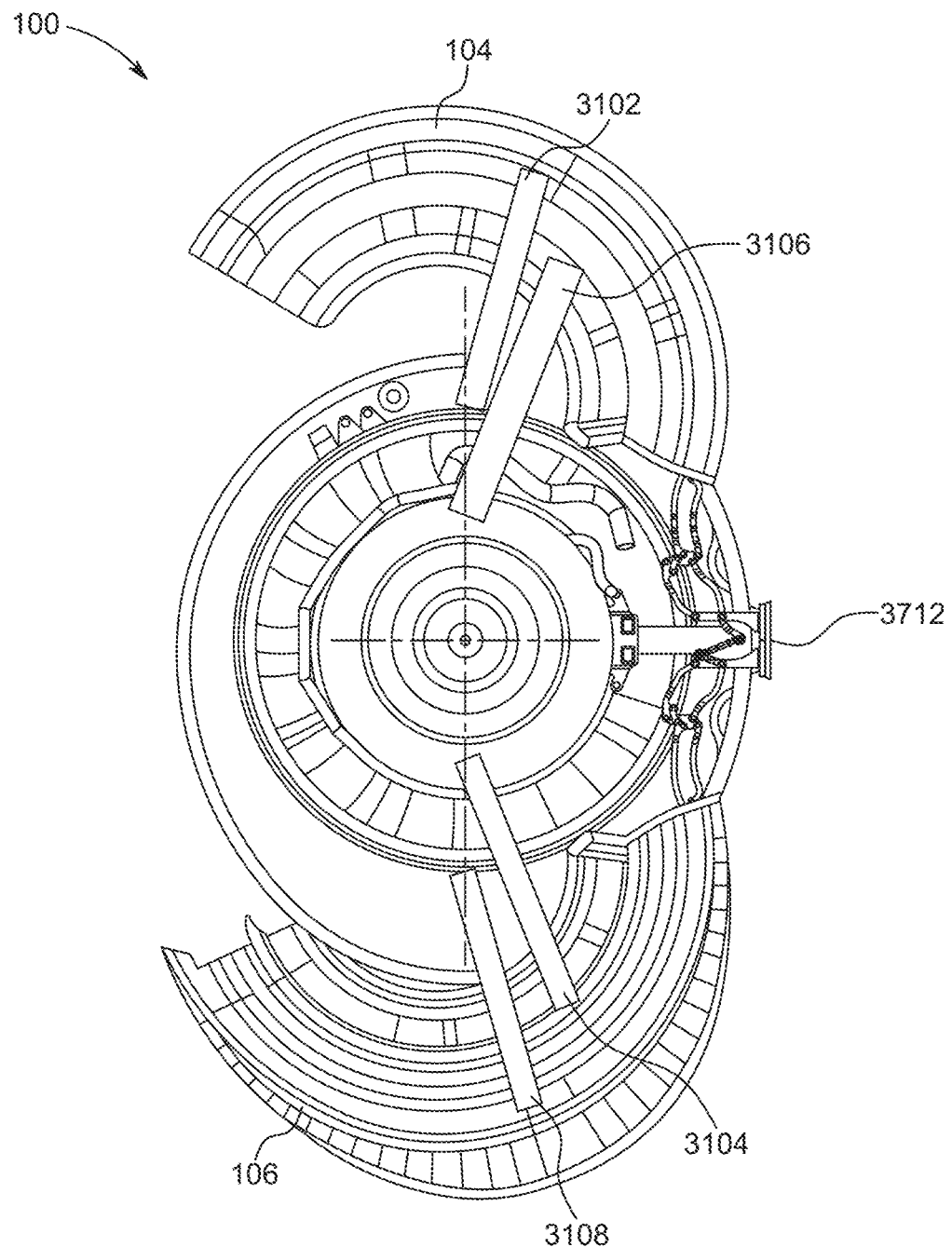
FIG. 36B shows an aircraft propulsion system 100 in the open position with HORs according to an embodiment of the invention.

FIG. 36A shows a conventional cowl opening mechanism as in FIG. 38 and using HORs 3602, 3606, 3604, and 3608. FIG. 36B shows a comparative example of an aircraft engine assembly 100 including the cowl opening mechanisms 102 which allow for the HORs 3102, 3104 3106, and 3108 to be advantageously shorter than the corresponding HORs 3602, 3604, 3606, and 3608 in the conventional approach. In particular, according to an embodiment of the invention, an excursion of the upper cowl 104 above a top part of the engine 110 (and corresponding excursion of the lower cowl 106 below a bottom part of the engine 110) in the open position, as viewed from the outboard direction, is advantageously minimized, for example to reduce the amount of wind load that an environmental wind might apply to the open cowl.

According to an embodiment, the excursion of the upper cowl 104 above a top part of the engine 110 in the open position may be less than 1 an outer diameter 3730 of the engine core 3718 (i.e., 2X a radius 3728 of the engine core 3718). As a result, the length of the HOR may be kept to be less than 2× the outer diameter 3730 of the engine core 3718 (i.e., 4X the radius 3728 of the engine core 3718).

Figure 37A:
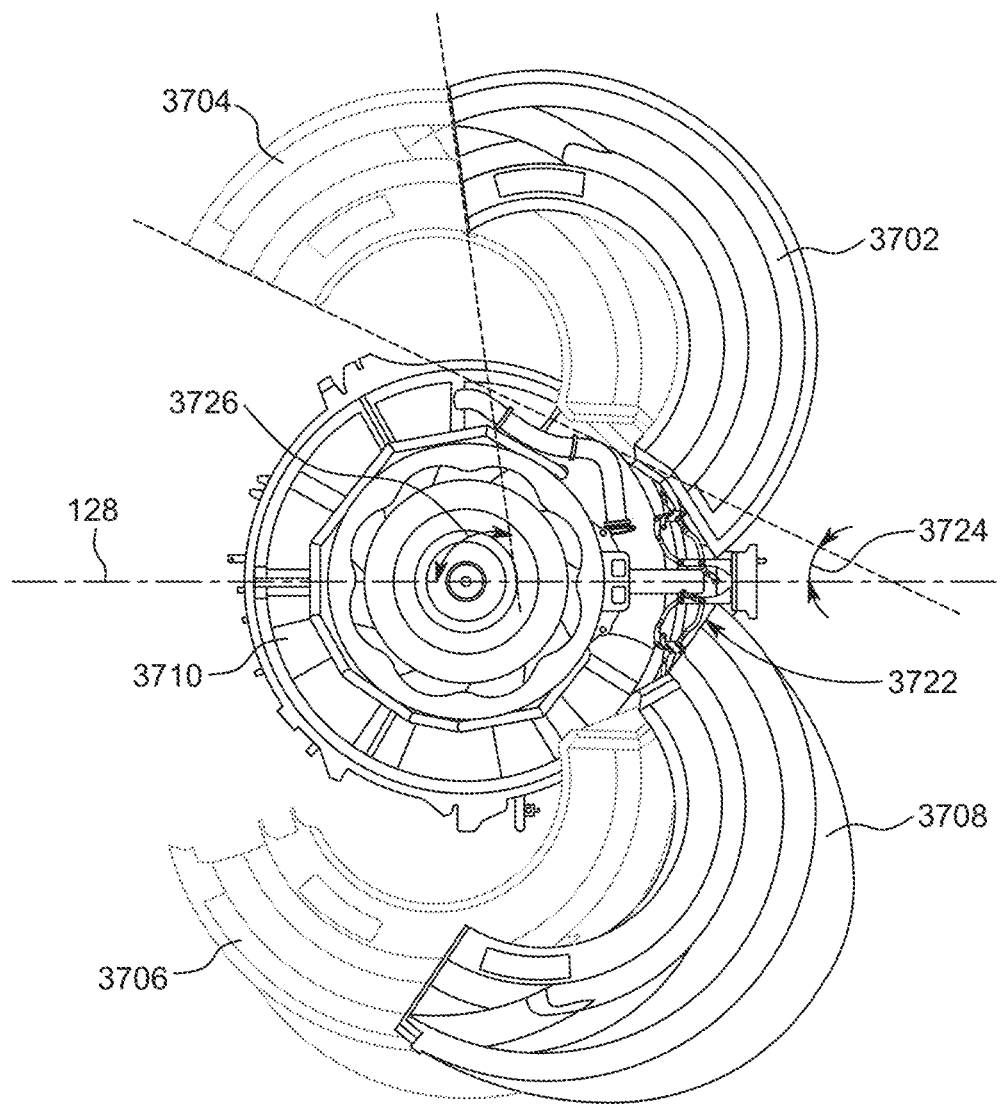
FIG. 37A is a forward looking comparative view showing respective positions of open conventional cowls and open cowls according to an embodiment of the invention.

FIG. 37A is forward looking view showing an aircraft turbine engine 3710 and overlayed corresponding open positions of (i) a conventionally opened upper cowl 3702 and lower cowl 3708, and (ii) upper cowl 3704 and lower cowl 3706 opened fully by an embodiment of the cowl mechanisms 102. In the fully opened position, a conventionally opened upper cowl 3702 is rotated by conventional rotated degrees 3726. In the open position the upper cowl 3704 is rotated by rotated degrees 3724, which is less than conventional rotated degrees 3726.

Figure 37B:
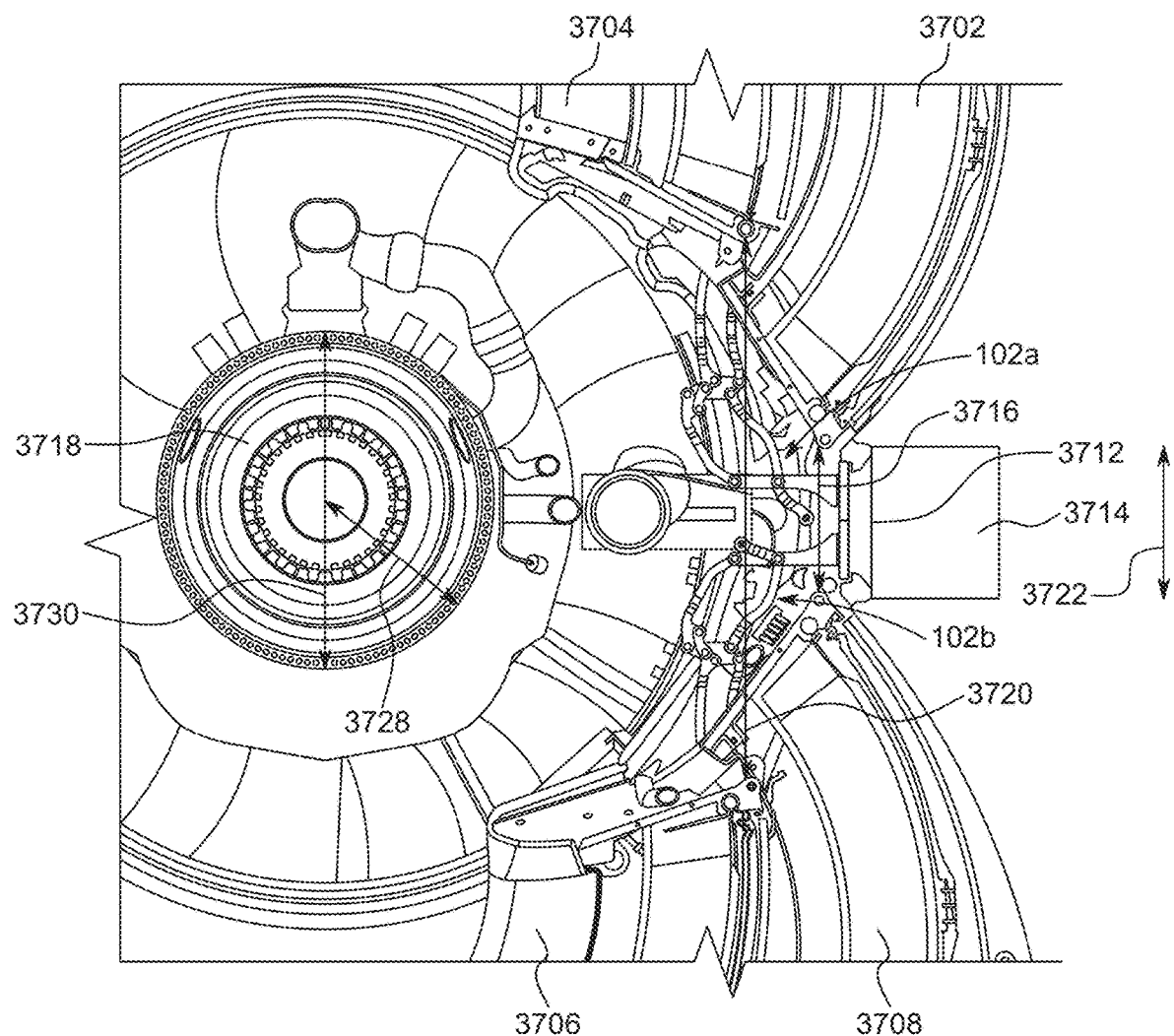
FIG. 37B is a detailed view of the comparison in FIG. 37A.

FIG. 37B is a detailed view of the pylon attaching region of the aircraft turbine engine 3710 showing the upper cowl mechanism 102a, lower cowl mechanism 102b, pylon structure 3714, engine to pylon systems connection interface 3712, and an outer diameter 3730 of the engine core 3718. The pylon systems connection interface 3712 is a boundary between pylon and engine core compartments where some engine to pylon system connections may be located, including, for example, electrical line and/or air ducts. As shown, when fully opened, a bottom-most end of the upper cowl 3704 is raised away from an outboard split line 128 of the aircraft turbine engine 3710, and preferably raised above the top edge of the pylon structure 3714 and/or a top edge of the engine to pylon systems connection interface 3712. Further, when fully opened, a top-most end of the lower cowl 3706 is lowered away from the outboard split line 128, and preferably lowered below a bottom edge of the pylon structure 3714 and/or a lower edge of the engine to pylon systems connection interface 3712. Additionally, when in the open position, the bottom most end of the upper cowl 3704 is advantageously moved away from a topmost end of the lower cowl 3706 by a distance 3720.

However, with the conventional hinge approach, even when fully opened, end portions of the upper cowl 3702 and lower cowl 3704 that are connected to the traditional hinge 3817/3819 (FIG. 38) remain adjacent to the outboard split line 128 and do not move away from the outboard split line 128 in the up or down directions. Thus, according to a conventional hinge approach, a distance 3716 between a lowest portion of an upper cowl 3702 and a highest portion of a lower cowl 3708 does not increase as the cowls are opened. Preferably, when fully opened by the guidance of cowl mechanisms 102, the bottom-most end of the upper cowl 3704 is raised above the outboard split line 128 by at least a distance equal to the outer radius 3728 of the engine core 3718. Also, preferably, when fully opened by the cowl mechanism 102, the top-most end of the lower cowl 3706 is lowered above the outboard split line 128 by at least a distance equal to the outer radius 3728 of the engine core 3718. Further, when in the open position, the distance 3720 is preferably greater than 150% of the diameter 3730 of the engine core 3718, and even more preferably greater than 200% of the diameter 3730 of the engine core 3718 to facilitate convenient maintenance access within the cowl, without creating disadvantageous interference with other parts of the aircraft (e.g., other engines, struts, or the fuselage). In addition, to facilitate maintenance access to the pylon systems connection interface 3712, the distance 3720 is preferably greater than an outer vertical height 3722 of the pylon structure 3714, and more preferably greater than 150% of the outer vertical height 3722 of the pylon structure 3714.

In the above embodiment, the outboard split line 128 passes through an axial center of the aircraft engine. However, the invention encompasses outboard split lines arranged above or below this point.

Thus, by guiding cowl movement directly away from the outboard split line 128 in this way, an embodiment in which the cowl mechanism 102 is used to open and close the cowls may advantageously provide convenient maintenance access to regions of the aircraft propulsion system 100 and the engine to pylon systems connection interface 3712 that are located near the pylon structure 3714, without requiring as much angular rotation of the upper cowl 104 and lower cowl 106, thereby also allowing for arrangement of the engine assembly closer to other aircraft elements (e.g., fuselage, struts, or other engines) without interference when the cowl is open. The resulting aircraft may be made without extended surfaces, may use lighter, less expensive materials, and may be less expensive to maintain and operate.

What is claimed is:

1. An aircraft propulsion system comprising:
   an engine assembly including a fan that rotates to move air;
   a cowl that surrounds at least a portion of the engine assembly when the cowl is in a closed position, the cowl including an outer surface arranged away from the engine assembly that provides an aerodynamic surface; and a cowl mechanism connected to the cowl and configured to guide the cowl along a movement path from the closed position to an open position, wherein in the open position, an entirety of the cowl is arranged farther away from a horizontal plane passing through a rotating axis of the fan than in the closed position, the cowl mechanism guides the cowl along the movement path between the open position and the closed position so that no portion of the cowl extends beyond a clearance plane at any position along the movement path, the cowl mechanism is configured to be mounted to a pylon extending away from a fuselage of the aircraft in a horizontal direction, and the clearance plane extends in a vertical direction through an intersection point that is a point on an outer surface of the cowl in the closed position that is closest to the fuselage.

2. The aircraft propulsion system according to claim 1, wherein the movement path is defined by a motion of a point on the outer surface of the cowl, the movement path includes a straight line during a first portion of the movement path from the closed position to the open position, and the movement path includes a curved line during a second portion of the movement path from the closed position to the open position, the second portion being further from the closed position than the first portion.

3. The aircraft propulsion system according to claim 1, wherein in the open position, the entirety of the cowl is moved away from the horizontal plane by a distance equal to at least an outer radius of an engine core of the engine assembly.

4. The aircraft propulsion system according to claim 1, wherein the cowl includes an upper cowl that surrounds an upper portion of the engine assembly, and a lower cowl that surrounds a lower portion of the engine assembly, in the closed position, the upper cowl and the lower cowl are configured to be latched to each other by at least one latch along the horizontal plane, the cowl mechanism further includes an upper cowl mechanism attached to the upper cowl, a lower cowl mechanism attached to the lower cowl, and a mid-link connecting the upper cowl to the lower cowl, the cowl mechanism being further configured to simultaneously move a second one of the upper cowl and the lower cowl along the movement path when a first one of the upper cowl and the lower cowl is caused to move along the movement path by an external force.

5. The aircraft propulsion system according to claim 4, wherein the cowl mechanism is configured to counterbalance a weight of the upper cowl and the lower cowl so that the external force required to move the upper cowl and the lower cowl along the movement path is less than a maximum force that can be manually and safely applied by a single individual.

6. The aircraft propulsion system according to claim 1, wherein the engine assembly further comprises a v-groove, and the cowl includes a v-blade configured to engage with the v-groove in the closed position, and the cowl mechanism is configured to guide the cowl along a vertical direction in the movement path from the closed position towards the open position at least until the v-blade is completely clear of the v-groove.

7. The aircraft propulsion system according to claim 1, wherein the open position is a position of the cowl in which the portion of the engine assembly is made accessible for performing a maintenance function.

8. The aircraft propulsion system according to claim 7, wherein making the engine assembly accessible for performing the maintenance function includes moving the cowl enough to perform at least one of the following without removing the cowl from the aircraft that includes the aircraft propulsion system:

a direct visual inspection of the portion of the engine assembly, an inspection of the portion of the engine assembly using a non-flexible, straight borescope, an inspection of the portion of the engine assembly using a flexible borescope, removal of the portion of the engine assembly from the aircraft, and removal of an entirety of the engine assembly from the aircraft.

9. The aircraft propulsion system according to claim 8, wherein the cowl mechanism is configured to guide the cowl along the movement path so that in the open position, the cowl is rotated by less than 45 degrees away from the closed horizontal position.

10. The aircraft propulsion system according to claim 1, wherein the cowl mechanism further includes at least two links that are configured to change their positions with respect to each other while the cowl is moved between the closed position and the open position, and the cowl mechanism further includes a locking device that when installed is configured to be attached to the at least two links to prevent the at least two links from changing their positions with respect to each other, and when installed, the locking device prevents the cowl from being moved away from the open position.

11. The aircraft propulsion system according to claim 1, wherein the cowl includes a duct configured to change a movement direction of the air moved by the engine assembly fan.

12. The aircraft propulsion system according to claim 1, wherein the cowl mechanism is further attached to a pylon of an aircraft.

13. A cowl movement mechanism that connects to at least one cowl configured to surround at least a portion of an engine assembly in a closed position of an aircraft propulsion system, the engine assembly including a fan that rotates to move air, and the at least one cowl including an outer surface arranged away from the engine assembly that provides an aerodynamic surface, the cowl movement mechanism comprising:

a plurality of links configured to guide the at least one cowl along a movement path from the closed position to an open position;

the plurality of links are configured to guide the at least one cowl along the movement path so that an entirety of each cowl in the at least one cowl is moved farther away from a horizontal plane passing through a rotating axis of the fan than in the closed position, wherein the plurality of links are configured to guide the cowl along the movement path between the open position and the closed position so that no portion of the cowl extends beyond a clearance plane at any position along the movement path, the cowl movement mechanism is configured to be mounted to a pylon extending away from a fuselage of an aircraft in a horizontal direction, and the clearance plane extends in a vertical direction through an intersection point that is a point on an outer surface of the cowl in the closed position that is closest to the fuselage.

14. The cowl movement mechanism according to claim 13, wherein the movement path is defined by a motion of a point on the outer surface of the cowl, the movement path includes a straight line during a first portion of the movement path from the closed position to the open position, and the movement path includes a curved line during a second portion of the movement path from the closed position to the open position, the second portion being further from the closed position than the first portion.

15. The cowl movement mechanism according to claim 13, wherein in the open position, the entirety of the cowl is moved away from the horizontal plane by a distance equal to at least an outer radius of an engine core of the engine assembly.

16. The cowl movement mechanism according to claim 13, wherein the cowl includes an upper cowl that surrounds an upper portion of the engine assembly, and a lower cowl that surrounds a lower portion of the engine assembly, in the closed position, the upper cowl and the lower cowl are configured to be latched to each other by at least one latch along the horizontal plane, the cowl mechanism further includes an upper cowl mechanism attached to the upper cowl, a lower cowl mechanism attached to the lower cowl, and a mid-link connecting the upper cowl to the lower cowl, the cowl mechanism being further configured to simultaneously move a second one of the upper cowl and the lower cowl along the movement path when a first one of the upper cowl and the lower cowl is caused to move along the movement path by an external force.

17. The cowl movement mechanism according to claim 16, wherein the cowl mechanism is configured to counterbalance a weight of the upper cowl and the lower cowl so that the external force required to move the upper cowl and the lower cowl along the movement path is less than a maximum force that can be manually and safely applied by a single individual.

18. The cowl movement mechanism according to claim 13, wherein the open position is a position of the cowl in which the portion of the engine assembly is made accessible for performing a maintenance function that includes moving the cowl enough to perform at least one of the following without removing the cowl from an aircraft that includes the cowl movement mechanism:

a direct visual inspection of the portion of the engine assembly, an inspection of the portion of the engine assembly using a non-flexible, straight borescope, an inspection of the portion of the engine assembly using a flexible borescope, removal of the portion of the engine assembly from the aircraft, and removal of an entirety of the engine assembly from the aircraft.

* * * * *